US012647376B1

(12) United States Patent
Esinaulo et al.

(10) Patent No.: US 12,647,376 B1
(45) Date of Patent: Jun. 2, 2026

(54) LANGUAGE MODEL COMMUNICATION CHANNEL OPTIMIZATION

(71) Applicant: Amazon Technologies, Inc., Seattle, WA (US)

(72) Inventors: Chidinma Esinaulo, Seattle, WA (US); Fnu Harish Govindarajan, Seattle, WA (US); Roopali Vasant Kaujalgi, Bothell, WA (US); Chetan Kishor Rathod, Issaquah, WA (US); Julian Prabhakar Lourdenadhan, Kent, WA (US); Richard Vong, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 18/759,134

(22) Filed: Jun. 28, 2024

(51) Int. Cl.
| | |
|---|---|
| *G10L 15/22* | (2006.01) |
| *G06F 16/2457* | (2019.01) |
| *G10L 15/183* | (2013.01) |
| *H04L 51/04* | (2022.01) |
| *G10L 15/18* | (2013.01) |
| *G10L 15/30* | (2013.01) |

(52) U.S. Cl.
CPC .......... *H04L 51/04* (2013.01); *G06F 16/2457* (2019.01); *G10L 15/183* (2013.01); *G10L 15/22* (2013.01); *G10L 15/1815* (2013.01); *G10L 2015/223* (2013.01); *G10L 15/30* (2013.01)

(58) Field of Classification Search
CPC .............. G10L 15/22; G10L 2015/221; G10L 2015/223; G10L 2015/225; H04W 4/80; H04W 4/14
See application file for complete search history.

(56) References Cited

U.S. PATENT DOCUMENTS

| | | | | |
|---|---|---|---|---|
| 10,136,285 | B2 * | 11/2018 | Lienhart | ................. H04W 4/12 |
| 10,664,540 | B2 * | 5/2020 | Daianu | ............. G06F 16/90332 |
| 11,265,276 | B2 * | 3/2022 | Wetherell | ........... H04W 72/563 |
| 12,080,268 | B1 | 9/2024 | Nadig | |
| 2015/0088514 | A1 * | 3/2015 | Typrin | .................. H04M 3/493 |
| | | | | 704/231 |
| 2016/0133254 | A1 * | 5/2016 | Vogel | ................ G06F 16/24578 |
| | | | | 704/275 |
| 2017/0126610 | A1 * | 5/2017 | Sachidanandam | ..... G06Q 50/01 |
| 2022/0279015 | A1 * | 9/2022 | Sambamoorthy | ..... H04L 51/212 |
| 2022/0368665 | A1 * | 11/2022 | Walters | ................. H04L 51/224 |
| 2023/0196025 | A1 * | 6/2023 | Thadisetty | .............. G10L 25/63 |

(Continued)

*Primary Examiner* — Jason D Cardone
(74) *Attorney, Agent, or Firm* — Nicholson De Vos Webster & Elliott LLP

(57) ABSTRACT

Systems and methods for LM communication channel optimization include receiving user input data requesting that a message be sent and determining, using a language model (LM), a recipient profile to send the message to. Thereafter, the LM may query a communication channel application for data indicating communication channels available for sending the message to the recipient profile, and then the LM may infer, based on the data, an urgency value and/or formality value to associate with the message. In this example, the LM may be trained to infer the urgency value and/or the formality value from content of the message. Then, a communication channel may be selected based at least in part on the urgency value and/or the formality value.

20 Claims, 14 Drawing Sheets

(56) References Cited

U.S. PATENT DOCUMENTS

| | | | |
|---|---|---|---|
| 2023/0359320 A1* | 11/2023 | Huang | G06F 1/1654 |
| 2024/0241624 A1* | 7/2024 | Klein | G06F 3/0484 |
| 2025/0022460 A1* | 1/2025 | Yu | G10L 15/1822 |
| 2025/0053747 A1* | 2/2025 | Tian | G06V 30/19107 |
| 2025/0259209 A1* | 8/2025 | Selvaraj | G06Q 30/0271 |

* cited by examiner

600

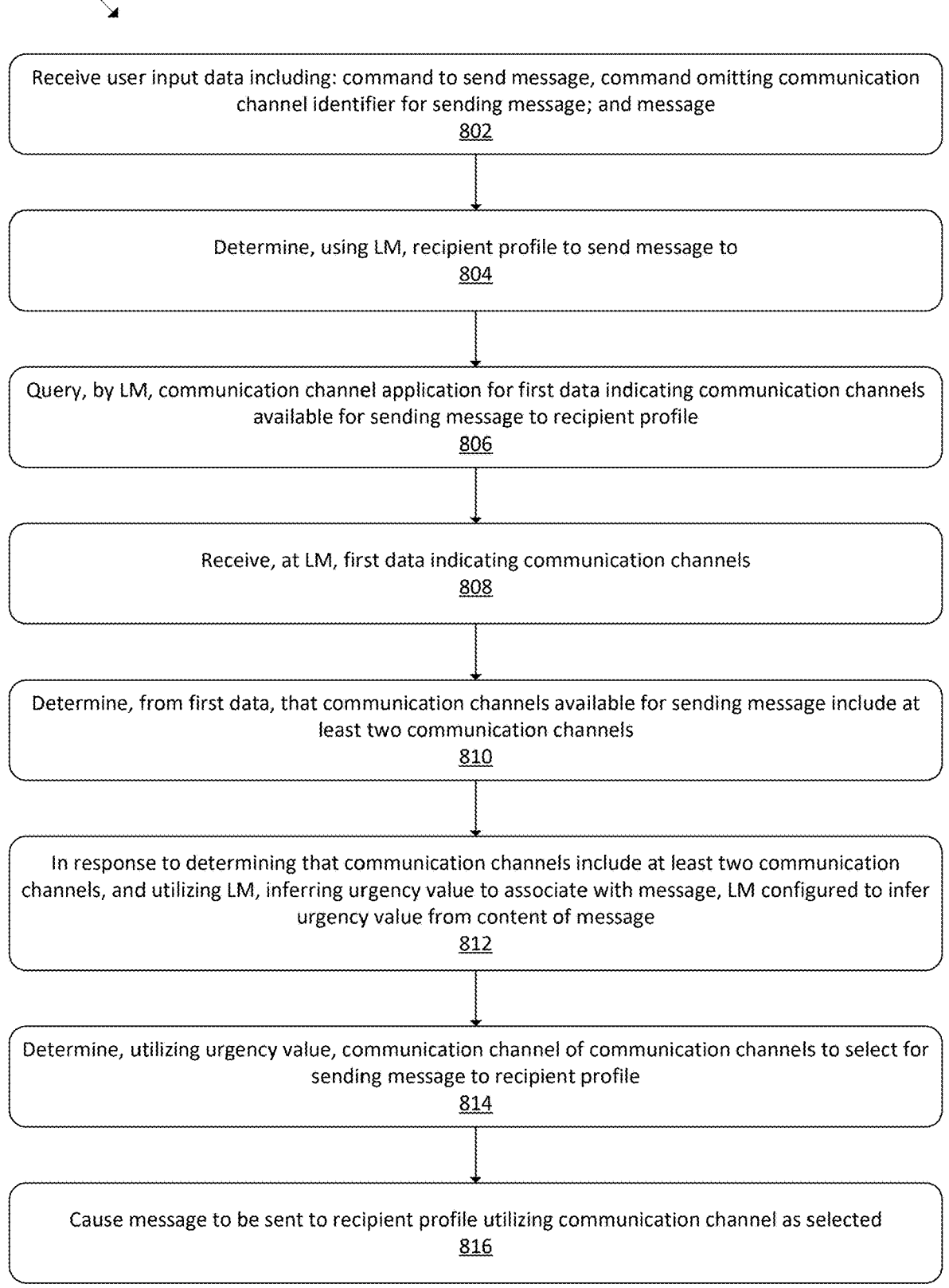

800

Receive user input data including: command to send message, command omitting communication
channel identifier for sending message; and message
802

Determine, using LM, recipient profile to send message to
804

Query, by LM, communication channel application for first data indicating communication channels
available for sending message to recipient profile
806

Receive, at LM, first data indicating communication channels
808

Determine, from first data, that communication channels available for sending message include at
least two communication channels
810

In response to determining that communication channels include at least two communication
channels, and utilizing LM, inferring urgency value to associate with message, LM configured to infer
urgency value from content of message
812

Determine, utilizing urgency value, communication channel of communication channels to select for
sending message to recipient profile
814

Cause message to be sent to recipient profile utilizing communication channel as selected
816

FIG. 8

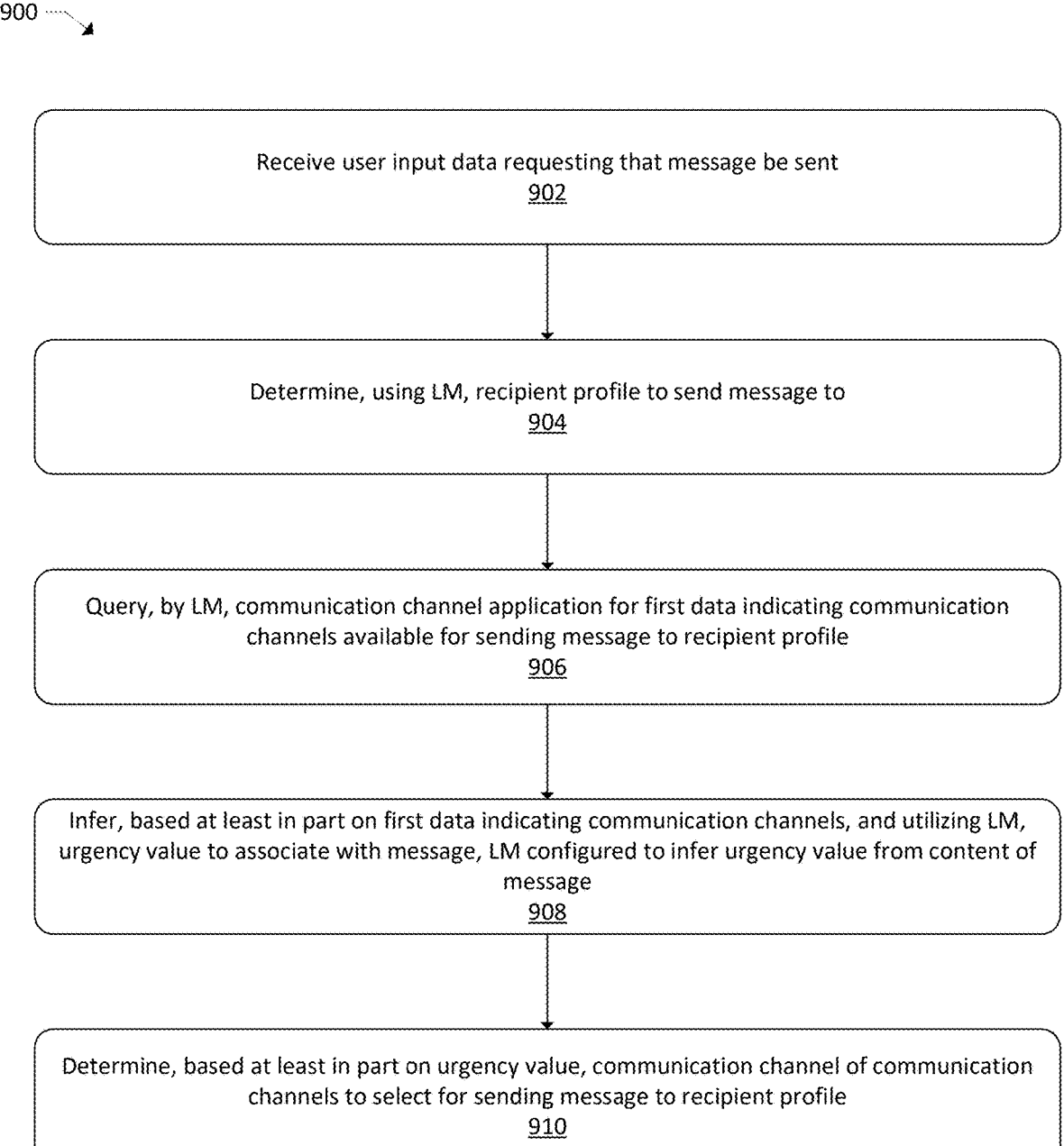

900

Receive user input data requesting that message be sent
902

Determine, using LM, recipient profile to send message to
904

Query, by LM, communication channel application for first data indicating communication channels available for sending message to recipient profile
906

Infer, based at least in part on first data indicating communication channels, and utilizing LM, urgency value to associate with message, LM configured to infer urgency value from content of message
908

Determine, based at least in part on urgency value, communication channel of communication channels to select for sending message to recipient profile
910

FIG. 9

LANGUAGE MODEL COMMUNICATION CHANNEL OPTIMIZATION

BACKGROUND

Devices, including voice interface devices, have become available. Some of these devices may be utilized to perform actions in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates a flow diagram of an example process for LM communication channel optimization.

FIG. 9 illustrates a flow diagram of another example process for LM communication channel optimization.

DETAILED DESCRIPTION

Figure 1:
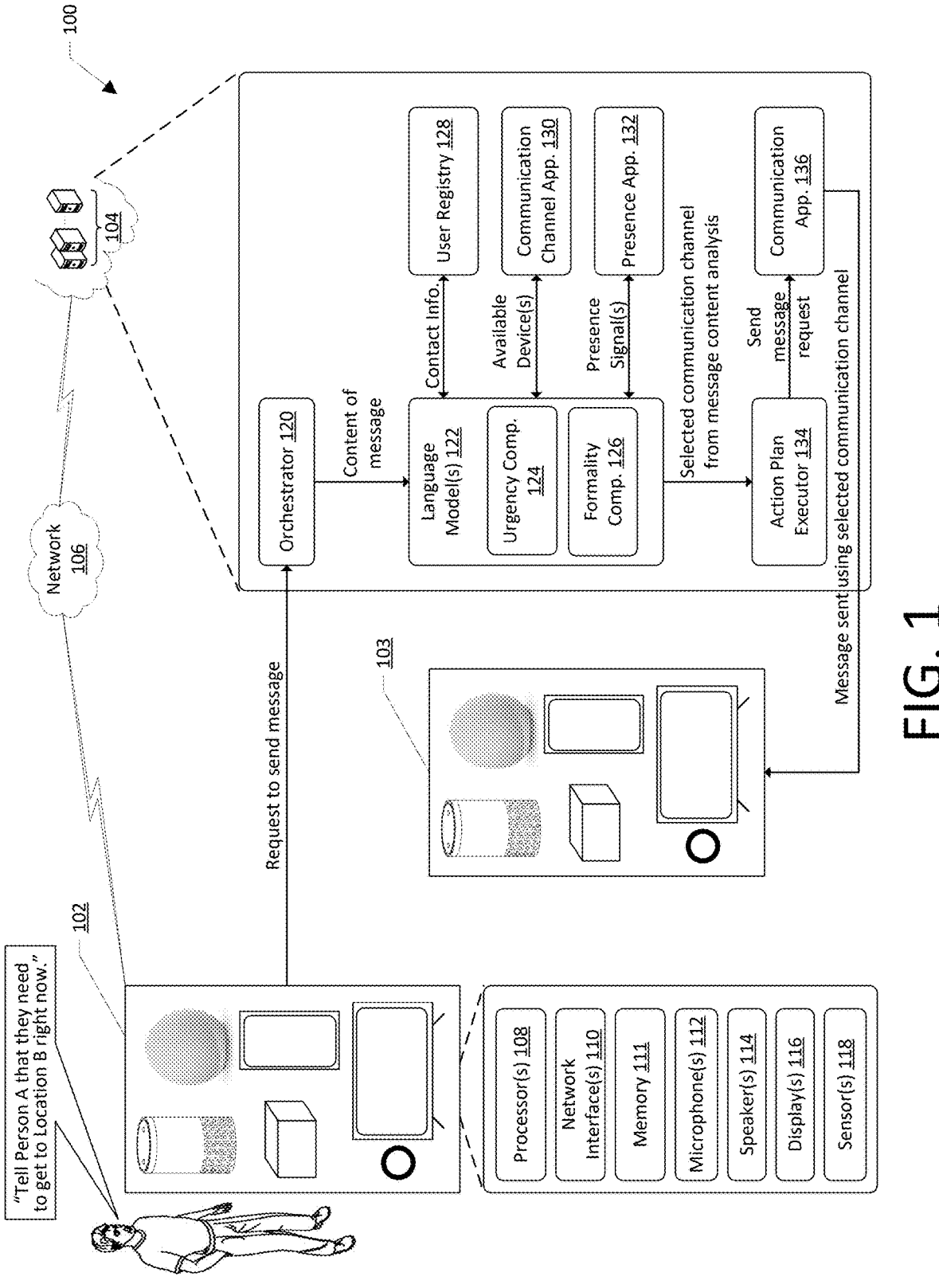
FIG. 1 illustrates a schematic diagram of an example environment for language model (LM) communication channel optimization.

Systems and methods for LM communication channel optimization are disclosed, among other things. Take, for example, an environment (such as a space in and/or around a home, hotel, vehicle, office, store, restaurant, etc.) where one or more devices may be present. The devices may be utilized by one or more users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode"), smart cameras (e.g., home security cameras), and/or touch interface devices (tablets, phones, steering wheels, laptops, kiosks, billboard, other devices with buttons, etc.). Some devices can be multiple types of those noted above.

In these and other scenarios, users may utilize devices to send messages to a recipient. In some examples, the command provided by the user may include an identifier of the communication channel to be utilized for sending the message. An example of such a situation may be a user command such as "send a text message to Person A saying 'hello'." In this example, a text type communication channel may be selected for sending the message based on the user command itself including the phrase "text message" or a similar communication channel indicator. However, in other examples, the user command may not include a communication channel identifier and/or the communication channel identifier provided in the user command may not correspond to a preferred communication channel based on the content of the message. An example of such a situation may be a user command such as "tell Person A that they need to get to Location B right now." In this example, the user command does not include an identifier of the communication channel to be utilized, and thus it would be beneficial to infer the preferred communication channel to be utilized for sending the message.

To do so, as disclosed herein, one or more language model (LM) communication channel optimizations may be utilized. As described herein, in examples, an LM may refer to a large language model and/or a generative artificial intelligence model configured to intake a prompt, infer a response based on the prompt and/or other data available to the LM, and provide the response and/or a command to perform an action responsive to the prompt. In examples, the user command requesting that a message be sent may be received at a user device and the user device may generate user input data corresponding to the user command. In some examples, the user command may be provided in the form of a voice command via a voice user interface of the user device. In other examples, the user command may be provided in the form of a typed command via a graphical user interface of the user device. The user input data may be sent to a system and may be received at an orchestrator of that system. The orchestrator may send the user input data, which may be formatted in the form of a prompt, to the LM for determining what actions are to be taken in response to the user command and/or how to respond to the user command. In examples, the LM may initially analyze the user input data to determine a domain associated with the user command. In the example user command of "tell Person A that they need to get to Location B right now," the LM may infer that the user command is associated with a communication domain based on the user command including the phrase "tell Person A," which may indicate an intent to send a message. The LM may then make one or more calls to one or more applications to acquire data for determining what actions should be taken responsive to the user command to send the message.

By way of example, the LM may call a user registry for contact information associated with the sender profile of the sender of the message. For example, the LM may provide the user registry with an indicator of the sender profile and may request contact information of potential recipient profiles that are associated with the sender profile. The user registry may return the contact information to the LM, which may utilize the contact information along with the user input data to infer a recipient profile to be selected for sending the message to. In examples, the LM may be configured to arbitrate between multiple potential recipient profiles, particularly where contact names and/or other contact information as between two or more contacts are the same or similar. Having determined the recipient profile, the LM may then query a communication channel application for available devices associated with the recipient profile. The LM may provide an identifier of the recipient profile as well as, in examples, context information associated with the message to be sent. For example, the LM may determine that the message will be provided as audio data and in this example the LM may send context information indicating that devices with an audio-output speaker are to be considered as available devices. In another example, the LM may determine that the message will be provided as text data and/or image data and in this example the LM may send context information indicating that devices with a display are to be considered as available devices. The communication channel application may receive the request from the LM and may determine devices associated with the recipient profile that are available for sending the message to. The communication channel application may then return identifiers of the available devices associated with the recipient profile as well as information indicating communication channels available to the devices. By way of example, the communication channels may include a text type communication channel where a short message service (SMS) message may be sent, and/or an email type communication channel, and/or an announcement type communication channel where the message may be broadcasted from an announcement-enabled device, and/or a device-to-device type communication channel where messages may be sent to and from devices in a group of devices associated with the same account data. It should be understood that the communication channel types described herein are provided by way of nonlimiting example and that any communication channel type may be utilized.

The LM, having received the available devices associated with the recipient profile, may infer the available communication channels for sending the message to the recipient profile. In some examples, a single communication channel may be available and in this example the LM may select the single communication channel for sending the message. However, in other examples, the LM may determine that at least two communication channels are available for sending the message and the LM may perform processes for ranking and selecting one of the communication channels. For example, the LM may include an urgency component, which may be configured to analyze the content of the message itself to determine an urgency value to attribute to the message. Using the message of "tell Person A that they need to get to Location B right now," the LM may be trained to infer that the message has a time sensitive component (i.e., "right now") as well as other components that indicate the message is an urgent message. In this example, the LM may infer that the message has a location portion, a timing portion, and/or words that indicate a degree of urgency such as "need," "required," "now," etc. Generally, the LM may be configured to utilize the information available to it to analyze the message to be sent and to infer how urgent the message is. An urgency value may be associated with the message and the LM may determine whether that urgency value satisfies a threshold urgency value indicating that the message should be identified as an urgent message.

By way of continued example, the LM may utilize location data and/or timing data to further determine whether the message should be identified as an urgent message. To illustrate, if the message includes an indication that the recipient should be at a given location at a given time, the LM may determine the current location of the recipient and a current time to determine whether the recipient will need to rush to get to the location noted in the message. To acquire the location information, the LM may query a presence application, which may determine a current location of the recipient and/or may provide other presence-based signals that may be utilized to determine a geographic location of the recipient and/or a specific location of the recipient with respect to one or more devices (e.g., the recipient is in "the kitchen" near a device in the kitchen). Some or all of this contextual information as well as the content of the message itself may be utilized to determine if the message should be identified as an urgent message by the LM.

The LM may also perform processes for ranking and selecting one of the communication channels by determining a formality value to attribute to the message. For example, the LM may include a formality component, which may be configured to determine how formal the message is and thus which communication channel would be optimal given the formality of the message. To illustrate, some messages may be less formal such as "what's up?" "that's great!" "hello," etc. However, other messages may be more formal such as messages to teachers/professors, messages to coworkers, messages having formal subject matter, lengthy messages, etc. The formality component of the LM may be configured to utilize the content of the message to be sent along with contextual information to determine a formality value to attribute to the message. If the formality value satisfies a formality value threshold, the LM may determine that the message is a formal message and may select a communication channel identified for formal messages. With respect to the content of the message itself, the content may include text with certain syntax, diction, structure, etc. that the LM may utilize to determine the formality value. Additionally, the amount of text in the content of the message may indicate a formality of the message, where a longer message may indicate a more formal message than a shorter message. Additionally, a current location of the recipient and/or recipient device may inform the formality value. By way of example, if the recipient is detected at a work location, the formality value may indicate a more formal message than if the recipient is detected in a home environment. Additionally, in examples, the message itself may be generated utilizing the LM, and in this example the user input requesting that the LM generate the content for the message, as well as the generated message itself, may be analyzed to determine the formality value. Additionally, the LM may determine a recipient category for the recipient of the message and the recipient category may inform the formality value. For example, certain recipients may be in a family recipient category while other recipients may be in a work recipient category, and/or a school recipient category, and/or one or more other categories. Such recipient categorization may indicate that the message should be treated as being more or less formal.

Additionally, presence signals themselves may be utilized to rank and/or select communication channels. For example, devices within an environment of the recipient may be utilized to collect sensor data, and that sensor data may be analyzed by a presence application to determine which of the devices are proximate to the recipient and/or to determine an activity of the recipient in question. For example, a given device may generate sensor data indicating that the recipient is currently engaged with the device. The available communication channels of that device may then be utilized as potential communication channels to select from for sending the message. Additionally, a given device may detect the presence of a user and/or movement of the user. In certain examples, this sensor data may indicate that the recipient is disposed in a given environment that may be more suitable for receiving the message using a certain communication channel over other communication channels. In another nonlimiting example, the sensor data may indicate that the user is moving geographic locations quickly. This may indicate that the user is running, driving a car, etc. In these examples, the LM may determine to utilize an announcement type communication channel instead of an email type communication channel, for example. It should be understood that the LM may infer which communication channel to utilize for sending a given message based on the urgency value, the formality value, the presence signals, and/or any other signals and/or determinations described herein.

Additionally, while the urgency values and formality values are described by way of illustration herein, this disclosure includes the determination of various other content scores that may be generated from analysis of the message content itself to determine which communication channel to select. As such, whenever determination of an urgency value and/or formality value is described herein, a content score may be determined that may not necessarily be based on urgency of the message and/or formality of the message. Instead, the content score may be based at least in part on analysis of the message content generally and/or in one or more other specific ways.

Once a communication channel is selected, the LM may call a communication application to cause the message to be sent to the recipient profile utilizing the selected communication channel. In examples, prior to sending the message, the LM may generate a response to the user command indicating which communication channel was selected. This response may be presented to the user, and in examples, the user may send feedback data indicating whether the selected communication channel was the desired communication channel. In examples where feedback data is not received, the communication application may send the message using the selected communication channel. When feedback is received, the LM may utilize the feedback data to infer a different communication channel to select. Additionally, the LM may be configured to determine whether the feedback was associated with the urgency value determination. In these examples, the LM may be trained utilizing the feedback data to more accurately determine the urgency value. Furthermore, the LM may be configured to determine whether the feedback was associated with the formality value determination. In these examples, the LM may be trained utilizing the feedback data to more accurately determine the formality value.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for LM communication channel optimization. The environment 100 may include, for example, device(s) 102. In certain examples, the device(s) 102 themselves may be any one or more of a voice interface device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In some examples, the devices may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. In some nonlimiting examples, at least some of the device(s) 102 may be multi-modal devices that may be configured to capture audio representing user utterances and/or to capture user input by a display or otherwise.

The device(s) 102 may be configured to send data to and/or receive data from remote component(s) of a system 104, such as via a network 106. It should be understood that where operations are described herein as being performed by the remote component(s) of the system 104, some or all of those operations may be performed by the device(s) 102. It should also be understood that anytime the remote component(s) of the system 104 are referenced, that system may include any system and/or device, whether local to an environment of the devices or remote from that environment. Additionally, it should be understood that a given space and/or environment may include numerous devices. It should also be understood that when a "space" or "environment" is used herein, those terms mean an area of any size and delineation and can include but are not necessarily limited to a given room, building, or other structure, unless otherwise specifically described as such.

The device(s) 102 may include one or more components, such as, for example, one or more processors 108, one or more network interfaces 110, memory 111, one or more microphones 112, one or more speakers 114, one or more displays 116, and/or one or more sensors 118. The microphones 112 may be configured to capture audio, such as user utterances, and generate corresponding audio data. The speakers 114 may be configured to output audio, such as audio corresponding to audio data received from another device. The displays 116 may be configured to display images corresponding to image data, such as image data received from the remote component(s) of the system 104 as well as user interface elements that may be configured to receive user input indicating selection of such user interface elements and/or provision of queries. The device(s) 102 may be configured to detect an environmental condition associated with the environment utilizing the sensors 118. Some example sensors 118 that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 118, usage data and/or account data may be utilized to determine if an environmental condition is present. In some examples, the sensors 118 may also include radar and/or ultrasonic sensors. The sensors 118 may be configured to generate context data. The environment 100 may also include a recipient device 103, which may be the same or similar to at least one of the user devices 102.

It should be understood that while several examples used herein include a voice-enabled device that allows users to interact therewith via user utterances, one or more other devices, which may not include a voice interface, may be utilized instead of or in addition to voice-enabled devices. In these examples, the device(s) 102 may be configured to send and receive data over the network 106 and to communicate with other devices in the environment 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The remote component(s) of the system 104 may include components such as, for example, an orchestrator 120, one or more language models (LMs) 122, an urgency component 124 of the LM 122, a formality component 126 of the LM 122, a user registry 128, a communication channel application 130, a presence application 132, an action plan executor 134, and/or a communication application 136. It should be understood that while the components of the remote component(s) of the system 104 are depicted and/or described as separate from each other in FIG. 1, some or all of the components may be a part of the same system. When the system 104 includes speech processing, including speech processing performed by the LM 122, the speech processing system may include an automatic speech recognition component (ASR) and/or a natural language understanding component (NLU). Each of the components described herein with respect to the remote component(s) of the system 104 may be associated with their own systems, which collectively may be referred to herein as the remote component(s) of the system 104, and/or some or all of the components may be associated with a single system. Additionally, the remote component(s) of the system 104 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to a text-to-speech (TTS) component, a link or other resource locator for audio data, and/or a command to a device, such as smart devices. "Skills" may include applications running on devices, such as the smart devices, and/or may include portions that interface with voice user interfaces of smart devices. In other examples where LMs 122 are utilized, the LM 122 may be configured to determine one or multiple skills to call to retrieve information from and/or to perform processing for the LM 122. Example skills may be the communication channel application 130, the presence application 132, and/or the communication application 136 described herein.

In instances where a voice-enabled device is utilized, skills may extend the functionality of smart devices that can be controlled by users utilizing a voice-user interface. In some examples, skills may be a type of application that may be useable in association with target devices and may have been developed specifically to work in connection with given target devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the remote component(s) of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the remote component(s) of the system 104, the user registry 128 may be configured to determine and/or generate associations between users, user accounts, environment identifiers, and/or devices. For example, one or more associations between user accounts may be identified, determined, and/or generated by the user registry 128. The user registry 128 may additionally store information indicating one or more applications and/or resources accessible to and/or enabled for a given user account. Additionally, the user registry 128 may include information indicating device identifiers, such as naming identifiers, associated with a given user account, as well as device types associated with the device identifiers. The user registry 128 may also include information indicating user account identifiers, naming indicators of devices associated with user accounts, and/or associations between devices, such as the smart devices. The user registry 128 may also include information associated with usage of the smart devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the environment 100 may be stored or otherwise associated with an account identifier. Data associated with the user accounts may include, for example, account access information, historical usage data, device-association data, and/or preference data.

In examples, the speech processing system described herein may be configured to receive audio data from the device(s) 102 and/or other devices and perform speech processing operations. For example, the ASR component may be configured to generate text data or other ASR output data corresponding to the audio data, and the NLU component may be configured to generate intent data or other NLU output data corresponding to the audio data. In examples, intent data or other NLU output data may be generated that represents the audio data, such as without the generation and/or use of text data or other ASR output data. The intent data or other NLU output data may indicate a determined intent associated with the user utterance as well as a payload and/or value associated with the intent. For example, for a user utterance of "tell Person A that they need to get to Location B right now," the NLU component may identify a "send message" intent. In this example where the intent data or other NLU output data indicates an intent to send a message, the speech processing system may call one or more applications to effectuate the intent. Skills, as described herein may otherwise be described as applications and may include functionality for utilizing intent data or other NLU output data to generate directives and/or instructions. In other examples where a separate ASR and/or NLU component is not utilized, the LM 122 may ingest the input data (which may be audio data and/or text data and/or image data) and determine an intent associated with the input data to select a skill (otherwise described herein as, in an example, the domain applications).

The components of the environment 100 are described below by way of example. To illustrate, one or more LM communication channel optimizations may be utilized to select a communication channel for sending a message. In examples, the LM 122 may refer to a large language model and/or a generative artificial intelligence model configured to intake a prompt, infer a response based on the prompt and/or other data available to the LM 122, and provide the response and/or a command to perform an action responsive to the prompt. In examples, a user command requesting that a message be sent may be received at the user device 102 and the user device 102 may generate user input data corresponding to the user command. In some examples, the user command may be provided in the form of a voice command via a voice user interface of the user device 102. In other examples, the user command may be provided in the form of a typed command via a graphical user interface of the user device 102. The user input data may be sent to the system 104 and may be received at the orchestrator 120. The orchestrator 120 may send the user input data, which may be formatted in the form of a prompt, to the LM 122 for determining what actions are to be taken in response to the user command and/or how to respond to the user command. In examples, the LM 122 may initially analyze the user input data to determine a domain associated with the user command. In the example user command of "tell Person A that they need to get to Location B right now," the LM 122 may infer that the user command is associated with a communication domain based on the user command including the phrase "tell Person A," which may indicate an intent to send a message. The LM 122 may then make one or more calls to one or more applications to acquire data for determining what actions should be taken responsive to the user command to send the message. In examples, one or more application programming interfaces (APIs) may be utilized by the LM 122 to communicate with the other components of the system 104 such as the user registry 128, the communication channel application 130, the presence application 132, and/or the communication application 136.

By way of example, the LM 122 may call the user registry 128 for contact information associated with the sender profile of the sender of the message. For example, the LM 122 may provide the user registry 128 with an indicator of the sender profile and may request contact information of potential recipient profiles that are associated with the sender profile. The user registry 128 may return the contact information to the LM 122, which may utilize the contact information along with the user input data to infer a recipient profile to be selected for sending the message to. By way of example, the LM 122 may determine that the portion of the user command stating "Person A" is the portion indicative of which recipient profile should be selected. The LM 122 may parse the contact information received from the user registry 128 to find a contact with the identifier of "Person A," and may select that contact as the recipient.

In examples, the LM 122 may be configured to arbitrate between multiple potential recipient profiles, particularly where contact names and/or other contact information as between two or more contacts are the same or similar. By way of example, there may be two "Person A" contacts associated with the sender profile. In this example, the LM 122 may utilize the content of the message itself to determine which "Person A" should be selected, and/or the LM 122 may utilize context information such as which potential recipient has corresponded most recently with the sender, which potential recipient has a noted familial relationship to the sender, which potential recipient is most proximity to the sender, etc. It should be understood that the LM 122 may utilize any data available to it to arbitrate between potential recipient profiles to select a profile for sending the message to.

Having determined the recipient profile, the LM 122 may then query the communication channel application 130 for available devices associated with the recipient profile. The LM 122 may provide an identifier of the recipient profile as well as, in examples, context information associated with the message to be sent. For example, the LM 122 may determine that the message will be provided as audio data and in this example the LM 122 may send context information indicating that devices with an audio-output speaker are to be considered as available devices. In another example, the LM 122 may determine that the message will be provided as text data and/or image data and in this example the LM 122 may send context information indicating that devices with a display are to be considered as available devices. The communication channel application 130 may receive the request from the LM 122 and may determine devices associated with the recipient profile that are available for sending the message to. The communication channel application 130 may then return identifiers of the available devices associated with the recipient profile as well as information indicating communication channels available to the devices. By way of example, the communication channels may include a text type communication channel where a SMS message may be sent, and/or an email type communication channel, and/or an announcement type communication channel where the message may be broadcasted from an announcement-enabled device, and/or a device-to-device type communication channel where messages may be sent to and from devices in a group of devices associated with the same account data. It should be understood that the communication channel types described herein are provided by way of nonlimiting example and that any communication channel type may be utilized.

The LM 122, having received the available devices associated with the recipient profile, may infer the available communication channels for sending the message to the recipient profile. In examples, a single communication channel may be available and in this example the LM 122 may select the single communication channel for sending the message. However, in other examples, the LM 122 may determine that at least two communication channels are available for sending the message and the LM 122 may perform processes for ranking and selecting one of the communication channels. For example, the LM 122 may include the urgency component 124, which may be configured to analyze the content of the message itself to determine an urgency value to attribute to the message. Using the message of "tell Person A that they need to get to Location B right now," the LM 122 may be trained to infer that the message has a time sensitive component (i.e., "right now") as well as other components that indicate the message is an urgent message. In this example, the LM 122 may infer that the message has a location portion, a timing portion, and/or words that indicate a degree of urgency such as "need," "required," "now," etc. Generally, the LM 122 may be configured to utilize the information available to it to analyze the message to be sent and to infer how urgent the message is. An urgency value may be associated with the message and the LM 122 may determine whether that urgency value satisfies a threshold urgency value indicating that the message should be identified as an urgent message. To illustrate, the LM 122 may determine the urgency value on a scale, say for example from 1 to 10 with 1 being the least urgent and 10 being the most urgent. The LM 122 may also set the threshold urgency value based on feedback data and/or training of the LM 122. By way of nonlimiting example, the threshold urgency value may be 7. It should be understood that any urgency value scale may be utilized.

By way of continued example, the LM 122 may utilize location data and/or timing data to further determine whether the message should be identified as an urgent message. To illustrate, if the message includes an indication that the recipient should be at a given location at a given time, the LM 122 may determine the current location of the recipient and a current time to determine whether the recipient will need to rush to get to the location noted in the message. Other information such as traffic data, weather data, historical driving data, vehicle data, scheduling data, etc. may also be utilized to assist in determining a degree of urgency of the message. To acquire the location information, the LM 122 may query the presence application 132, which may determine a current location of the recipient and/or may provide other presence-based signals that may be utilized to determine a geographic location of the recipient and/or a specific location of the recipient with respect to one or more devices (e.g., the recipient is in "the kitchen" near a device in the kitchen). Some or all of this contextual information as well as the content of the message itself may be utilized to determine if the message should be identified as an urgent message by the LM 122.

The LM 122 may also perform processes for ranking and selecting one of the communication channels by determining a formality value to attribute to the message. For example, the LM 122 may include the formality component 126, which may be configured to determine how formal the message is and thus which communication channel would be optimal given the formality of the message. To illustrate, some messages may be less formal such as "what's up?" "that's great!" "hello," etc. However, other messages may be more formal such as messages to teachers/professors, messages to coworkers, messages having formal subject matter, lengthy messages, etc. The formality component 126 of the LM 122 may be configured to utilize the content of the message to be sent along with contextual information to determine a formality value to attribute to the message. If the formality value satisfies a formality value threshold, the LM 122 may determine that the message is a formal message and may select a communication channel identified for formal messages.

With respect to the content of the message itself, the content may include text with certain syntax, diction, structure, etc. that the LM 122 may utilize to determine the formality value. For example, the message of "tell Person A dinner will be ready at 6:00 pm" may be determined to be not very formal (e.g., have a low formality value) while the message of "Dear Person C, teacher of Student D, I write to provide an update on Student D's work . . . " may be considered a more formal response based on the subject matter of the message itself. Additionally, the amount of text in the content of the message may indicate a formality of the message, where a longer message may indicate a more formal message than a shorter message. The LM 122 may be configured to determine a threshold message length and to determine whether a given message has a length that is more than the threshold message length. Additionally, a current location of the recipient and/or recipient device 103 may inform the formality value. By way of example, if the recipient is detected at a work location, the formality value may indicate a more formal message than if the recipient is detected in a home environment. The LM 122 may communicate with the presence application 132 to acquire presence signals for determining recipient and/or recipient device location data. Additionally, in examples, the message itself may be generated utilizing the LM 122, and in this example the user input requesting that the LM 122 generate the content for the message, as well as the generated message itself, may be analyzed to determine the formality value. Additionally, the LM 122 may determine a recipient category for the recipient of the message and the recipient category may inform the formality value. For example, certain recipients may be in a family recipient category while other recipients may be in a work recipient category, and/or a school recipient category, and/or one or more other categories. Such recipient categorization may indicate that the message should be treated as being more or less formal.

Additionally, presence signals themselves may be utilized to rank and/or select communication channels. For example, devices 103 within an environment of the recipient may be utilized to collect sensor data, and that sensor data may be analyzed by a presence application 132 to determine which of the devices 103 are proximate to the recipient and/or to determine an activity of the recipient in question. For example, a given device 103 may generate sensor data indicating that the recipient is currently engaged with the device 103. The available communication channels of that device 103 may then be utilized as potential communication channels to select from for sending the message. Additionally, a given device 103 may detect the presence of a user and/or movement of the user. In certain examples, this sensor data may indicate that the recipient is disposed in a given environment that may be more suitable for receiving the message using a certain communication channel over other communication channels. In another nonlimiting example, the sensor data may indicate that the user is moving geographic locations quickly. This may indicate that the user is running, driving a car, etc. In these examples, the LM 122 may determine to utilize a text type communication channel instead of an email type communication channel. It should be understood that the LM 122 may infer which communication channel to utilize for sending a given message based on the urgency value, the formality value, the presence signals, and/or any other signals and/or determinations described herein.

Once a communication channel is selected, the LM 122 may generate an action plan that indicates one or more actions to be taken to send the message. In the example utilized herein, the action plan may indicate that a message indicated by the user command is to be sent, that the selected communication channel is to be utilized to send the message, which recipient profile is selected to receive the message, and which recipient device should receive the message. The action plan may be sent to the action plan executor 134, which may be configured to read the action plan and request that components of the system 104 effectuate the action plan. In the example used herein, the action plan executor 134 may call the communication application 136 to cause the message to be sent to the recipient device 103 utilizing the selected communication channel. In examples, prior to sending the message, the LM 122 may generate a response to the user command indicating which communication channel was selected. This response may be presented to the user, and in examples, the user may send feedback data indicating whether the selected communication channel was the desired communication channel. In examples where feedback data is not received, the communication application 136 may send the message using the selected communication channel. When feedback is received, the LM 122 may utilize the feedback data to infer a different communication channel to select. Additionally, the LM 122 may be configured to determine whether the feedback was associated with the urgency value determination. In these examples, the LM 122 may be trained utilizing the feedback data to more accurately determine the urgency value. Furthermore, the LM 122 may be configured to determine whether the feedback was associated with the formality value determination. In these examples, the LM 122 may be trained utilizing the feedback data to more accurately determine the formality value.

As used herein, the one or more processes performed by the device(s) 102 and/or the remote component(s) of the system 104 may include the use of models. These models may be, in some examples, machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with prior user input data. The models may be trained for multiple user accounts and/or for a specific user account. As such, the machine learning models may be configured to learn, without human intervention, attributes of collected data and/or actions taken associated with device usage cessation.

It should be noted that while text data or other ASR output data is described as a type of data utilized to communicate between various components of the remote component(s) of the system 104 and/or other systems and/or devices, the components of the remote component(s) of the system 104 may use any suitable format of data to communicate. For example, the data may be in a human-readable format, such as text data or other ASR output data formatted as XML, SSML, and/or other markup language, or in a computer-readable format, such as binary, hexadecimal, etc., which may be converted to text data or other ASR output data for display by one or more devices such as the devices.

As shown in FIG. 1, several of the remote component(s) of the system 104 and the associated functionality of those components as described herein may be performed by one or more of the device(s) 102. Additionally, or alternatively, some or all of the components and/or functionalities associated with the device(s) 102 may be performed by the remote component(s) of the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 110 may possess its own local memory, which also may store program components, program data, and/or one or more operating systems.

The memory 111 and/or the memory described with respect to the components of the system 104 may include volatile and nonvolatile memory, removable and non-removable media implemented in any method or technology for storage of information, such as non-transitory computer-readable instructions, data structures, program component, or other data. Such memory 111 and/or the memory described with respect to the components of the system 104 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 111 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 111 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 111 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enca OSE) as promulgated by ENEA AB of Sweden; and so forth.

The network interface(s) 110 and/or the network interface(s) described with respect to the components of the system 104 may enable messages between the components and/or devices shown in environment 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the remote component(s) of the system 104 may be local to an environment associated the devices. For instance, the remote component(s) of the system 104 may be located within one or more of the first user device(s) 102 and/or the smart devices. In some instances, some or all of the functionality of the remote component(s) of the system 104 may be performed by one or more of the devices. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
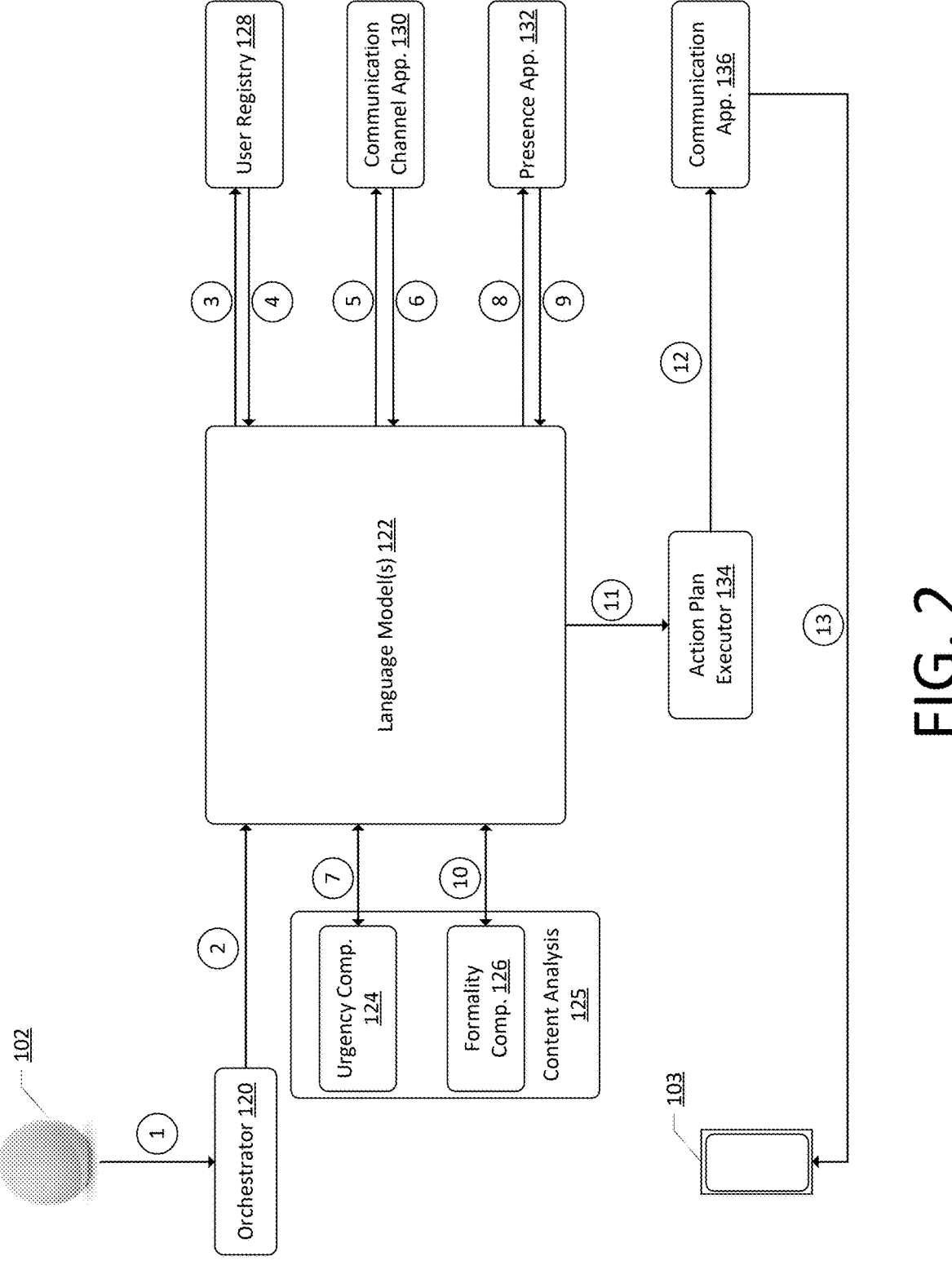
FIG. 2 illustrates a conceptual diagram of example components utilized for LM communication channel optimization.

FIG. 2 illustrates a conceptual diagram of example components utilized for LM communication channel optimization. The components illustrated in FIG. 2 may be the same or similar to the components described with respect to FIG. 1, including for example a user device 102, a recipient device 103, a LM 122, an urgency component 124 of the LM 122, a formality component 126 of the LM 122, a user registry 128, a communication channel application 130, a presence application 132, an action plan executor 134, and/or a communication application 136. Additionally, the flow of data illustrated in FIG. 2 is illustrated with respect to steps 1-13. However, it should be understood that some or all of these steps may be performed in a different order and/or in parallel, and/or more or fewer steps may be utilized to perform the operations described herein.

At step 1, a user command requesting that a message be sent may be received at the user device 102 and the user device 102 may generate user input data corresponding to the user command. In some examples, the user command may be provided in the form of a voice command via a voice user interface of the user device 102. In other examples, the user command may be provided in the form of a typed command via a graphical user interface of the user device 102. The user input data may be sent to the system 104 and may be received at the orchestrator 120.

At step 2, the orchestrator 120 may send the user input data, which may be formatted in the form of a prompt, to the LM 122 for determining what actions are to be taken in response to the user command and/or how to respond to the user command. In examples, the LM 122 may initially analyze the user input data to determine a domain associated with the user command. In the example user command of "tell Person A that they need to get to Location B right now," the LM 122 may infer that the user command is associated with a communication domain based on the user command including the phrase "tell Person A," which may indicate an intent to send a message.

At step 3, the LM 122 may then make one or more calls to one or more applications to acquire data for determining what actions should be taken responsive to the user command to send the message. In examples, one or more APIs may be utilized by the LM 122 to communicate with the other components of the system 104 such as the user registry 128, the communication channel application 130, the presence application 132, and/or the communication application 136. By way of example, the LM 122 may call the user registry 128 for contact information associated with the sender profile of the sender of the message. For example, the LM 122 may provide the user registry 128 with an indicator of the sender profile and may request contact information of potential recipient profiles that are associated with the sender profile.

At step 4, the user registry 128 may return the contact information to the LM 122, which may utilize the contact information along with the user input data to infer a recipient profile to be selected for sending the message to. By way of example, the LM 122 may determine that the portion of the user command stating "Person A" is the portion indicative of which recipient profile should be selected. The LM 122 may parse the contact information received from the user registry 128 to find a contact with the identifier of "Person A," and may select that contact as the recipient. In examples, the LM 122 may be configured to arbitrate between multiple potential recipient profiles, particularly where contact names and/or other contact information as between two or more contacts are the same or similar. By way of example, there may be two "Person A" contacts associated with the sender profile. In this example, the LM 122 may utilize the content of the message itself to determine which "Person A" should be selected, and/or the LM 122 may utilize context information such as which potential recipient has corresponded most recently with the sender, which potential recipient has a noted familial relationship to the sender, which potential recipient is most proximity to the sender, etc. It should be understood that the LM 122 may utilize any data available to it to arbitrate between potential recipient profiles to select a profile for sending the message to.

At step 5, having determined the recipient profile, the LM 122 may then query the communication channel application 130 for available devices associated with the recipient profile. The LM 122 may provide an identifier of the recipient profile as well as, in examples, context information associated with the message to be sent. For example, the LM 122 may determine that the message will be provided as audio data and in this example the LM 122 may send context information indicating that devices with an audio-output speaker are to be considered as available devices. In another example, the LM 122 may determine that the message will be provided as text data and/or image data and in this example the LM 122 may send context information indicating that devices with a display are to be considered as available devices. The communication channel application 130 may receive the request from the LM 122 and may determine devices associated with the recipient profile that are available for sending the message to.

At step 6, the communication channel application 130 may return identifiers of the available devices associated with the recipient profile as well as information indicating communication channels available to the devices. By way of example, the communication channels may include a text type communication channel where a SMS message may be sent, and/or an email type communication channel, and/or an announcement type communication channel where the message may be broadcasted from an announcement-enabled device, and/or a device-to-device type communication channel where messages may be sent to and from devices in a group of devices associated with the same account data. It should be understood that the communication channel types described herein are provided by way of nonlimiting example and that any communication channel type may be utilized. The LM 122, having received the available devices associated with the recipient profile, may infer the available communication channels for sending the message to the recipient profile. In examples, a single communication channel may be available and in this example the LM 122 may select the single communication channel for sending the message. However, in other examples, the LM 122 may determine that at least two communication channels are available for sending the message and the LM 122 may perform processes for ranking and selecting one of the communication channels.

For example, the LM 122 may communicate with the urgency component 124, which may be configured to analyze, at step 7, the content of the message itself to determine an urgency value to attribute to the message. The urgency component 124 may be associated with functionality for content analysis 125. It should be understood that other types of content analysis may be performed that differ at least in part from generating urgency scores, as the urgency component 124 is configured to do. Using the message of "tell Person A that they need to get to Location B right now," the urgency component 124 may be configured to infer that the message has a time sensitive component (i.e., "right now") as well as other components that indicate the message is an urgent message. In this example, the urgency component 124 may infer that the message has a location portion, a timing portion, and/or words that indicate a degree of urgency such as "need," "required," "now," etc. Generally, the urgency component 124 may be configured to utilize the information available to it to analyze the message to be sent and to infer how urgent the message is. An urgency value may be associated with the message and the LM 122 may determine whether that urgency value satisfies a threshold urgency value indicating that the message should be identified as an urgent message. To illustrate, the urgency component 124 may determine the urgency value on a scale, say for example from 1 to 10 with 1 being the least urgent and 10 being the most urgent. The LM 122 may set the threshold urgency value based on feedback data and/or training of the LM 122. By way of nonlimiting example, the threshold urgency value may be 7. It should be understood that any urgency value scale may be utilized.

By way of continued example, the urgency component 124 may utilize location data and/or timing data to further determine whether the message should be identified as an urgent message. To illustrate, if the message includes an indication that the recipient should be at a given location at a given time, the urgency component 124 may determine the current location of the recipient and a current time to determine whether the recipient will need to rush to get to the location noted in the message. Other information such as traffic data, weather data, historical driving data, vehicle data, scheduling data, etc. may also be utilized to assist in determining a degree of urgency of the message. To acquire the location information, the LM 122 may query, at step 8, the presence application 132, which may determine a current location of the recipient and/or may provide other presence-based signals that may be utilized to determine a geographic location of the recipient and/or a specific location of the recipient with respect to one or more devices (e.g., the recipient is in "the kitchen" near a device in the kitchen). At step 9, the presence application 132 may send the presence signals and/or presence determinations to the LM 122, and some or all of this contextual information as well as the content of the message itself may be utilized to determine if the message should be identified as an urgent message by the LM 122.

The LM 122 may also perform processes for ranking and selecting one of the communication channels by determining a formality value to attribute to the message. For example, the LM 122 may communicate with the formality component 126 of the content analysis 125, which may be configured to determine, at step 10, how formal the message is and thus which communication channel would be optimal given the formality of the message. To illustrate, some messages may be less formal such as "what's up?" "that's great!" "hello," etc. However, other messages may be more formal such as messages to teachers/professors, messages to coworkers, messages having formal subject matter, lengthy messages, etc. The formality component 126 may be configured to utilize the content of the message to be sent along with contextual information to determine a formality value to attribute to the message. If the formality value satisfies a formality value threshold, the LM 122 may determine that the message is a formal message and may select a communication channel identified for formal messages.

With respect to the content of the message itself, the content may include text with certain syntax, diction, structure, etc. that the formality component 126 may utilize to determine the formality value. For example, the message of "tell Person A dinner will be ready at 6:00 pm" may be determined to be not very formal (e.g., have a low formality value) while the message of "Dear Person C, teacher of Student D, I write to provide an update on Student D's work . . . " may be considered a more formal response based on the subject matter of the message itself. Additionally, the amount of text in the content of the message may indicate a formality of the message, where a longer message may indicate a more formal message than a shorter message. The formality component 125 may be configured to determine a threshold message length and to determine whether a given message has a length that is more than the threshold message length. Additionally, a current location of the recipient and/or recipient device 103 may inform the formality value. By way of example, if the recipient is detected at a work location, the formality value may indicate a more formal message than if the recipient is detected in a home environment. The LM 122 may communicate with the presence application 132 to acquire presence signals for determining recipient and/or recipient device location data. Additionally, in examples, the message itself may be generated utilizing the LM 122, and in this example the user input requesting that the LM 122 generate the content for the message, as well as the generated message itself, may be analyzed to determine the formality value. Additionally, the formality component 126 may determine a recipient category for the recipient of the message and the recipient category may inform the formality value. For example, certain recipients may be in a family recipient category while other recipients may be in a work recipient category, and/or a school recipient category, and/or one or more other categories. Such recipient categorization may indicate that the message should be treated as being more or less formal.

Additionally, presence signals themselves may be utilized to rank and/or select communication channels. For example, devices 103 within an environment of the recipient may be utilized to collect sensor data, and that sensor data may be analyzed by a presence application 132 to determine which of the devices 103 are proximate to the recipient and/or to determine an activity of the recipient in question. For example, a given device 103 may generate sensor data indicating that the recipient is currently engaged with the device 103. The available communication channels of that device 103 may then be utilized as potential communication channels to select from for sending the message. Additionally, a given device 103 may detect the presence of a user and/or movement of the user. In certain examples, this sensor data may indicate that the recipient is disposed in a given environment that may be more suitable for receiving the message using a certain communication channel over other communication channels. In another nonlimiting example, the sensor data may indicate that the user is moving geographic locations quickly. This may indicate that the user is running, driving a car, etc. In these examples, the LM 122 may determine to utilize a text type communication channel instead of an email type communication channel. It should be understood that the LM 122 may infer which communication channel to utilize for sending a given message based on the urgency value, the formality value, the presence signals, and/or any other signals and/or determinations described herein.

Once a communication channel is selected, the LM 122 may generate, at step 11, an action plan that indicates one or more actions to be taken to send the message. In the example utilized herein, the action plan may indicate that a message indicated by the user command is to be sent, that the selected communication channel is to be utilized to send the message, which recipient profile is selected to receive the message, and which recipient device should receive the message. The action plan may be sent to the action plan executor 134, which may be configured to read the action plan and request that components of the system 104 effectuate the action plan.

In the example used herein, the action plan executor 134 may call, at step 12, the communication application 136 to cause the message to be sent to the recipient device 103 utilizing the selected communication channel. At step 13, the communication application 136 may format the message for sending, select the chosen communication channel, and generate a directive to cause the message to be sent to the recipient device 103 utilizing the chosen communication channel.

FIGS. 3-9 illustrate processes associated with LM communication channel optimization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 10-14, although the processes may be implemented in a wide variety of other environments, architectures and systems.

Figure 3:
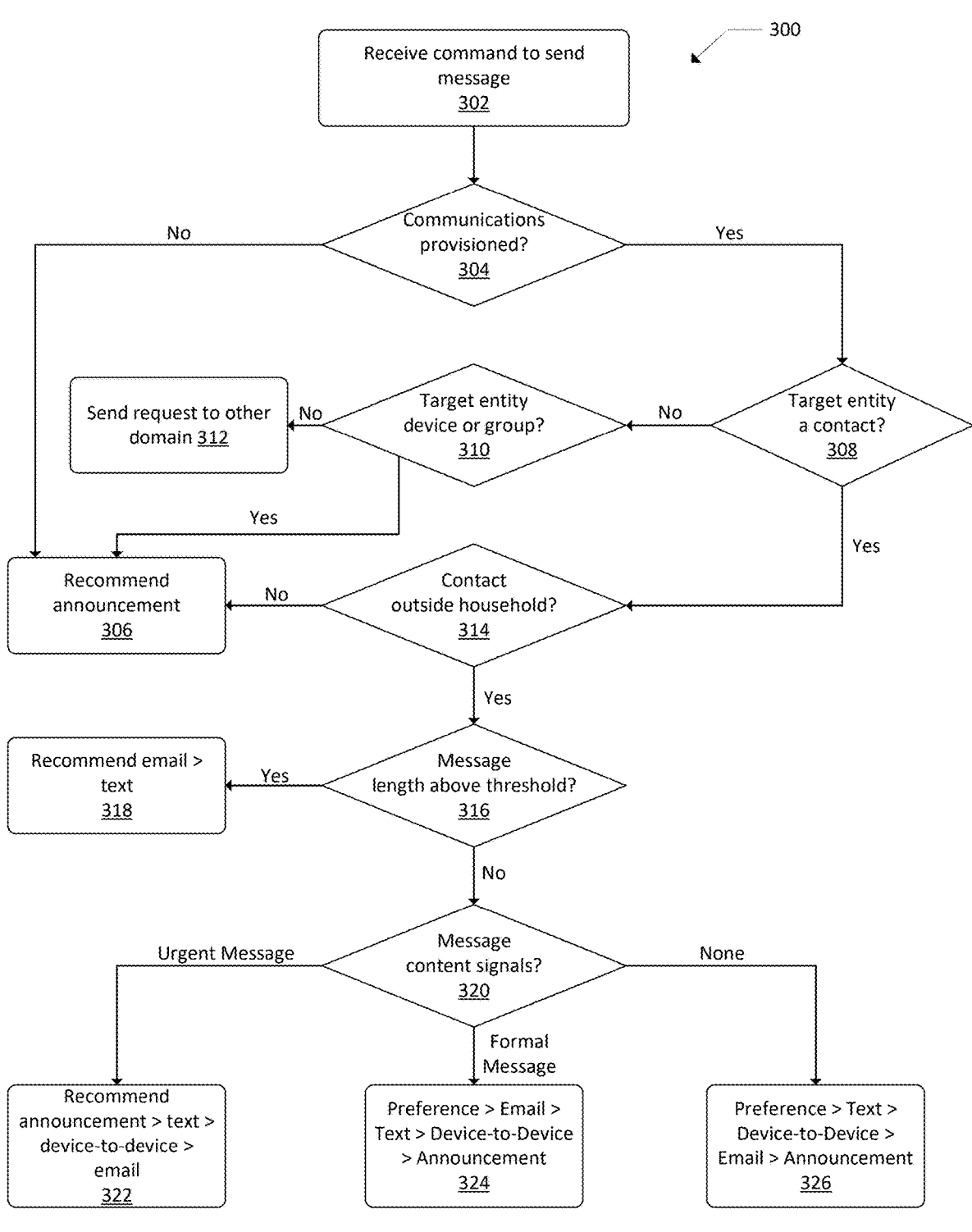
FIG. 3 illustrates a flow diagram of an example process for selecting a preferred communication channel utilizing multiple optimization techniques.

FIG. 3 illustrates a flow diagram of an example process 300 for selecting a preferred communication channel utilizing multiple optimization techniques. The order in which the operations or steps are described is not intended to be construed as a limitation, and any number of the described operations may be combined in any order and/or in parallel to implement process 300.

At block 302, the process 300 may include receiving a command to send a message. In examples, the user command requesting that a message be sent may be received at a user device and the user device may generate user input data corresponding to the user command. In some examples, the user command may be provided in the form of a voice command via a voice user interface of the user device. In other examples, the user command may be provided in the form of a typed command via a graphical user interface of the user device.

At block 304, the process 300 may include determining whether communications for the recipient profile in question are enabled. By way of example, various communication preferences and/or functionalities may be enabled or disabled for a given user profile. Some user profiles may allow for a full range of communications to be received, including utilizing any and all of the communication channels described herein. In other examples, communications may not be enabled at all, and/or a subset of possible communication channels may be enabled. The system described herein may be configured to determine the degree to which communications for the recipient profile are enabled.

In examples where communications are not enabled, the process 300 may include, at block 306, selecting an announcement type of communication channel for sending the message. In this example, the LM described herein may determine that only the announcement type communication channel is enabled for communicating with the recipient, and thus the LM may select the announcement type communication channel for sending the message. Utilizing this communication channel type, the message may be formatted as audio data to be output by a speaker of the recipient device and/or as text data to be output on a display of the recipient device. The announcement may then be broadcasted to the recipient device (and/or group of recipient devices) such that, in examples, no additional user input is needed to cause the message to be output. An example of this communication channel type may be a message such as "tell everyone that dinner is ready." Audio with the phrase "dinner is ready" may be automatically output on announcement-enabled devices associated with the recipient profile.

In examples where communications are enabled, the process 300 may include, at block 308, determining whether the target entity is a contact of the sender profile. By way of example, the LM may call a user registry for contact information associated with the sender profile of the sender of the message. For example, the LM may provide the user registry with an indicator of the sender profile and may request contact information of potential recipient profiles that are associated with the sender profile. The user registry may return the contact information to the LM, which may utilize the contact information along with the user input data to infer a recipient profile to be selected for sending the message to. In examples, the LM may be configured to arbitrate between multiple potential recipient profiles, particularly where contact names and/or other contact information as between two or more contacts are the same or similar. In this example, the LM may determine whether the target entity identified in the content of the message corresponds to at least one contact in the sender's contacts.

In examples where the target entity is not a contact of the sender profile, the process 300 may include, at block 310, determining whether the target entity is a device and/or a group of devices. In this example, a recipient (e.g., a human recipient) for the message could not be determined, but the system may still be able to determine the recipient profile if the content of the message indicated the recipient device and/or group of devices to send the message to. An example of such a message may be "send a message to the Living Room saying that dinner is ready." In this example, while a person was not identified in the message, the portion of the message corresponding to "Living Room" may indicate that the message is to be sent to a device and/or group of devices disposed in the living room space of an environment.

In examples where the target entity is not a device and/or a device group, the process 300 may include, at block 312, sending a request to service the command to another domain. In this example, the human recipient and the recipient device could not be determined, and thus a different domain may be called to service the command. This may indicate that the command itself was not, after further processing, within the communication domain. In other examples, this may indicate that additional information should be queried from the user and a feedback domain may be called to request such additional information.

Returning to block 310, in examples where the target entity is a device and/or a group of devices, the process 300 may proceed to block 306 where the announcement type communication channel may be selected for sending the message. In this example, the target entity from the response is not a contact in the sender's contacts and is not a device or group of devices associated with the sender profile. As such, the LM may default to selecting the announcement type communication channel as described in more detail above with respect to block 306.

Returning to block 308, in examples where the target entity is a contact of the sender profile, the process 300 may include, at block 314, determining whether the contact is outside a household of the sender profile. In this example, the LM may have successfully determined a given recipient profile that the message should be sent to. In some examples, the recipient profile is associated with a given household or otherwise grouping of user profiles (e.g., work profiles, school profiles, friend profiles, etc.). In other examples, while the recipient profile is one of the contacts in the sender's contacts, the recipient profile may not otherwise be associated with the household of the sender in question.

In examples where the contact is not outside a household of the sender profile, the process 300 may proceed to block 306 where the announcement type communication channel may be selected for sending the message. In this example, the LM may determine that the recipient profile is associated with the sender's household and thus the message may be sent utilizing the announcement type communication channel as a default selection for in-household communications. It should be understood, though, that the sender profile may include preference data indicating that when a message is sent to someone in the sender's household that a different default communication channel should be utilized other than the announcement type communication channel. In examples, instead of selecting the announcement type communication channel and automatically utilizing that communication channel type to send the message, the system described herein may generate a notification that the announcement type communication channel was selected and may present that notification to the user for confirmation that the announcement type communication channel should be utilized to send the message.

In examples where the contact is outside a household of the sending profile, the process 300 may include, at block 316, determining whether the message length of the message is above a threshold message length. In this example, some messages may be short and less formal than other messages. The LM may be configured to determine the threshold message length and then to determine if the length of a given message satisfies that threshold message length.

In examples where the message length is above the threshold message length, the process 300 may include, at block 318, ranking communication channel preference such that an email type communication channel is ranked more preferably than a SMS and/or text type communication channel. When the message length is above the threshold, the LM may determine to select the email type communication channel over other communication channels such as the text type communication channel. In this example, given the length of the message, the LM may determine that the most appropriate communication channel is a channel where lengthy text-based messages are sent, such as email. Similarly to the above, in certain examples the email communication channel type may be selected and automatically be utilized to send the message. However, in other examples, a notification of the email communication channel type selection may be generated and sent to the user device for confirmation. In these examples, the user may confirm that the message should be sent via email and the system may proceed in kind. In other examples, the user may select a different communication channel or otherwise indicate that the communication channel selected by the system should not be utilized. In these examples, feedback data indicating rejection of the communication channel may be generated and utilized to augment ranking of communication channels for subsequent messages. In the example associated with block 318, this feedback data may, over time, result in the text communication channel being selected instead of the email communication channel.

In examples where the message length is not above the threshold message length, the process 300 may include, at block 320, determining whether message content signals have been determined. By way of example, the LM may be configured to determine an urgency value to attribute to the message and/or a formality value to attribute to the message.

With respect to the urgency value, for example, the LM may include an urgency component, which may be configured to analyze the content of the message itself to determine an urgency value to attribute to the message. Using the message of "tell Person A that they need to get to Location B right now," the LM may be trained to infer that the message has a time sensitive component (i.e., "right now") as well as other components that indicate the message is an urgent message. In this example, the LM may infer that the message has a location portion, a timing portion, and/or words that indicate a degree of urgency such as "need," "required," "now," etc. Generally, the LM may be configured to utilize the information available to it to analyze the message to be sent and to infer how urgent the message is. An urgency value may be associated with the message and the LM may determine whether that urgency value satisfies a threshold urgency value indicating that the message should be identified as an urgent message. By way of continued example, the LM may utilize location data and/or timing data to further determine whether the message should be identified as an urgent message. To illustrate, if the message includes an indication that the recipient should be at a given location at a given time, the LM may determine the current location of the recipient and a current time to determine whether the recipient will need to rush to get to the location noted in the message. To acquire the location information, the LM may query a presence application, which may determine a current location of the recipient and/or may provide other presence-based signals that may be utilized to determine a geographic location of the recipient and/or a specific location of the recipient with respect to one or more devices (e.g., the recipient is in "the kitchen" near a device in the kitchen). Some or all of this contextual information as well as the content of the message itself may be utilized to determine if the message should be identified as an urgent message by the LM.

With respect to the formality value, For example, the LM may include a formality component, which may be configured to determine how formal the message is and thus which communication channel would be optimal given the formality of the message. To illustrate, some messages may be less formal such as "what's up?" "that's great!" "hello," etc. However, other messages may be more formal such as messages to teachers/professors, messages to coworkers, messages having formal subject matter, lengthy messages, etc. The formality component of the LM may be configured to utilize the content of the message to be sent along with contextual information to determine a formality value to attribute to the message. If the formality value satisfies a formality value threshold, the LM may determine that the message is a formal message and may select a communication channel identified for formal messages. With respect to the content of the message itself, the content may include text with certain syntax, diction, structure, etc. that the LM may utilize to determine the formality value. Additionally, the amount of text in the content of the message may indicate a formality of the message, where a longer message may indicate a more formal message than a shorter message. Additionally, a current location of the recipient and/or recipient device may inform the formality value. By way of example, if the recipient is detected at a work location, the formality value may indicate a more formal message than if the recipient is detected in a home environment. Additionally, in examples, the message itself may be generated utilizing the LM, and in this example the user input requesting that the LM generate the content for the message, as well as the generated message itself, may be analyzed to determine the formality value. Additionally, the LM may determine a recipient category for the recipient of the message and the recipient category may inform the formality value. For example, certain recipients may be in a family recipient category while other recipients may be in a work recipient category, and/or a school recipient category, and/or one or more other categories. Such recipient categorization may indicate that the message should be treated as being more or less formal.

In examples, the urgency value may be determined and the urgency value may satisfy a threshold urgency value indicating that the message is an urgent message. In these examples, at block 322, the process 300 may include ranking communication channel preference such that the announcement type communication channel is ranked more preferably than the SMS and/or text communication type communication channel, which may be ranked more preferably than a device-to-device type communication channel, which may be ranked more preferably than an email type communication channel. In this example, depending on the available communication channels for the specific recipient profile, the LM may select a communication channel based on this ranking and cause the message to be sent utilizing the selected communication channel.

In further examples, a formality value may be determined and the formality value may satisfy a threshold formality value indicating that the message is a formal message. In these examples, at block 324, the process 300 may include ranking communication channel preference such that a user preferred communication channel is ranked more preferably than the email type communication channel, which may be ranked more preferably than the text type communication channel, which may be ranked more preferably than the device-to-device type communication channel, which may be ranked more preferably than the announcement type communication channel. In this example, depending on the available communication channels for the specific recipient profile, the LM may select a communication channel based on this ranking and cause the message to be sent utilizing the selected communication channel.

In still further examples, message content signals may not be determined at block 320. In these examples, at block 326, the process 300 may include ranking communication channel preference such that the user preferred communication channel is ranked more preferably than the text type communication channel, which may be ranked more preferably than the device-to-device type communication channel, which may be ranked more preferably than the email type communication channel, which may be ranked more preferably than the announcement type communication channel. In this example, depending on the available communication channels for the specific recipient profile, the LM may select a communication channel based on this ranking and cause the message to be sent utilizing the selected communication channel.

Figure 4:
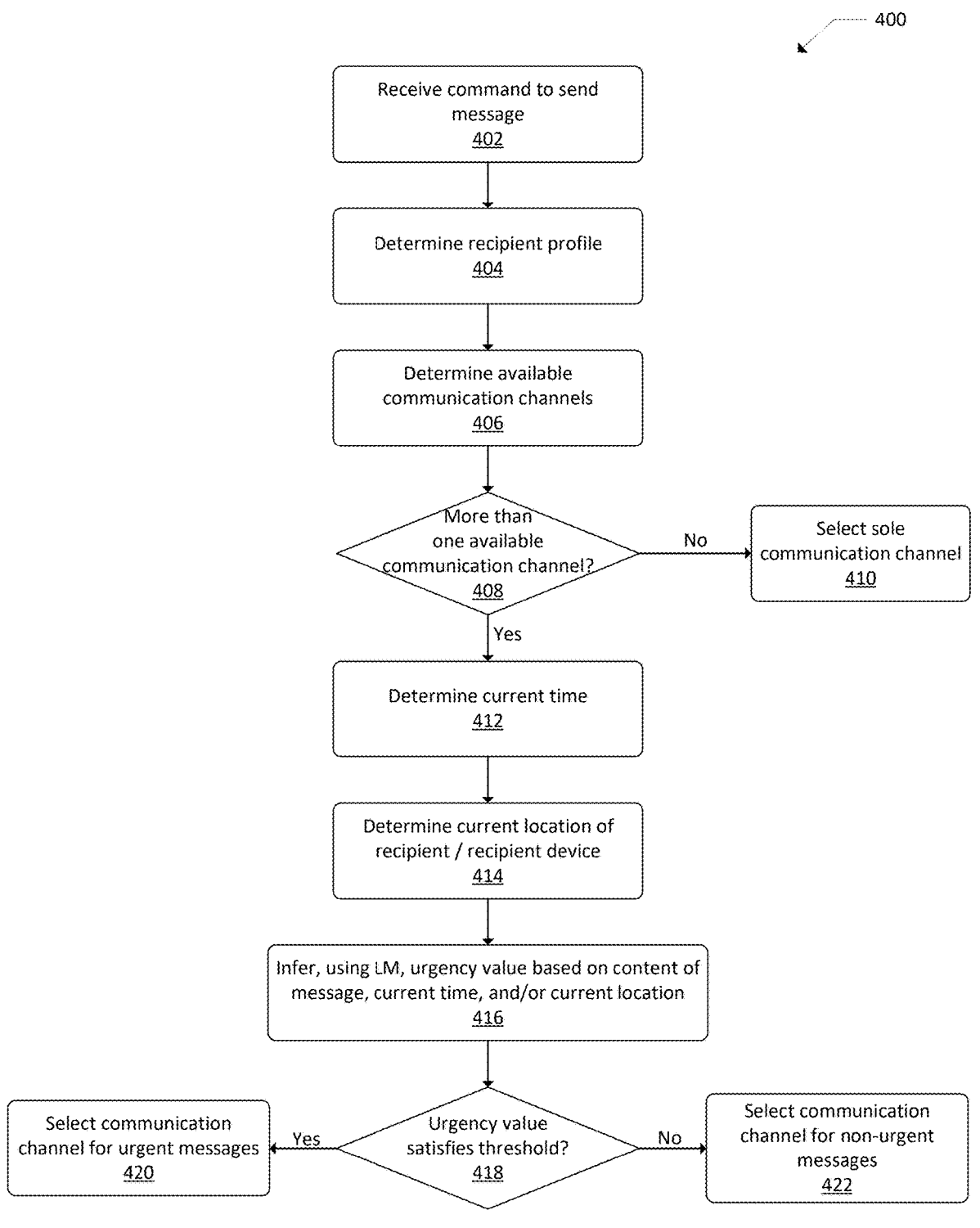
FIG. 4 illustrates a flow diagram of an example process for LM communication channel optimization utilizing urgency inference.

FIG. 4 illustrates a flow diagram of an example process 400 for LM communication channel optimization utilizing urgency inference. The order in which the operations or steps are described is not intended to be construed as a limitation, and any number of the described operations may be combined in any order and/or in parallel to implement process 400.

At block 402, the process 400 may include receiving a command to send a message. In examples, the user command requesting that a message be sent may be received at a user device and the user device may generate user input data corresponding to the user command. In some examples, the user command may be provided in the form of a voice command via a voice user interface of the user device. In other examples, the user command may be provided in the form of a typed command via a graphical user interface of the user device.

At block 404, the process 400 may include determining a recipient profile for sending the message to. By way of example, a LM may call a user registry for contact information associated with the sender profile of the sender of the message. For example, the LM may provide the user registry with an indicator of the sender profile and may request contact information of potential recipient profiles that are associated with the sender profile. The user registry may return the contact information to the LM, which may utilize the contact information along with the user input data to infer a recipient profile to be selected for sending the message to. In examples, the LM may be configured to arbitrate between multiple potential recipient profiles, particularly where contact names and/or other contact information as between two or more contacts are the same or similar.

At block 406, the process 400 may include determining available communication channels for sending the message to the recipient profile. For example, having determined the recipient profile, the LM may then query a communication channel application for available devices associated with the recipient profile. The LM may provide an identifier of the recipient profile as well as, in examples, context information associated with the message to be sent. For example, the LM may determine that the message will be provided as audio data and in this example the LM may send context information indicating that devices with an audio-output speaker are to be considered as available devices. In another example, the LM may determine that the message will be provided as text data and/or image data and in this example the LM may send context information indicating that devices with a display are to be considered as available devices. The communication channel application may receive the request from the LM and may determine devices associated with the recipient profile that are available for sending the message to. The communication channel application may then return identifiers of the available devices associated with the recipient profile as well as information indicating communication channels available to the devices. By way of example, the communication channels may include a text type communication channel where a short message service (SMS) message may be sent, and/or an email type communication channel, and/or an announcement type communication channel where the message may be broadcasted from an announcement-enabled device, and/or a device-to-device type communication channel where messages may be sent to and from devices in a group of devices associated with the same account data. It should be understood that the communication channel types described herein are provided by way of nonlimiting example and that any communication channel type may be utilized.

At block 408, the process 400 may include determining whether more than one available communication channel was identified for sending the message to the recipient profile. For example, in some situations the recipient profile in question may be associated with a single available communication channel. In other examples, while the recipient profile may be associated with multiple communication channels, one or more of the communication channels may not be available at the time when the command to send the message is received. An example of such a situation may be where the message type is associated with output of audio and not display of text and/or images, and in this example the recipient profile may be associated with multiple devices but only one of those devices may be an audio-output device. In still another example, while a recipient may be associated with multiple devices, at the time when the user command to send the request is received, presence data may indicate that only a single device with limited communication channels is near the user.

In examples where only one communication channel was identified as available for sending the message to the recipient, the process 400 may include, at block 410, selecting the sole communication channel for sending the message to the recipient profile. In this example, the LM may not need to arbitrate between communication channels because only one communication channel was recognized as been available. As such, the available communication channel may be selected and the LM may call a communication application to cause the message to be sent to the recipient profile utilizing the selected communication channel.

In examples where more than one communication channel was identified, the process 400 may include, at block 412, determining a current time. For example, to determine an urgency value as described in detail below, the LM may utilize the current time and/or another predefined time from which to determine whether the subject matter of the message is associated with a time-sensitive event and/or request. As such, the LM may query one or more components of the system described herein for a current time to be utilized as a point of reference when inferring an urgency of the message.

At block 414, the process 400 may include determining a current location of the recipient and/or the recipient device. For example, as with determining the current time as described with respect to block 412, to determine an urgency value as described in detail below, the LM may utilize a current location of the recipient and/or the recipient device to determine whether the subject matter of the message is associated with a time-sensitive event and/or request. As such, the LM may query one or more components of the system described herein, including for example a presence application described with respect to FIG. 1, to be utilized as a point of reference when inferring an urgency of the message.

At block 416, the process 400 may include inferring, using a LM, an urgency value based on content of the message, the current time, and/or the current location. For example, the LM may perform processes for ranking and selecting one of the communication channels. The LM may include an urgency component, which may be configured to analyze the content of the message itself to determine an urgency value to attribute to the message. Using the message of "tell Person A that they need to get to Location B right now," the LM may be trained to infer that the message has a time sensitive component (i.e., "right now") as well as other components that indicate the message is an urgent message. In this example, the LM may infer that the message has a location portion, a timing portion, and/or words that indicate a degree of urgency such as "need," "required," "now," etc. Generally, the LM may be configured to utilize the information available to it to analyze the message to be sent and to infer how urgent the message is. An urgency value may be associated with the message and the LM may determine whether that urgency value satisfies a threshold urgency value indicating that the message should be identified as an urgent message.

By way of continued example, the LM may utilize location data and/or timing data to further determine whether the message should be identified as an urgent message. To illustrate, if the message includes an indication that the recipient should be at a given location at a given time, the LM may determine the current location of the recipient and the current time to determine whether the recipient will need to rush to get to the location noted in the message. To acquire the location information, the LM may query a presence application, which may determine a current location of the recipient and/or may provide other presence-based signals that may be utilized to determine a geographic location of the recipient and/or a specific location of the recipient with respect to one or more devices (e.g., the recipient is in "the kitchen" near a device in the kitchen). Some or all of this contextual information as well as the content of the message itself may be utilized to determine if the message should be identified as an urgent message by the LM.

At block 418, the process 400 may include determining whether the urgency value satisfies a threshold urgency value. For example, the LM may be configured to determine a threshold urgency value and to compare the determined urgency value to the threshold urgency value. As described above in more detail, the LM may determine the threshold urgency value dynamically and the threshold urgency value may be utilized universally and/or for a group of users, and/or the threshold urgency value may be unique to the sender profile in question.

In examples where the urgency value satisfies the threshold urgency value, the process 400 may include, at block 420, selecting a communication channel predetermined for urgent messages to send the message with. In this example, the LM may rank potential communication channels and select the highest ranked communication channel that was available for the recipient profile in question. In examples, such a ranking may be to utilize the announcement type communication channel before using the text type communication channel, which may be used before the device-to-device communication channel, which may be used before the email type communication channel.

In examples where the urgency value does not satisfy the threshold urgency value, the process 400 may include, at block 422, selecting a communication channel indicated for non-urgent messages to send the message with. In this example, the LM may rank potential communication channels and select the highest ranked communication channel that was available for the recipient profile in question. In examples, such a ranking may be to utilize a preferred communication channel type for the sender and/or recipient before using a text type communication channel, which may be used before the device-to-device type communication channel, which may be used before the email type communication channel, which may be used before the announcement type communication channel.

Figure 5:
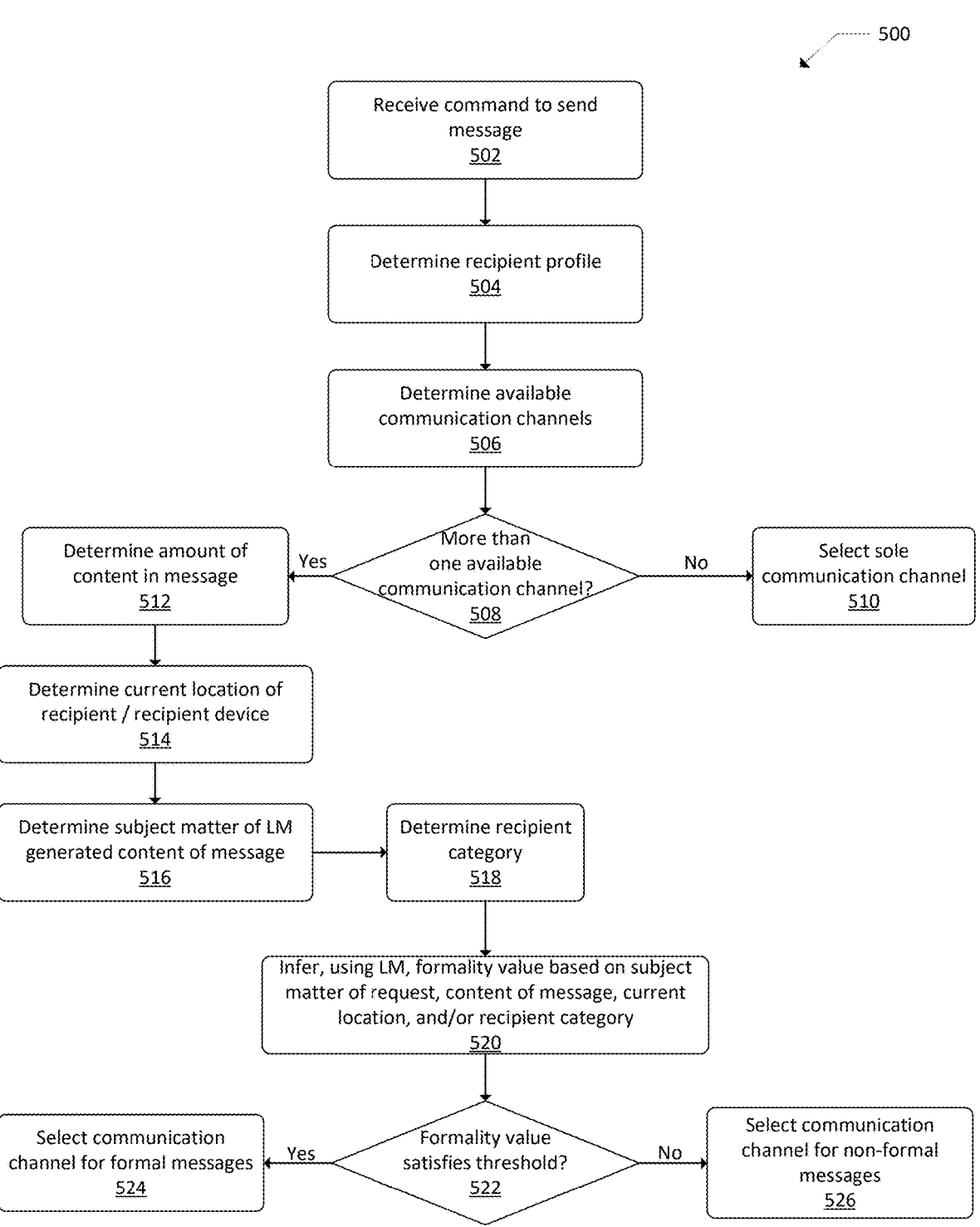
FIG. 5 illustrates a flow diagram of an example process for LM communication channel optimization utilizing formality inference.

FIG. 5 illustrates a flow diagram of an example process 500 for LM communication channel optimization utilizing formality inference. The order in which the operations or steps are described is not intended to be construed as a limitation, and any number of the described operations may be combined in any order and/or in parallel to implement process 500.

At block 502, the process 500 may include receiving a command to send a message. In examples, the user command requesting that a message be sent may be received at a user device and the user device may generate user input data corresponding to the user command. In some examples, the user command may be provided in the form of a voice command via a voice user interface of the user device. In other examples, the user command may be provided in the form of a typed command via a graphical user interface of the user device.

At block 504, the process 500 may include determining a recipient profile for sending the message to. By way of example, a LM may call a user registry for contact information associated with the sender profile of the sender of the message. For example, the LM may provide the user registry with an indicator of the sender profile and may request contact information of potential recipient profiles that are associated with the sender profile. The user registry may return the contact information to the LM, which may utilize the contact information along with the user input data to infer a recipient profile to be selected for sending the message to. In examples, the LM may be configured to arbitrate between multiple potential recipient profiles, particularly where contact names and/or other contact information as between two or more contacts are the same or similar.

At block 506, the process 400 may include determining available communication channels for sending the message to the recipient profile. For example, having determined the recipient profile, the LM may then query a communication channel application for available devices associated with the recipient profile. The LM may provide an identifier of the recipient profile as well as, in examples, context information associated with the message to be sent. For example, the LM may determine that the message will be provided as audio data and in this example the LM may send context information indicating that devices with an audio-output speaker are to be considered as available devices. In another example, the LM may determine that the message will be provided as text data and/or image data and in this example the LM may send context information indicating that devices with a display are to be considered as available devices. The communication channel application may receive the request from the LM and may determine devices associated with the recipient profile that are available for sending the message to. The communication channel application may then return identifiers of the available devices associated with the recipient profile as well as information indicating communication channels available to the devices. By way of example, the communication channels may include a text type communication channel where a SMS message may be sent, and/or an email type communication channel, and/or an announcement type communication channel where the message may be broadcasted from an announcement-enabled device, and/or a device-to-device type communication channel where messages may be sent to and from devices in a group of devices associated with the same account data. It should be understood that the communication channel types described herein are provided by way of nonlimiting example and that any communication channel type may be utilized.

At block 508, the process 500 may include determining whether more than one available communication channel was identified for sending the message to the recipient profile. For example, in some situations the recipient profile in question may be associated with a single available communication channel. In other examples, while the recipient profile may be associated with multiple communication channels, one or more of the communication channels may not be available at the time when the command to send the message is received. An example of such a situation may be where the message type is associated with output of audio and not display of text and/or images, and in this example the recipient profile may be associated with multiple devices but only one of those devices may be an audio-output device. In still another example, while a recipient may be associated with multiple devices, at the time when the user command to send the request is received, presence data may indicate that only a single device with limited communication channels is near the user.

In examples where only one communication channel was identified as available for sending the message to the recipient, the process 500 may include, at block 510, selecting the sole communication channel for sending the message to the recipient profile. In this example, the LM may not need to arbitrate between communication channels because only one communication channel was recognized as been available. As such, the available communication channel may be selected and the LM may call a communication application to cause the message to be sent to the recipient profile utilizing the selected communication channel.

In examples where more than one communication channel was identified, the process 500 may include, at block 512, determining an amount of content in the message. For example, the amount of text in the content of the message may indicate a formality of the message, where a longer message may indicate a more formal message than a shorter message. The LM may be configured to determine a threshold message length and to determine whether a given message has a length that is more than the threshold message length.

At block 514, the process 500 may include determining a current location of the recipient and/or the recipient device. For example, to determine a formality value as described in detail below, the LM may utilize a current location of the recipient and/or the recipient device to determine whether the subject matter of the message is associated with a more formal message. As such, the LM may query one or more components of the system described herein, including for example a presence application described with respect to FIG. 1, to be utilized as a point of reference when inferring a formality of the message.

At block 516, the process 500 may include determining a subject matter of the LM-generated content of the message. In this example, the user command may be for the LM to generate the message to be sent to the recipient profile. When this occurs, the LM may be configured to analyze the response as generated by the LM and/or to analyze the request to generate the message to determine a subject matter thereof. The subject matter of the request and/or the generated message may be utilized as described in more detail below to determine a formality value to attribute to the message.

At block 518, the process 500 may include determining a recipient category of the recipient to receive the message. For example, certain recipients may be in a family recipient category while other recipients may be in a work recipient category, and/or a school recipient category, and/or one or more other categories. Such recipient categorization may indicate that the message should be treated as being more or less formal. The LM may determine the recipient category based at least in part on the contact information associated with the recipient, user profile data associated with the recipient, analysis of the content of the message itself, and/or utilizing any other data available to the LM.

At block 520, the process 500 may include inferring, using the LM, the formality value based on the subject matter of the request, the content of the message, the current location data, and/or the recipient category. For example, the LM may perform processes for ranking and selecting one of the communication channels by determining a formality value to attribute to the message. For example, the LM may include a formality component, which may be configured to determine how formal the message is and thus which communication channel would be optimal given the formality of the message. To illustrate, some messages may be less formal such as "what's up?" "that's great!" "hello," etc. However, other messages may be more formal such as messages to teachers/professors, messages to coworkers, messages having formal subject matter, lengthy messages, etc.

The formality component of the LM may be configured to utilize the content of the message to be sent along with contextual information to determine a formality value to attribute to the message. If the formality value satisfies a formality value threshold, the LM may determine that the message is a formal message and may select a communication channel identified for formal messages. With respect to the content of the message itself, the content may include text with certain syntax, diction, structure, etc. that the LM may utilize to determine the formality value. The subject matter of the message may be determined as described above, and the LM may be configured to infer whether the subject matter is associated with a subject matter category that is indicated as being more formal and/or confidential and/or sensitive. Some examples of such subject matter categories may include business-related messages, messages with personal identifying information, messages with health-related information, etc.

Additionally, the amount of text in the content of the message may indicate a formality of the message, where a longer message may indicate a more formal message than a shorter message. Additionally, the current location of the recipient and/or recipient device may inform the formality value. By way of example, if the recipient is detected at a work location, the formality value may indicate a more formal message than if the recipient is detected in a home environment. Additionally, in examples, the message itself may be generated utilizing the LM, and in this example the user input requesting that the LM generate the content for the message, as well as the generated message itself, may be analyzed to determine the formality value. Additionally, the LM may determine the recipient category for the recipient of the message and the recipient category may inform the formality value. For example, certain recipients may be in a family recipient category while other recipients may be in a work recipient category, and/or a school recipient category, and/or one or more other categories. Such recipient categorization may indicate that the message should be treated as being more or less formal.

At block 522, the process 500 may include determining whether the formality value satisfies a threshold formality value. For example, the LM may be configured to determine a threshold formality value and to compare the determined formality value to the threshold formality value. As described above in more detail, the LM may determine the threshold formality value dynamically and the threshold formality value may be utilized universally and/or for a group of users, and/or the threshold formality value may be unique to the sender profile in question.

In examples where the formality value satisfies the threshold formality value, the process 500 may include, at block 524, selecting a communication channel predetermined for formal messages to send the message with. In this example, the LM may rank potential communication channels and select the highest ranked communication channel that was available for the recipient profile in question. In examples, such a ranking may be to utilize a preferred communication channel type for the sender and/or recipient before using an email type communication channel, which may be used before the text type communication channel, which may be used before the device-to-device type communication channel, which may be used before the announcement type communication channel.

In examples where the formality value does not satisfy the threshold formality value, the process 500 may include, at block 526, selecting a communication channel indicated for non-formal messages to send the message with. In this example, the LM may rank potential communication channels and select the highest ranked communication channel that was available for the recipient profile in question. In examples, such a ranking may be to utilize a preferred communication channel type for the sender and/or recipient before using a text type communication channel, which may be used before the device-to-device type communication channel, which may be used before the email type communication channel, which may be used before the announcement type communication channel.

Figure 6:
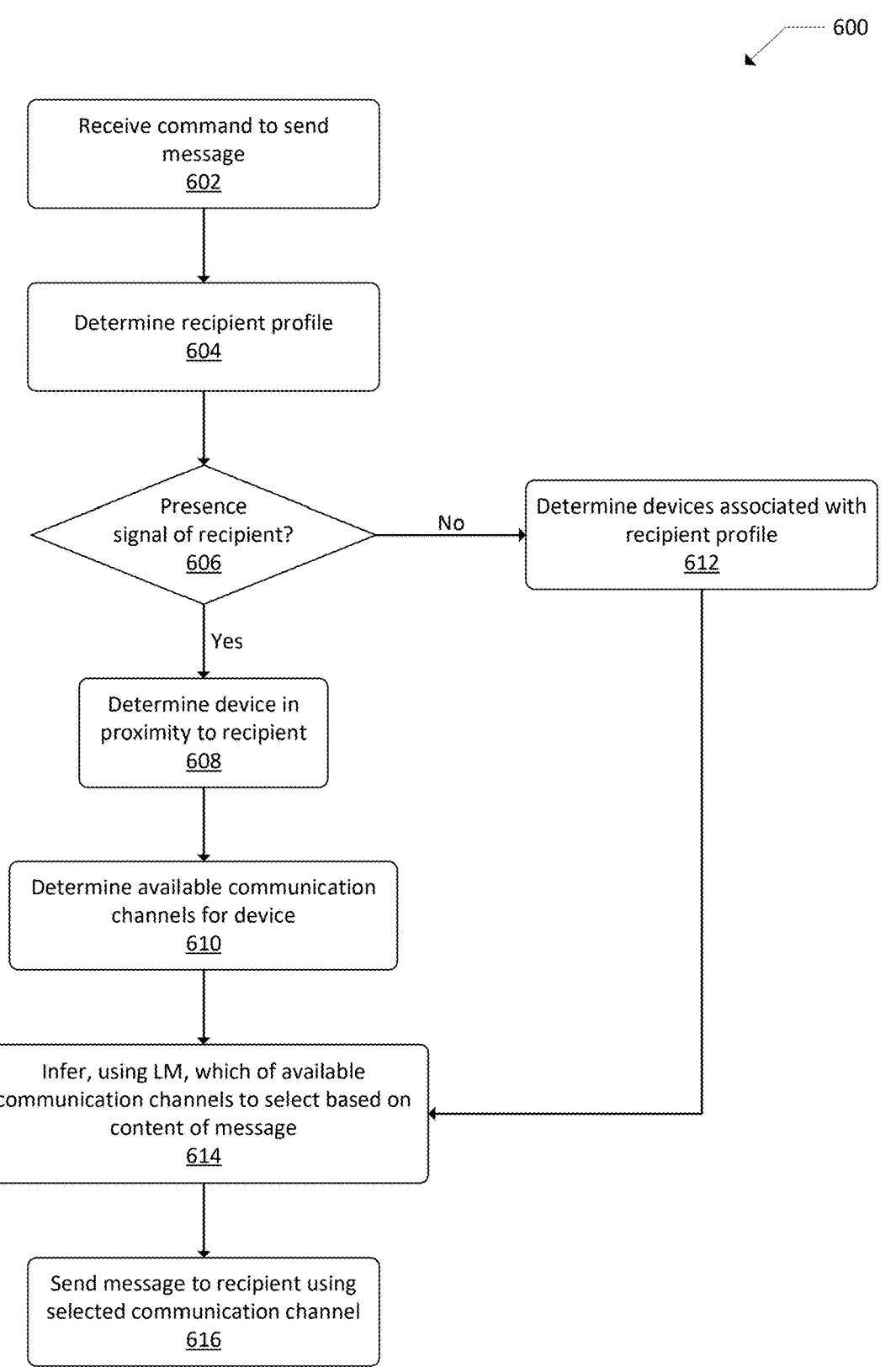
FIG. 6 illustrates a flow diagram of an example process for LM communication channel optimization utilizing presence signals.

FIG. 6 illustrates a flow diagram of an example process 600 for LM communication channel optimization utilizing presence signals. The order in which the operations or steps are described is not intended to be construed as a limitation, and any number of the described operations may be combined in any order and/or in parallel to implement process 600.

At block 602, the process 600 may include receiving a command to send a message. In examples, the user command requesting that a message be sent may be received at a user device and the user device may generate user input data corresponding to the user command. In some examples, the user command may be provided in the form of a voice command via a voice user interface of the user device. In other examples, the user command may be provided in the form of a typed command via a graphical user interface of the user device.

At block 604, the process 600 may include determining a recipient profile for sending the message to. By way of example, a LM may call a user registry for contact information associated with the sender profile of the sender of the message. For example, the LM may provide the user registry with an indicator of the sender profile and may request contact information of potential recipient profiles that are associated with the sender profile. The user registry may return the contact information to the LM, which may utilize the contact information along with the user input data to infer a recipient profile to be selected for sending the message to. In examples, the LM may be configured to arbitrate between multiple potential recipient profiles, particularly where contact names and/or other contact information as between two or more contacts are the same or similar.

At block 606, the process 600 may include determining whether a presence signal of the recipient has been received. For example, the LM may query a presence application, which may determine a current location of the recipient and/or may provide other presence-based signals that may be utilized to determine a geographic location of the recipient and/or a specific location of the recipient with respect to one or more devices (e.g., the recipient is in "the kitchen" near a device in the kitchen). In examples, a presence detection module may use one or more models to analyze audio data to determine if a user is present and/or an activity being performed by a user. The presence detection module may include a number of components to process and analyze the audio data. Audio data, such as feature vectors, and/or raw audio data may be input into a frame scorer which may operate a trained model using machine learning techniques (such as a DNN sound classifier) to score particular audio data as likely corresponding to human presence or not. For example, the frame scorer may process a feature vector representing a frame's worth of audio data and create a score representing a probability that the frame corresponds to user presence and/or a probability that the frame corresponds to a user performing a particular activity. The score may be a binary indicator (for example, 0 for no human/activity detected, 1 for human/activity detected) or may be a different value indicating a probability or likelihood of human/activity presence. The scores may be passed to a temporal aggregation machine learning techniques to determine whether an incoming frame level score is sufficient to decide whether the frame should be classified as human/activity detected YES or human/activity detected NO, represented by frame decision. In making a decision for a particular frame, the temporal aggregation component may consider the score from the individual frame as well as potentially scores from other frames (e.g., a certain number of frames coming before or after) as well as reference frame-level scores to align the output of the temporal aggregation component.

The temporal aggregation component may operate an HMM to alternate states between human/activity detected YES and human/activity detected NO. One example of such operation is a state machine approach. State S=O may correspond to no human/activity presence detected while state S=1 corresponds to human/activity presence detected. The probability of staying at state 0 is indicated as $P_{0\ to\ 0}$. The device will stay at state 0 (for example when going from frame t to frame t+1) as represented by $S_{t+1}=P_t^*(1-a)+f_t^*a$ where $f_t$ is the frame level score for frame t, a is a configurable attack rate (e.g., a factor representing how quickly the system should transition from no presence detected to presence detected), and $P_t$ represents a weighted sum/cumulated version of $f_t$. $P_t$ may be set to an initial value (e.g., 1) and then may decay based on the formula for $P_{t+1}$ shown below. The device will stay at state 0 if $P_t^*(1-a)+f_t^*a<T_{0to1}$ where $T_{0to1}$ represents a configurable score threshold for transitioning from state 0 to state 1. Otherwise, the device will transition from state 0 to state 1 (e.g., $P_{t+1}=1$, shown as $P_{0\ to\ 1}$) if $P_t^*(1-a)+f_t^*a\ T_{0to1}$.

The device may stay at state 1 (shown as $P_{1\ to\ 1}$) as represented by $P_{t+1}=P_t^*r\ f_t^*(1-r)$ where r is a configurable release rate (e.g., a factor representing how quickly the system should transition from presence detected to no presence detected). The device will stay at state 1 if $P_t^*r+f_t^*(1-r)>T_{1to0}$ where $T_{1to0}$ represents a configurable score threshold for transitioning from state 1 to state 0. Otherwise the device will transition from state 1 to state 0 (e.g., $P_{t+1}=0$, shown as $P_{1\ to\ 0}$) if $P_t^*r+f_t^*(1-r)\leq T_{1to0}$. Thresholds $T_{0to1}$ and $T_{1to0}$ and may be different, or may be the same.

While the decision is described as a frame decision, a decision may be made on groups of frames rather than (or in addition to) individual frames. Certain frames may be grouped and analyzed to decide whether the frames correspond to human presence being detected. Further, a classifier may be used to determine a presence decision for a frame or group of frames.

The temporal aggregation component may apply certain smoothing to avoid rapid changes in the frame decision (e.g., rapid state transitions). Such smoothing may account for natural pauses or breaks in audio that may not necessarily indicate a change in whether a human is present. For example, if the system detects washing dishes, then detects a momentary silence, then detects washing dishes again, the frames during the silence may correspond to scores corresponding to no presence detected even if the human who was washing is still in the vicinity of the device. To account for such audio fluctuations the temporal aggregation component 1404 may wait to change a state (e.g., a frame decision) until a certain minimum number of frames are seen that have scores on the same side of the threshold. This minimum may be configured and may be different depending on which side of which threshold the frames appear.

Frame decisions may be passed to a presence indication generator. The presence indication generator generates a periodic presence indicator which indicates the presence status at a particular point in time. The presence indication generator may generate a presence indicator according to a periodic schedule, for example every 5 seconds, 10 seconds, or the like. The presence indicator may be a representation of the frame decision taken at a particular moment in time. For example, if at time t, the frame decision is 1, the presence indicator corresponding to time t will be 1. Similarly, if at time t+30 seconds the frame decision is 1, the presence indicator for time t+30 will be 1, even if the frame decision for frames t+1 through t+29 were all 0. Alternatively, the presence indicator may be an average binary representation of the majority of frame decisions taken over a period of time. In the above example, the frame decision at t may be 1, but then if the frame decision for frames t+1 through t+29 were all 0, the frame decision for time t+30 will also be 0, even if the frame decision for time t+30 is 1. The presence indicator may also be calculated in other manners.

In other examples, computer vision may be utilized to detect recipient presence. When image data is described herein as being analyzed, that analysis may include the use of computer vision to identify objects depicted in the image data. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multidimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

In examples where a presence signal for the recipient has been received, the process 600 may include, at block 608, determining a device that is in proximity to the recipient. For example, the presence signals may be utilized to determine a device and/or multiple devices that are proximate to the recipient, including those devices that may have provided the presence signal.

At block 610, the process 600 may include determining available communication channels for the device that is in proximity to the recipient. For example, having determined the recipient profile, the LM may then query a communication channel application for the device that is proximate to the recipient. The LM may provide an identifier of the recipient profile as well as, in examples, context information associated with the message to be sent. For example, the LM may determine that the message will be provided as audio data and in this example the LM may send context information indicating that devices with an audio-output speaker are to be considered as available devices. In another example, the LM may determine that the message will be provided as text data and/or image data and in this example the LM may send context information indicating that devices with a display are to be considered as available devices. The communication channel application may receive the request from the LM and may return identifiers of the communication channels associated with the device that is proximate to the recipient. By way of example, the communication channels may include a text type communication channel where a SMS message may be sent, and/or an email type communication channel, and/or an announcement type communication channel where the message may be broadcasted from an announcement-enabled device, and/or a device-to-device type communication channel where messages may be sent to and from devices in a group of devices associated with the same account data. It should be understood that the communication channel types described herein are provided by way of nonlimiting example and that any communication channel type may be utilized.

Returning to block 606, in examples where a presence signal of the recipient has not been received, the process 600 may include, at block 612, determining devices associated with the recipient profile. This process may be the same or similar to the processes described with respect to block 610, albeit instead of returning communication channels for the specific device that is proximate to the recipient, the communication channel application may return device identifiers for the devices that are associated with the recipient (even if a presence signal is not received from one or more of those devices). The available communication channels of those devices may then be determined and may be utilized as potential communication channels to be selected from for sending the message to the recipient.

At block 614, the process 600 may include inferring, using the LM, which of the available communication channels to select based on content of the message in question. For example, an urgency value may be determined as described in more detail in FIG. 4 and/or a formality value may be determined as described in more detail in FIG. 5. These values and/or the presence information may be utilized to infer which of the available communication channels should be selected.

At block 616, the process 600 may include sending the message to the recipient using the selected communication channel. For example, the LM may generate an action plan that indicates one or more actions to be taken to send the message. In the example utilized herein, the action plan may indicate that a message indicated by the user command is to be sent, that the selected communication channel is to be utilized to send the message, which recipient profile is selected to receive the message, and which recipient device should receive the message. The action plan may be sent to an action plan executor, which may be configured to read the action plan and request that components of the system effectuate the action plan. In the example used herein, the action plan executor may call the communication application to cause the message to be sent to the recipient device utilizing the selected communication channel.

Figure 7:
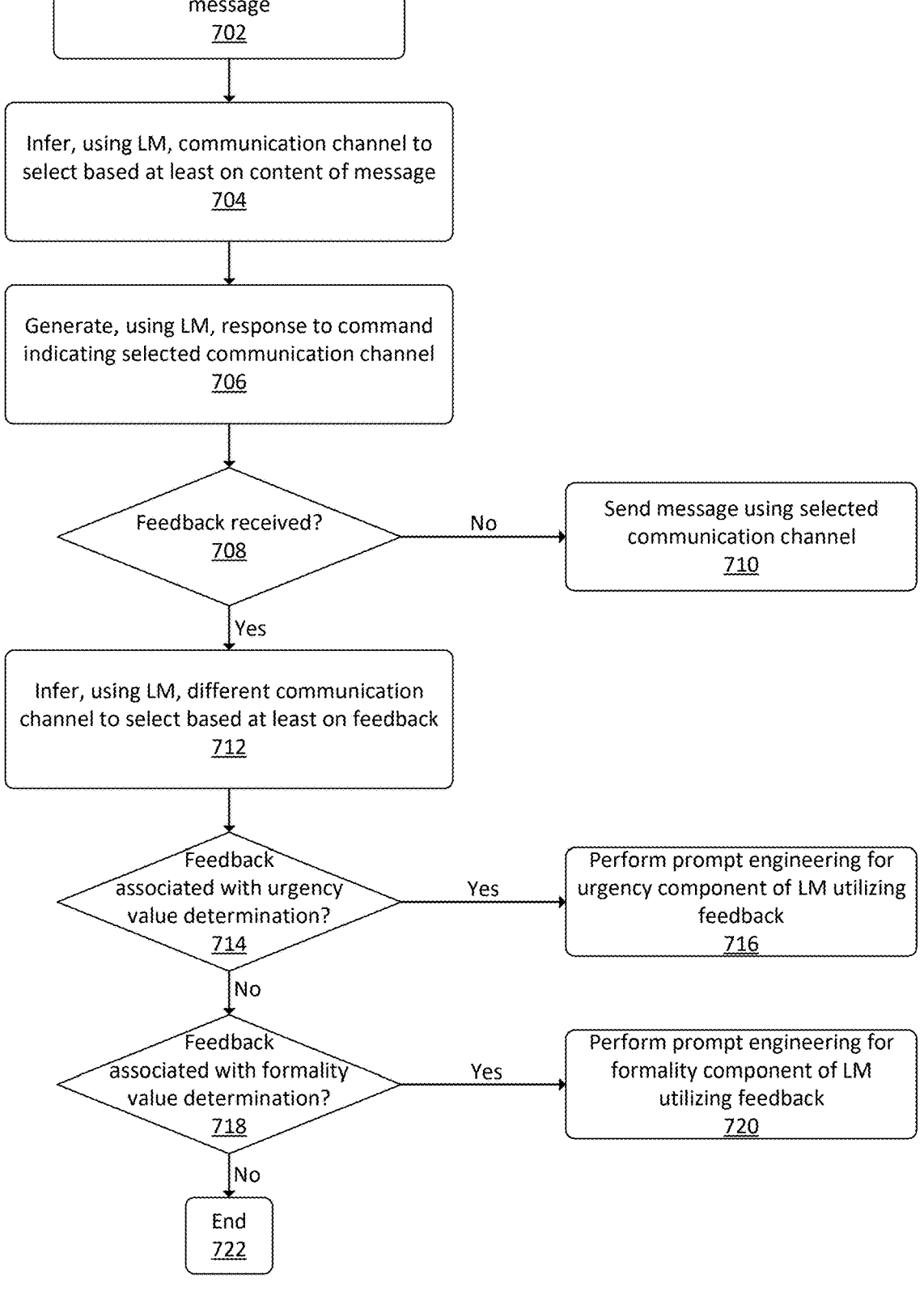
FIG. 7 illustrates a flow diagram of an example process for utilizing feedback data to train LMs associated with communication channel optimization.

FIG. 7 illustrates a flow diagram of an example process 700 for utilizing feedback data to train LMs associated with communication channel optimization. The order in which the operations or steps are described is not intended to be construed as a limitation, and any number of the described operations may be combined in any order and/or in parallel to implement process 700.

At block 702, the process 700 may include receiving a command to send a message. In examples, the user command requesting that a message be sent may be received at a user device and the user device may generate user input data corresponding to the user command. In some examples, the user command may be provided in the form of a voice command via a voice user interface of the user device. In other examples, the user command may be provided in the form of a typed command via a graphical user interface of the user device.

At block 704, the process 700 may include inferring, using the LM, a communication channel to select based at least on content of the message. For example, an urgency value may be determined as described in more detail in FIG. 4 and/or a formality value may be determined as described in more detail in FIG. 5. These values and/or the presence information may be utilized to infer which of the available communication channels should be selected. In addition to the content of the message being utilized to infer the communication channel to select, the LMs described herein may utilize historical preference data to infer a communication channel. As described above, users may send messages over time and in examples communication channels for sending those messages may be inferred. Notifications of the selected communication channels may be generated and sent to users for confirmation and/or rejection thereof. As user feedback is received over time, historical preference information may be generated from the user feedback. This historical preference information may be utilized, along with some or all of the other data described herein, to infer communication channel selection for subsequent messages.

At block 706, the process 700 may include generating, using the LM, a response to the command indicating the selected communication channel. For example, the LM may be configured to generate audio data, text data, and/or image data to be presented to the user that indicates which communication channel was selected and/or why the selected communication channel was ranked most favorably. An example of such a generated response may include "I'll send the message via email because it doesn't look like the message is urgent but it does look formal. Send it?" This may provide an opportunity for the user to provide feedback based on the response that was presented.

At block 708, the process 700 may include determining whether feedback has been received from the user related to the response. For example, using the generated response above, the user may simply say "yes" or "no." When this occurs, the system may determine that utilizable feedback has not been received. However, in other examples, the user may say "no, send the message via text" or "announce the message instead" or some other feedback indicating that the selected communication channel is not the preferred channel.

In examples where feedback is not received, the process 700 may include, at block 710, sending the message using the selected communication channel. In this example, while an answer to the generated response may be received (here the answer being "yes"), the response may not correspond to actionable feedback. Thus, the LM may generate an action plan that indicates one or more actions to be taken to send the message. In the example utilized herein, the action plan may indicate that a message indicated by the user command is to be sent, that the selected communication channel is to be utilized to send the message, which recipient profile is selected to receive the message, and which recipient device should receive the message. The action plan may be sent to an action plan executor, which may be configured to read the action plan and request that components of the system effectuate the action plan. In the example used herein, the action plan executor may call the communication application to cause the message to be sent to the recipient device utilizing the selected communication channel.

In examples where feedback is received, the process 700 may include, at block 712, inferring, using the LM, a different communication channel to select based at least on the feedback. In this example, the LM may analyze the feedback data to infer that (1) a different communication channel should be selected and (2) which communication channel should now be selected. The LM may select the different communication channel utilizing the next most favorable communication channel from the ranked communication channels and/or the LM may select the different communication channel utilizing the content of the feedback itself, particularly where the content includes an identifier of a communication channel.

At block 714, the process 700 may include determining whether the feedback from the user is associated with an urgency value determination made by the LM when selecting the communication channel. In this example, the LM may analyze the content of the feedback to determine if the content is associated with the urgency value determination. For example, the generated response as output to the user may indicate that the communication channel was selected because the system determined that the message was an urgent message. The user may respond by saying, for example, "the message isn't urgent."

In examples where the feedback is associated with the urgency value determination, the process 700 may include, at block 716, performing prompt engineering for an urgency component of the LM utilizing the feedback data. In this example, a training dataset may be generated from the feedback data and the training dataset may be utilized to train a prompt generation component of the system configured to generate prompts for the LM to consume for determining urgency values. In examples, the use of feedback data in this manner and/or for any other training purposes may be performed in instances where user consent to utilize such feedback has been provided.

In examples where the feedback is not associated with the urgency value determination, the process 700 may include, at block 718, determining whether the feedback is associated with a formality value determination made by the LM when selecting the communication channel. Similarly to block 714, the generated response as output to the user may indicate that the communication channel was selected because the system determined that the message was a formal message. The user may response by saying, for example, "the message isn't formal."

In examples where the feedback is associated with the formality value determination, the process 700 may include, at block 720, performing prompt engineering for a formality component of the LM utilizing the feedback data. In this example, a training dataset may be generated from the feedback data and the training dataset may be utilized to train a prompt generation component of the system configured to generate prompts for the LM to consume for determining formality values. In examples, the use of feedback data in this manner and/or for any other training purposes may be performed in instances where user consent to utilize such feedback has been provided.

In examples where the feedback is not associated with the formality value determination, the process 700 may end at block 722. In this example, while feedback was received that could be utilized for selecting a different communication channel in a runtime scenario, the system may determine not to retrain the LM and/or components thereof because the feedback data was not sufficient for such training. This may occur, for example, when the feedback is ambiguous, differs from prior feedback received from the user, indicates a specific request for communication channel selection that should not be utilized for future selections, etc.

FIG. 8 illustrates a flow diagram of an example process 800 for LM communication channel optimization. The order in which the operations or steps are described is not intended to be construed as a limitation, and any number of the described operations may be combined in any order and/or in parallel to implement process 800.

At block 802, the process 800 may include receiving user input data including: a command to send a message, the command omitting a communication channel identifier for sending the message; and the message. In some examples, the command provided by the user may include an identifier of the communication channel to be utilized for sending the message. An example of such a situation may be a user command such as "send a text message to Person A saying 'hello'." In this example, a text type communication channel may be selected for sending the message based on the user command itself including the phrase "text message" or a similar communication channel indicator. However, in other examples, the user command may not include a communication channel identifier and/or the communication channel identifier provided in the user command may not correspond to a preferred communication channel based on the content of the message. An example of such a situation may be a user command such as "tell Person A that they need to get to Location B right now." In this example, the user command does not include an identifier of the communication channel to be utilized, and thus it would be beneficial to infer the preferred communication channel to be utilized for sending the message.

At block 804, the process 800 may include determining, using a LM, a recipient profile to send the message to. By way of example, a LM may call a user registry for contact information associated with the sender profile of the sender of the message. For example, the LM may provide the user registry with an indicator of the sender profile and may request contact information of potential recipient profiles that are associated with the sender profile. The user registry may return the contact information to the LM, which may utilize the contact information along with the user input data to infer a recipient profile to be selected for sending the message to. In examples, the LM may be configured to arbitrate between multiple potential recipient profiles, particularly where contact names and/or other contact information as between two or more contacts are the same or similar.

At block 806, the process 800 may include querying, by the LM, a communication channel application for first data indicating communication channels available for sending the message to the recipient profile. For example, having determined the recipient profile, the LM may then query a communication channel application for available devices associated with the recipient profile. The LM may provide an identifier of the recipient profile as well as, in examples, context information associated with the message to be sent. For example, the LM may determine that the message will be provided as audio data and in this example the LM may send context information indicating that devices with an audio-output speaker are to be considered as available devices. In another example, the LM may determine that the message will be provided as text data and/or image data and in this example the LM may send context information indicating that devices with a display are to be considered as available devices. The communication channel application may receive the request from the LM and may determine devices associated with the recipient profile that are available for sending the message to.

At block 808, the process 800 may include receiving, at the LM, the first data indicating the communication channels. For example, the communication channel application may then return identifiers of the available devices associated with the recipient profile as well as information indicating communication channels available to the devices. By way of example, the communication channels may include a text type communication channel where a SMS message may be sent, and/or an email type communication channel, and/or an announcement type communication channel where the message may be broadcasted from an announcement-enabled device, and/or a device-to-device type communication channel where messages may be sent to and from devices in a group of devices associated with the same account data. It should be understood that the communication channel types described herein are provided by way of nonlimiting example and that any communication channel type may be utilized.

At block 810, the process 800 may include determining, from the first data, that the communication channels available for sending the message include at least two communication channels. For example, in some situations the recipient profile in question may be associated with a single available communication channel. In other examples, while the recipient profile may be associated with multiple communication channels, one or more of the communication channels may not be available at the time when the command to send the message is received. An example of such a situation may be where the message type is associated with output of audio and not display of text and/or images, and in this example the recipient profile may be associated with multiple devices but only one of those devices may be an audio-output device. In still another example, while a recipient may be associated with multiple devices, at the time when the user command to send the request is received, presence data may indicate that only a single device with limited communication channels is near the user.

At block 812, the process 800 may include, in response to determining that the communication channels include the at least two communication channels, and utilizing the LM, inferring an urgency value to associate with the message, the LM configured to infer the urgency value from content of the message. For example, the LM may perform processes for ranking and selecting one of the communication channels. The LM may include an urgency component, which may be configured to analyze the content of the message itself to determine an urgency value to attribute to the message. Using the message of "tell Person A that they need to get to Location B right now," the LM may be trained to infer that the message has a time sensitive component (i.e., "right now") as well as other components that indicate the message is an urgent message. In this example, the LM may infer that the message has a location portion, a timing portion, and/or words that indicate a degree of urgency such as "need," "required," "now," etc. Generally, the LM may be configured to utilize the information available to it to analyze the message to be sent and to infer how urgent the message is. An urgency value may be associated with the message and the LM may determine whether that urgency value satisfies a threshold urgency value indicating that the message should be identified as an urgent message.

By way of continued example, the LM may utilize location data and/or timing data to further determine whether the message should be identified as an urgent message. To illustrate, if the message includes an indication that the recipient should be at a given location at a given time, the LM may determine the current location of the recipient and the current time to determine whether the recipient will need to rush to get to the location noted in the message. To acquire the location information, the LM may query a presence application, which may determine a current location of the recipient and/or may provide other presence-based signals that may be utilized to determine a geographic location of the recipient and/or a specific location of the recipient with respect to one or more devices (e.g., the recipient is in "the kitchen" near a device in the kitchen). Some or all of this contextual information as well as the content of the message itself may be utilized to determine if the message should be identified as an urgent message by the LM.

At block 814, the process 800 may include determining, utilizing the urgency value, a communication channel of the communication channels to select for sending the message to the recipient profile. In this example, the LM may rank potential communication channels and select the highest ranked communication channel that was available for the recipient profile in question. In examples, such a ranking may be to utilize the announcement type communication channel before using the text type communication channel, which may be used before the device-to-device communication channel, which may be used before the email type communication channel.

At block 816, the process 800 may include causing the message to be sent to the recipient profile utilizing the communication channel as selected. For example, the LM may generate an action plan that indicates one or more actions to be taken to send the message. In the example utilized herein, the action plan may indicate that a message indicated by the user command is to be sent, that the selected communication channel is to be utilized to send the message, which recipient profile is selected to receive the message, and which recipient device should receive the message. The action plan may be sent to an action plan executor, which may be configured to read the action plan and request that components of the system effectuate the action plan. In the example used herein, the action plan executor may call the communication application to cause the message to be sent to the recipient device utilizing the selected communication channel.

Additionally, or alternatively, the process 800 may include, in response to determining that the communication channels include the at least two communication channels, and utilizing the LM, inferring a formality value to associate with the message, the LM trained to infer the formality value from a subject matter of the message. In these examples, determining the communication channel to select for sending the message may be based on the formality value.

Additionally, or alternatively, the process 800 may include determining a first time of day associated with receipt of the user input data. The process 800 may also include determining, utilizing the LM, a second time of day indicated in the content of the message. In these examples, determining the urgency value may be based on the LM inferring the urgency value from (1) the first time of day associated with receipt of the user input data and (2) the second time of day indicated in the content of the message.

Additionally, or alternatively, the process 800 may include determining, in response to determining the recipient profile, a first location of a recipient associated with the recipient profile at a time when the user input data is received. The process 800 may also include determining, utilizing the LM, a second location indicated in the content of the message. In these examples, determining the urgency value may be based on the LM inferring the urgency value from (1) the first location of the recipient and (2) the second location indicated in the content of the message.

FIG. 9 illustrates a flow diagram of another example process 900 for LM communication channel optimization. The order in which the operations or steps are described is not intended to be construed as a limitation, and any number of the described operations may be combined in any order and/or in parallel to implement process 900.

At block 902, the process 900 may include receiving user input data requesting that a message be sent. In some examples, the command provided by the user may include an identifier of the communication channel to be utilized for sending the message. An example of such a situation may be a user command such as "send a text message to Person A saying 'hello'." In this example, a text type communication channel may be selected for sending the message based on the user command itself including the phrase "text message" or a similar communication channel indicator. However, in other examples, the user command may not include a communication channel identifier and/or the communication channel identifier provided in the user command may not correspond to a preferred communication channel based on the content of the message. An example of such a situation may be a user command such as "tell Person A that they need to get to Location B right now." In this example, the user command does not include an identifier of the communication channel to be utilized, and thus it would be beneficial to infer the preferred communication channel to be utilized for sending the message.

At block 904, the process 900 may include determining, using a LM, a recipient profile to send the message to. By way of example, a LM may call a user registry for contact information associated with the sender profile of the sender of the message. For example, the LM may provide the user registry with an indicator of the sender profile and may request contact information of potential recipient profiles that are associated with the sender profile. The user registry may return the contact information to the LM, which may utilize the contact information along with the user input data to infer a recipient profile to be selected for sending the message to. In examples, the LM may be configured to arbitrate between multiple potential recipient profiles, particularly where contact names and/or other contact information as between two or more contacts are the same or similar.

At block 906, the process 900 may include querying, by the LM, a communication channel application for first data indicating communication channels available for sending the message to the recipient profile. For example, having determined the recipient profile, the LM may then query a communication channel application for available devices associated with the recipient profile. The LM may provide an identifier of the recipient profile as well as, in examples, context information associated with the message to be sent. For example, the LM may determine that the message will be provided as audio data and in this example the LM may send context information indicating that devices with an audio-output speaker are to be considered as available devices. In another example, the LM may determine that the message will be provided as text data and/or image data and in this example the LM may send context information indicating that devices with a display are to be considered as available devices. The communication channel application may receive the request from the LM and may determine devices associated with the recipient profile that are available for sending the message to.

At block 908, the process 900 may include inferring, based at least in part on the first data indicating the communication channels, and utilizing the LM, an urgency value to associate with the message, the LM configured to infer the urgency value from content of the message. For example, the LM may perform processes for ranking and selecting one of the communication channels. The LM may include an urgency component, which may be configured to analyze the content of the message itself to determine an urgency value to attribute to the message. Using the message of "tell Person A that they need to get to Location B right now," the LM may be trained to infer that the message has a time sensitive component (i.e., "right now") as well as other components that indicate the message is an urgent message. In this example, the LM may infer that the message has a location portion, a timing portion, and/or words that indicate a degree of urgency such as "need," "required," "now," etc. Generally, the LM may be configured to utilize the information available to it to analyze the message to be sent and to infer how urgent the message is. An urgency value may be associated with the message and the LM may determine whether that urgency value satisfies a threshold urgency value indicating that the message should be identified as an urgent message.

By way of continued example, the LM may utilize location data and/or timing data to further determine whether the message should be identified as an urgent message. To illustrate, if the message includes an indication that the recipient should be at a given location at a given time, the LM may determine the current location of the recipient and the current time to determine whether the recipient will need to rush to get to the location noted in the message. To acquire the location information, the LM may query a presence application, which may determine a current location of the recipient and/or may provide other presence-based signals that may be utilized to determine a geographic location of the recipient and/or a specific location of the recipient with respect to one or more devices (e.g., the recipient is in "the kitchen" near a device in the kitchen). Some or all of this contextual information as well as the content of the message itself may be utilized to determine if the message should be identified as an urgent message by the LM.

At block 910, the process 900 may include determining, based at least in part on the urgency value, a communication channel of the communication channels to select for sending the message to the recipient profile. In this example, the LM may rank potential communication channels and select the highest ranked communication channel that was available for the recipient profile in question. In examples, such a ranking may be to utilize the announcement type communication channel before using the text type communication channel, which may be used before the device-to-device communication channel, which may be used before the email type communication channel.

Additionally, or alternatively, the process 900 may include inferring, utilizing the LM, a formality value to associate with the message. In these examples, the LM may be trained to infer the formality value from a subject matter of the message. Additionally, determining the communication channel to select may be based at least in part on the formality value.

Additionally, or alternatively, the process 900 may include determining a first time of day associated with receipt of the user input data. The process 900 may also include determining, utilizing the LM, a second time of day indicated in the content of the message. In these examples, inferring the urgency value comprises inferring the urgency value based at least in part on: the first time of day; and the second time of day.

Additionally, or alternatively, the process 900 may include determining a first location of a recipient associated with the recipient profile at a time when the user input data is received. The process 900 may also include determining, utilizing the LM, a second location indicated in the content of the message. In these examples, inferring the urgency value comprises inferring the urgency value based at least in part on: the first location; and the second location.

Additionally, or alternatively, the process 900 may include determining an amount of the content of the message. The process 900 may also include inferring, utilizing the LM, a formality value to associate with the message. In these examples, the LM may be trained to infer the formality value from the amount of the content. Additionally, determining the communication channel may be based at least in part on the formality value.

Additionally, or alternatively, the process 900 may include receiving, as part of the user input, a request to generate the content of the message. The process 900 may also include determining, utilizing the LM, a subject matter of the request to generate the content. The process 900 may also include inferring, utilizing the LM, a formality value to associate with the message. In these examples, the LM may be trained to infer the formality value from the subject matter of the request. Additionally, determining the communication channel may be based at least in part on the formality value.

Additionally, or alternatively, the process 900 may include inferring, utilizing the LM, a recipient category associated with the recipient profile. The process 900 may also include inferring, utilizing the LM, a formality value to associate with the message. In these examples, the LM may be trained to infer the formality value from the recipient category. Additionally, determining the communication channel may be based at least in part on the formality value.

Additionally, or alternatively, the process 900 may include receiving second data indicating detection of a recipient associated with the recipient profile at a recipient device. The process 900 may also include determining a location associated with the recipient device. The process 900 may also include inferring, utilizing the LM, a formality value to associate with the message. In these examples, the LM may be trained to infer the formality value from the location of the recipient device. Additionally, determining the communication channel may be based at least in part on the formality value.

Figure 10:
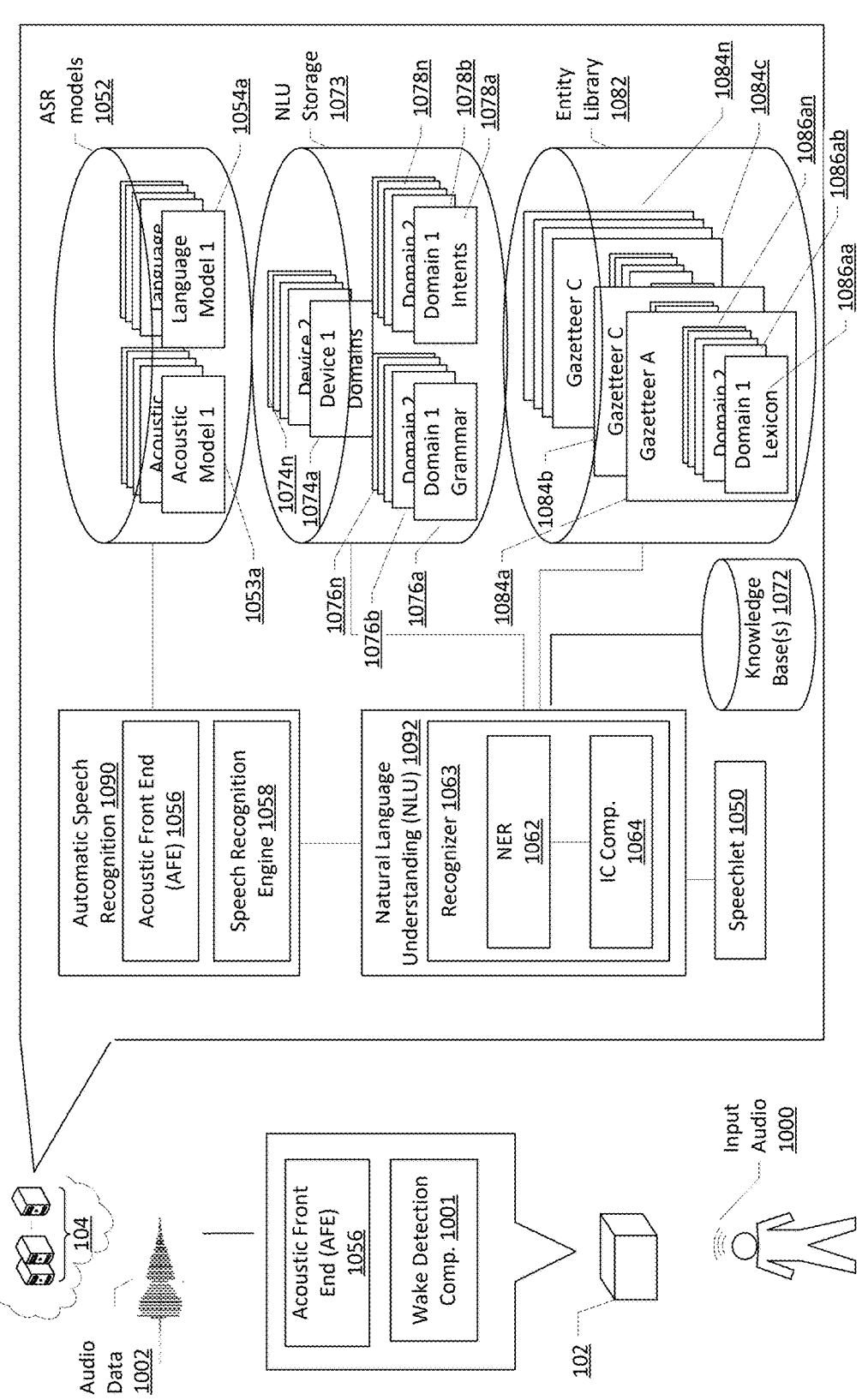
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 106. An audio capture component, such as a microphone 112 of the device 102, or another device, captures audio 1002 corresponding to a spoken utterance. The device 102, using a wake detection component 1001, then processes audio data corresponding to the audio 1000 to determine if a keyword (such as a wakeword) is detected in the audio data. Following detection of a wakeword, the device 102 processes audio data 1002 corresponding to the utterance utilizing an ASR component 1090. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 1090.

The wake detection component 1001 works in conjunction with other components of the user device, for example a microphone to detect keywords in audio 1000. For example, the device may convert audio 1000 into audio data 1002, and process the audio data 1002 with the wake detection component 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signalto-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake detection component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake detection component 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/RNN structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 1002 may include data corresponding to the wakeword. Further, a local device may "wake" upon detection of speech/spoken audio above a threshold, as described herein. An ASR component 1090 may convert the audio data 1002 into text. The ASR transcribes audio data into text data or other ASR output data representing the words of the speech contained in the audio data 1002. The text data or other ASR output data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1090 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what time is the pool open until" The wake detection component may identify the wake word, otherwise described as a trigger expression, "Alexa," in the user utterance and may "wake" based on identifying the wake word. The speech recognition engine 1058 may identify, determine, and/or generate text data or other ASR output data corresponding to the user utterance, here "what time is the pool open until."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 1092 may include various components, including potentially dedicated processor(s), memory, storage, etc. As shown in FIG. 10, an NLU component 1092 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 1090 based on the utterance input audio 1000) and attempts to make a semantic interpretation of the text. That is, the NLU process determines the meaning behind the text based on the individual words and then implements that meaning. NLU processing 1092 interprets a text string to derive an intent or a desired action from the user as well as the pertinent pieces of information in the text that allow a device (e.g., device 102) to complete that action. For example, if a spoken utterance is processed using ASR 1090 and outputs the text "what time is the pool open until" the NLU process may determine that the user intended to receive a response to the voice command indicating a time when the pool of the enterprise entity closes.

The NLU 1092 may process several textual inputs related to the same utterance. For example, if the ASR 1090 outputs N text segments (as part of an N-best list), the NLU may process all N outputs to obtain NLU results.

As will be discussed further below, the NLU process may be configured to parse and tag to annotate text as part of NLU processing. For example, for the text "what time is the pool open until," "what time" may be tagged as a command (to determine a time to respond to the user with).

To correctly perform NLU processing of speech input, an NLU process 1092 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 1092 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 863, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078a-1078n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to the speechlet 1050. The speechlet 1050 may be determined based on the NLU output. For example, if the NLU output includes a command to send a message, the destination speechlet 1050 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the destination speechlet 1050 may provide some or all of this information to a text-to-speech (TTS) engine. The TTS engine may then generate an actual audio file for outputting the audio data determined by the application (e.g., "okay," or "the pool closes at 10:00 pm").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 1092 during runtime operations where NLU operations are performed on text (such as text output from an ASR component 1090). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the input processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 11:
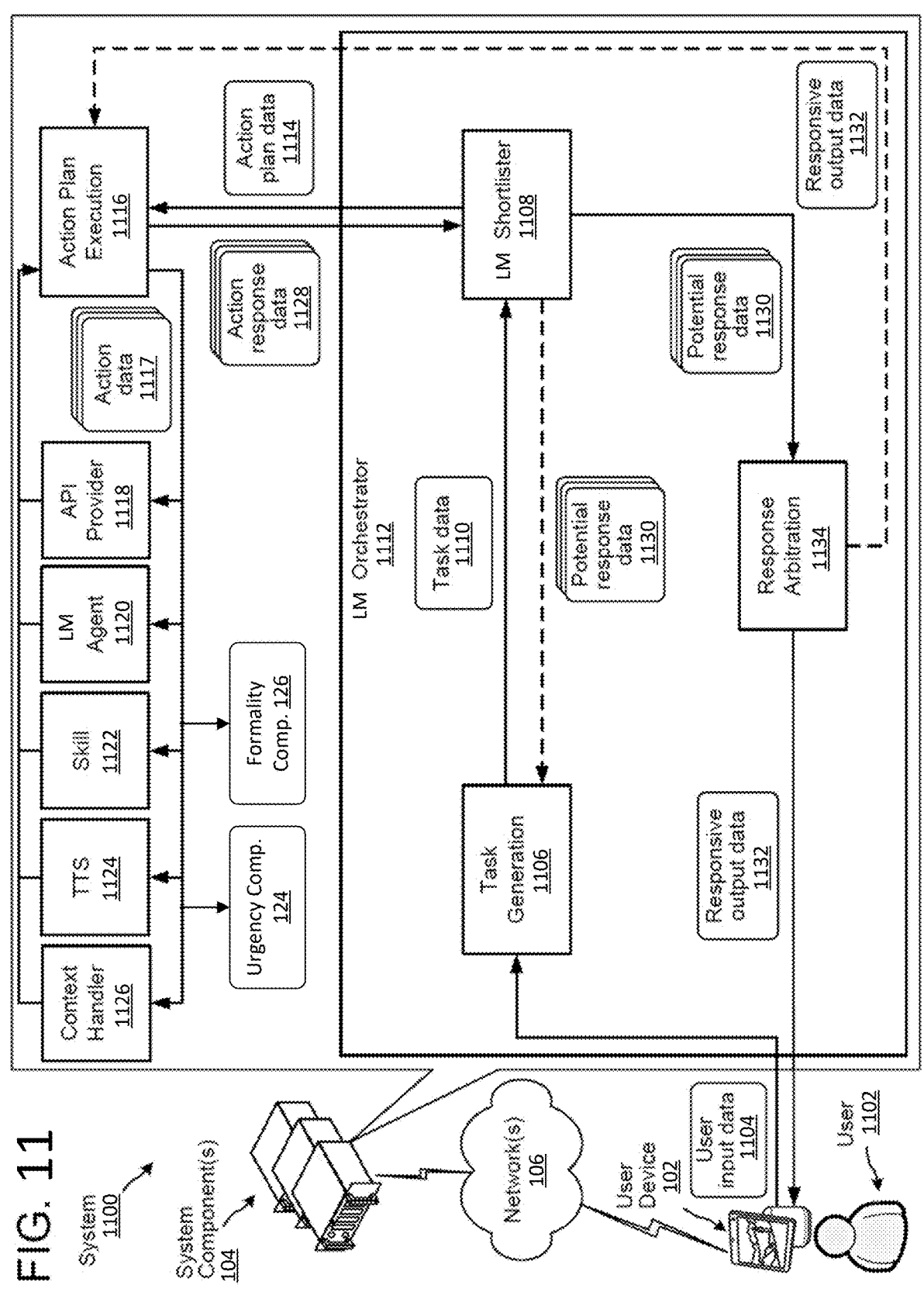
FIG. 11 is a conceptual diagram illustrating example components and processing of a plan generation component, according to embodiments of the present disclosure.

FIG. 11 illustrates further example components included in the system 1100 configured to determine an action responsive to a user input and in which the context handler component 1126 may be implemented. As shown in FIG. 11, the system may include a user device 102, local to a user 1102, in communication with a system component(s) 104 via a network(s) 106. The network(s) 106 may include the Internet and/or any other wide- or local-area network, and may include wired, wireless, and/or cellular network hardware.

The system component(s) 104 may include various components, such as a LM orchestrator component 1112, and an action plan execution component 1116. The LM orchestrator component 1112 may include a task generation component 1106, an LM shortlister component 1108, and a response arbitration component 1134.

In some embodiments, the LM orchestrator component 1112 may generate prompt data representing a prompt for input to one or more language models. As shown in FIG. 11, the system component(s) 104 receive the user input data 1104, which may be provided to the LM orchestrator component 1112. In some instances, the user input data 1104 may correspond to various data types, such as text (e.g., a text or tokenized representation of a user input), audio, image, video, etc. For example, the user input data may include input text (or tokenized) data when the user input is a typed natural language user input. For further example, prior to the LM orchestrator component 1112 receiving the user input data 1104, another component (e.g., an automatic speech recognition (ASR) component 1090) of the system 1100 may receive audio data representing the user input. The ASR component 1090 may perform ASR processing on the audio data to determine ASR data corresponding to the user input, which may correspond to a transcript of the user input. As described below, with respect to FIG. 13, the ASR component 1090 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 1090 level of confidence that the corresponding hypothesis represents what the user said. The ASR component 1090 may also determine token scores corresponding to each token/word of the ASR hypothesis, where the token score indicates the ASR component's 1090 level of confidence that the respective token/word was spoken by the user. The token scores may be identified as an entity score when the corresponding token relates to an entity. In some instances, the user input data 1104 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 1100 may include one or more components configured to process such user inputs to generate the text or tokenized representation of the user input (e.g., the user input data 1104).

In some embodiments, the LM orchestrator component 1112 may receive input data, which may be processed in a similar manner as the user input data 1104 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 102, a user entering the home, etc.). In some embodiments, the system 1100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 1100 may include one or more components configured to process the input data to generate a natural language representation of the input data. The system 1100 may process the input data and may perform an action. For example, in response to detecting a garage door opening, the system 1100 may cause garage lights to turn on, living room lights to turn on, etc. As another example, in response to detecting an oven beeping, the system 1100 may cause a device 102 (e.g., a smartphone, a smart speaker, etc.) to present an alert to the user. The LM orchestrator component 1112 may process the input data to generate tasks that may cause the foregoing example actions to be performed.

In some embodiments, the LM orchestrator component 1112 may generate prompt data representing a prompt for input to the language models. As shown in FIG. 11, the user input data 1104 may be received at the task generation component 1106 of the LM orchestrator component 1112, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 1100), as described in detail herein below with respect to FIG. 14. For example, for a user input of "What is the weather for today," the task generation component 1106 may generate a list of tasks of "(1) determine current outside temperature from thermostat; and (2) determine weather forecast for today" and select the task of "determine weather forecast for today" to be completed first. For further example, for a user input of "I am back, please continue outputting the recipe instructions," the task generation component 1106 may generate a list of tasks of "(1) determine context for outputting the recipe instructions; and (2) resume output of the recipe instructions" and select the task of "determine context for outputting the recipe instructions" to be completed first.

In instances where the task generation component 1106 generates more than one task to be completed in order to perform the action responsive to the user input, the task generation component 1106 may further maintain and prioritize the list of tasks as the processing of the system 1100 with respect to the user input is performed. In other words, as the system 1100 processes to complete the list of tasks, the task generation component 1106 may (1) incorporate the potential responses associated with completed tasks into data provided to other components of the system 1100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The task generation component 1106 may generate and send task data 1110 representing the selected task to be completed and various other information needed to perform further processing with respect to the task (e.g., the user input data 1104, an indication of the selected task, potential responses associated with previous tasks, the remaining task(s), and context data associated with the user input data 1104, as described in detail herein below with respect to FIG. 14) to the LM shortlister component 1108.

The LM shortlister component 1108 may be configured to determine one or more components (e.g., an API provider component 1118, skill component(s) 1122, LM agent component(s) 1120, a TTS component 1124, the context handler component 1126, an urgency component 124, a formality component 126, etc.) configured to perform an action related to the user input or the current task. The LM shortlister component 1108 may further be configured to generate and cause the execution of a request(s) (e.g., an API call(s), an incomplete API call/API call format, an indication of an action to be performed by a component, etc.) for the one or more components to provide a potential response(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the LM shortlister component 1108 may generate requests of "determine user's preferred weather application," "use Weather Application A to determine weather forecast for today," "use Weather Application B to determine weather forecast for today," or the like. Such requests may be represented in the action plan data 1114 sent to the action plan execution component 1116. The action plan execution component 1116 may identify the request(s) in the action plan data 1114, generate executable API calls corresponding to the request(s), and cause the corresponding components (e.g., the API provider component 1118, the LM agent component 1120, the skill component 1122, the TTS component 1124, the urgency component 124, the formality component 126, and/or the context handler component 1126) to generate action response data 1128 representing the requested potential response(s), where individual action response data 1128 may be provided by/correspond to a particular component-one of the API provider component 1118, the LM agent component 1120, the skill component 1122, the TTS component 1124, the urgency component 124, the formality component 126, and/or the context handler component 1126. In some embodiments, the action response data 1128 may include an identifier (e.g., a component name, an alphanumerical value associated with the component, etc.) for the component providing the data. The LM shortlister component 1108 receives and processes the action response data 1128 and generates potential response data 1130 representing the potential response(s) (e.g., relevant potential responses, selected potential responses, ranked potential responses, etc.) for further processing. If the LM shortlister component 1108 determines that there are no remaining tasks to generate potential responses for, the LM shortlister component 1108 may send the potential response data 1130 to the response arbitration component 1134.

The potential response data 1130, in some embodiments, may be determined based on receiving potential responses from various different components that may be relevant in responding to the user input data 1104. For example, the potential response data 1130 may include a first potential response from a first component configured to perform a first task determined by the task generation component 1106, a second potential response from a second component configured to perform a second task determined by the task generation component 1106, etc. The potential response data 1130 can include more than one potential response relating to an individual task. In some embodiments, the potential response data 1130 may be natural language data.

The response arbitration component 1134 processes the potential response data 1130 to determine whether the potential responses generated for the one or more tasks are responsive to the user input. The response arbitration component 1134 processes the potential response data 1130 (representing at least the generated potential responses) and selects one or more of the potential responses that are determined to be responsive to the user input and/or determines that none of the actions are responsive to the user input. For example, the response arbitration component 1134 may process the potential response data 1130 to determine if one or more of the potential responses performable by the API(s) (e.g., the potential responses and/or potential actions) are responsive to the current task. In some embodiments, the response arbitration component 1134 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 1134 may generate a natural language summary of "The weather for today is expected to be mostly sunny with a high of 75 and a low of 68 and a slight chance of rain in the evening," or the like.

Figure 12:
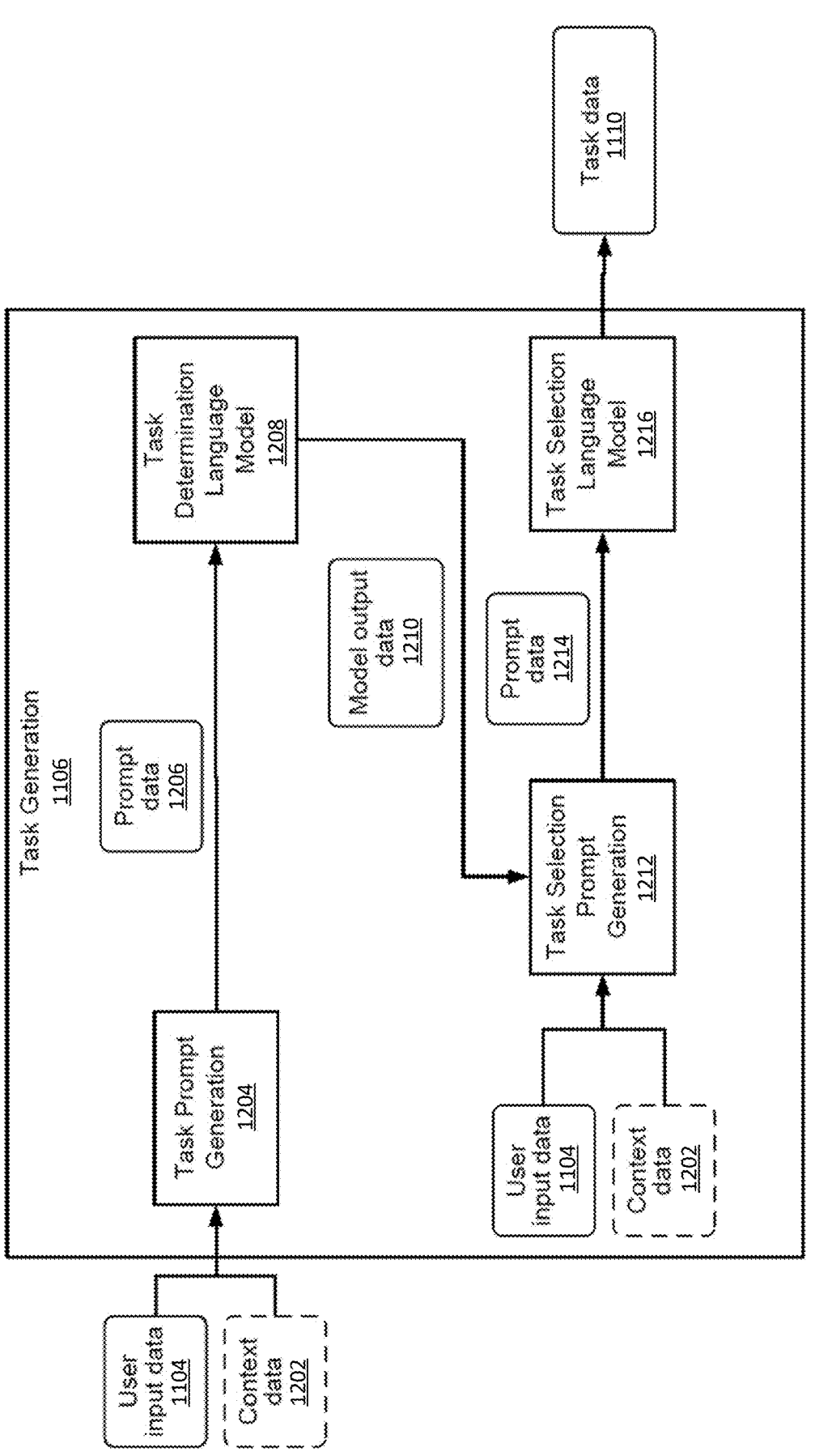
FIG. 12 is a conceptual diagram illustrating example components and processing of a LM shortlister component, according to embodiments of the present disclosure.

FIG. 12 illustrates example processing of the task generation component 1106. As shown in FIG. 12, the task generation component 1106 may include a task prompt generation component 1204, a task determination language model 1208, a task selection prompt generation component 1212, and a task selection language model 1216.

As further shown in FIG. 12, the user input data 1104 is received at the task prompt generation component 1204, which is configured to generate a list (e.g., one or more) of tasks (e.g., steps/actions) that are to be completed in order to perform an action responsive to the user input and select a task of the list of the tasks that is to be completed first (e.g., in a current iteration of processing by the system 1100).

The task prompt generation component 1204 processes the user input data 1104 to generate prompt data 1206 representing a prompt for input to the task determination language model 1208. In some embodiments, the task prompt generation component 1204 may further receive an indication of one or more remaining tasks to be completed with respect to the user input data 1104. A task to be completed may correspond to a task for which the system 1100 has yet to generate potential responses for (e.g., for which a responding component, such as the API provider component 1118, the LM agent component 1120, the skill component 1122, the TTS component 1124, the urgency component 124, the formality component 126, and/or the context handler component 1126 have yet to generate action response data for). Similarly, a completed task may correspond to a task for which the system 1100 has generated potential responses for (e.g., for which a responding component, such as the API provider component 1118, the LM agent component 1120, the skill component 1122, the TTS component 1124, the urgency component 124, the formality component 126, and/or the context handler component 1126 have generated action response data). For example, if the current iteration of processing with respect to the user input data 1104 is a subsequent iteration of processing (e.g., the system previously determined that more than one task is to be completed in order to perform an action responsive to the user input data 1104 and has previously generated potential responses for at least a first task of the more than one tasks), then the task prompt generation component 1204 may further receive an indication of the remaining tasks to be completed. In such embodiments, the task prompt generation component 1204 may further receive an indication of the task(s) to complete processing for and/or the potential response(s) of the processing. The task prompt generation component 1204 may further receive the context data 1202 representing various contextual signals associated with/relevant to the user input data 1104, such as user profile information (e.g., user ID, user behavioral information, user preferences, age, gender, devices associated with the user profile, etc.), weather information, time of day, device information associated with the device that sent the user input data 1104 (e.g., device ID, device states, historical device interaction data, etc.). In some embodiments, the context data 1202 may correspond to the context data retrieved by the context handler component 1126. For example, the context data 1202 may be retrieved during a previous iteration of processing by the LM orchestrator component 1112, where the context data 1202 was caused to be retrieved by the LM shortlister component 1108 (e.g., in response to the task generation component 1106 determining that the context data is to be retrieved) and sent to the task generation component 1106 thereafter (e.g., as potential response data). In other embodiments, the context data 1202 may correspond to the context data stored in the memory storage, as discussed herein. Such prompt data 1206 may be generated based on combining the user input data 1104 and the context data 1202 (and, in some embodiments, the indication of the remaining task(s), completed task(s), and/or the potential responses).

In some embodiments, the prompt data 1206 may be an instruction for the task determination language model 1208 to determine one or more tasks (e.g., steps/actions) that are to be completed in order to perform an action responsive to the user input given the other information (e.g., the context data 1202, the indication of the remaining task(s), the indication of the completed task(s), and/or the corresponding potential responses) included in the prompt data 1206.

For example for a user input of "turn on all of the lights except the garage," the task prompt generation component 1204 may generate example prompt data 1206:

{
  Create a new task if necessary to help complete a request to turn on all of the lights except the garage.

Here are the completed tasks, their potential responses, user inputs, and context so far:
  [ ]
  These are the remaining tasks to be completed:
  [ ]
  Based on the result, create new tasks to be completed, if necessary.
}

In some embodiments, the task prompt generation component 1204 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 1206 may include "Please generate a polite, respectful, and safe response and one that does not violate protected class policy."

The task determination language model 1208 processes the prompt data 1206 to generate model output data 1210 representing one or more predicted tasks to be completed in order to perform the action responsive to the user input. For example, based on processing the first example prompt data provided above, the task determination language model 1208 may output model output data 1210: {"turn on all of the lights except the garage light,"} or the like. In some embodiments, the threshold for determining the one or more tasks may be such that the task determination language model 1208 is encouraged to generate multiple predicted tasks for a given user input, where the system 1100 may parse and filter the list of tasks during downstream processing (e.g., during the processing of the task selection language model 1216). For example, based on processing the first example prompt data provided above, the task determination language model 1208 may output model output data 1210: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like. As discussed herein above, in some embodiments the LM may correspond to the task determination language model 1208. As such, in such embodiments, the task determination language model 1208 may process, in addition to the processing described herein below, similarly to LM discussed herein above (e.g., the task determination language model 1208 may determine that context data is needed to generate a response to a user input, such as by generating a context-retrieval task).

As an example of a user input that is associated with more than one task, the LM orchestrator component 1112 may receive a user input of "please order some pizza for dinner" and the task prompt generation component 1204 may generate example prompt data 1206:

{
  Create a new task if necessary to help complete a request to order some pizza for dinner.
  Here are the completed tasks, their potential responses, user inputs, and context so far:
  [ ]
  These are the remaining tasks to be completed:
  [ ]
  Based on the result, create new tasks to be completed, if necessary.
}

The task determination language model 1208 processes the prompt data 1206 to generate model output data 1210 representing one or more predicted tasks to be completed in order to perform the action responsive to the user input. For example, based on processing the example prompt data provided above, the task determination language model

1208 may output model output data 1210: {"identify user pizza preference;" (or some other request for context, such as "determine context to order pizza for dinner") "find application that enables ordering of pizza,"} or the like.

As an example of a subsequent round of processing with respect to a user input (e.g., processing performed with respect to a user input that is associated with more than one task), and for the abovementioned user input of "please order some pizza for dinner", the system 1100 may process as described herein below to select and complete the task of "identify user pizza preference" (or some other request for context). The task prompt generation component 1204 may process the user input, corresponding context data, the remaining task list, and the potential responses (e.g., the users pizza preference, determined, for example, using the context data 1202 retrieved using the context handler component 1126) to generate example prompt data 1206:

{
Create a new task if necessary to help complete a request to order some pizza for dinner.
Here are the completed tasks, their potential responses, user inputs, and context so far:
Completed tasks:
   Identify user pizza preference: user ordered Brooklyn style pizza from [Pizza Company Name 1]
These are the remaining tasks to be completed:
Find application to order pizza
Based on the result, create new tasks to be completed, if necessary.
}

The task determination language model 1208 processes the prompt data 1206 to generate model output data 1210 representing one or more predicted tasks to be completed in order to perform the action responsive to the user input. For example, based on processing the example prompt data provided above, including the context data retrieved using the context handler component 1126 during the previous round of processing, the task determination language model 1208 may further output model output data 1210: {"find an application to order pizza" "find API to order [Pizza Company Name 1] pizza,"} or the like.

In some embodiments, the one or more predicted tasks may include a task of storing context data. For example, the model output data 1210 may include a task of storing relevant context data used during the processing performed with respect to the user input data 1104. For further example, the model output data 1210 may include a task of storing context data that was used during the processing performed with respect to previous user input data.

The model output data 1210 is sent to the task selection prompt generation component 1212, which processes the model output data 1210 to generate prompt data 1214 representing a prompt for input to the task selection language model 1216. In some embodiments, such prompt data 1214 may be generated based on combining the user input data 1104, the context data 1202, the prompt data 1206, and/or the model output data 1210. In some embodiments, the task generation component 1106 may include another component that parses the model output data 1210 to determine the one or more tasks and may send a representation of the one or more tasks to the task selection prompt generation component 1212.

In some embodiments, the prompt data 1214 may be an instruction for the task selection language model 1216 to select a task of the one or more tasks that is to be completed first (e.g., completed during the current iteration of processing) given the information (e.g., user input data 1104, the context data 1202, and the one or more tasks) included in the prompt data 1214. In some embodiments, the prompt data 1214 may further include an instruction for the task selection language model 1216 to determine a priority of the one or more tasks (e.g., an ordered list representing the order in which the one or more tasks are to be completed).

For example, for the example user input provided above of "please order some pizza for dinner," the task selection prompt generation component 1212 may generate example prompt data 1214:

{
Select the top prioritized task given the ultimate goal of order some pizza for dinner
Here are the completed tasks, their potential responses, user inputs, and context so far:
[ ]
Here are the task candidates:
Identify user pizza preference (or some other context retrieval task)
Find an application that sells pizza
Return your selected task, return None if the goal is achieved or indicate existing ambiguities.
}

For further example, for the second round of processing performed with respect to the example user input of "please order some pizza for dinner," the task selection prompt generation component 1212 may generate example prompt data 1214:

{
Select the top prioritized task given the ultimate goal of please order some pizza for dinner
Here are the completed tasks, their potential responses, user inputs and context so far:
Completed tasks:
   Identify user pizza preference: user ordered Brooklyn style pizza from [Pizza Company 1 Name]
Here are the task candidates:
find an application that sells pizza
find API that sells [Pizza Company 1 Name] pizza
Return your selected task, return None if the goal is achieved or indicate existing ambiguities.
}

In some embodiments, the task selection prompt generation component 1212 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 1216 processes the prompt data 1214 to generate model output data representing the task to be completed first and/or a prioritization of the one or more tasks. For example, based on processing the first example prompt data 1214 provided above, the task selection language model 1216 may output model output data: {"1. Identify user pizza preference,"} or the like. For further example, based on processing the second example prompt data 1214 provided above, the task selection language model 1216 may output model output data: {"1. Find an API that sells [Pizza Company Name 1] pizza,"} or the like. In some embodiments, during processing of the task selection language model 1216 to select and/or prioritize the one or more tasks, the task selection language model 1216 may update the task list to remove any redundant and/or conflicting tasks. For example, for the example prompt data 1214, the task selection language model 1216 may determine that the remaining tasks of "find an application that sells pizza" and "find an API that sells [Pizza Company Name 1] pizza" are redundant, and that "find an API that sells [Pizza Company Name 1] pizza has a higher priority. Therefore, the task selection language model 1216 may remove the task of "find an application that sells pizza" from the remaining task list. Thereafter, the task generation component 1106 (or another component of the task generation component 1106) may process the model output data of the task selection language model 1216 to determine task data 1110 representing the user input data 1104 and/or the task selected by the task selection language model 1216 to be completed first. In some embodiments, the task data 1110 may include the remaining one or more tasks and/or may indicate the prioritization of the one or more tasks, as determined by the task selection language model 1216. The task data 1110 may be sent to the LM shortlister component 1108, which is described in detail herein below with respect to FIG. 13.

Figure 13:
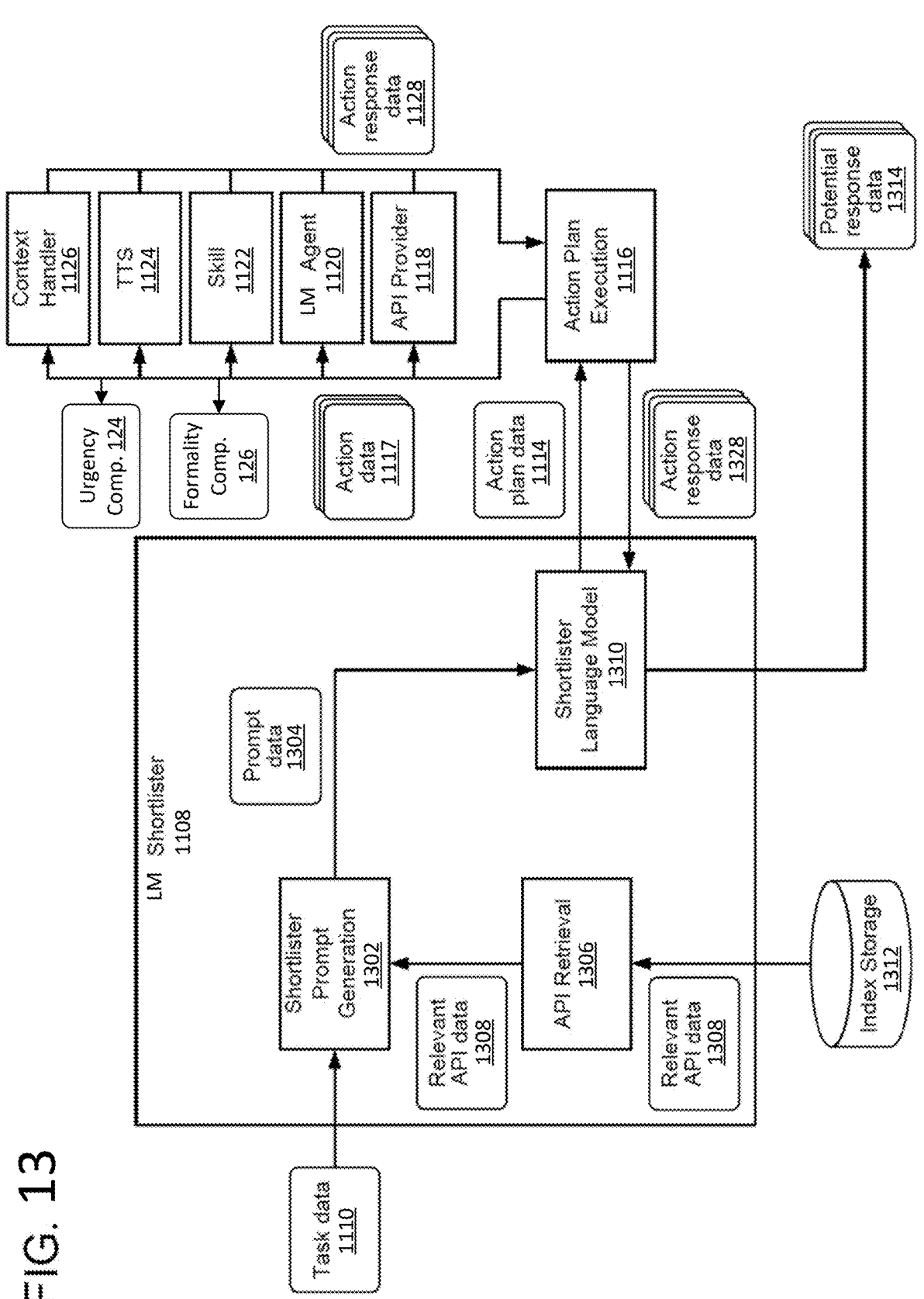
FIG. 13 is a conceptual diagram illustrating example component and processing of a response arbitration component, according to embodiments of the present disclosure.

FIG. 13 illustrates example processing of the LM shortlister component 1108. As shown in FIG. 13, the LM shortlister component 1108 may include an index storage 1312, an API retrieval component 1306, a shortlister prompt generation component 1302, and a shortlister language model 1310.

The LM shortlister component 1108 is configured to determine one or more components (e.g., APIs (via the API provider component 1118, skill component(s) 1122, LM agent component(s) 1120, TTS component 1124, context handler component 1126, the urgency component 124, the formality component 126, etc.) configured to perform an action related to the user input or the current task. The LM shortlister component 1108 is further configured to generate and cause the execution of a request(s) (e.g., an API call(s), an incomplete API call/API call format, an indication of an action to be performed by a component, etc.) for the one or more components to provide a potential response(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task).

As further shown in FIG. 13, the task data 1110 is received at the shortlister prompt generation component 1302. The shortlister prompt generation component 1302 processes the task data 1110 to generate prompt data 1304 representing a prompt for input to the shortlister language model 1310. In some embodiments, such prompt data 1304 may be generated based on combining the task data 1110 (e.g., the user input data 1104, the context data 1202, the selected task, remaining tasks, potential responses associated with one or more previous tasks, etc.) and relevant API data 1308 representing one or more APIs associated with the user input data 1104 and/or the current task.

The relevant API data 1308 may be generated by the API retrieval component 1306, which may be configured to retrieve one or more (e.g., top-k) relevant APIs associated with the user input data 1104 or the current task. In some embodiments, the APIs may correspond to various components. For example, the components may correspond to rule-based components, ML-based components, LM-based components, or the like, such as the orchestrator component 1112, the API provider component 1118, the LM agent component 1120, the skill component 1122, the TTS component 1124, the context handler component 1126, the urgency component 124, the formality component 126, etc.) In some embodiments, the APIs may correspond to the components.

The API retrieval component 1306 may use retrieval-based approaches to retrieve the one or more relevant APIs from the index storage 1312, which may store various information associated with multiple APIs (and/or components) such as component descriptions, API arguments (e.g., parameter inputs/outputs), identifiers for components (e.g., such as the API provider component 1118, the LM agent component 1120, the skill component 1122, the TTS component 1124, the context handler component 1126, the urgency component 124, the formality component 126, etc.) that provides the API, etc. For example, the API retrieval component 1306 may compare one or more APIs (and/or components) included in the index storage 1312 to the user input or the current task to determine one or more APIs (or components) (top-k) that corresponds to the user input or the current task (e.g., APIs (and/or components) that are semantically similar to the user input or the current task, APIs (and/or components) that are capable of performing the current task, etc.). In some embodiments, the API retrieval component 1306 (or another component of the API retrieval component 1306) may determine an encoded representation of the user input or the current task and compare (e.g., using cosine similarity) the encoded representation(s) to an encoded representation of a component description for the API (and/or component) to determine whether the API (and/or component) is semantically similar to the user input or the current task. A component description may correspond to a description of the one or more function that the API (and/or component) is configured to perform and/or other information associated with the API (and/or component) (e.g., an API call formatting structure (e.g., including input parameters), historical accuracy/defect rate, historical latency value, etc.). In some embodiments, the component description may further include one or more exemplars associated with use of the API (and/or component) (e.g., an example user input, corresponding API call, and example API output). If the value of semantic similarity meets or exceeds a threshold, the API (and/or component) (and, optionally, the component description) may be included in the relevant API data 1308. In some embodiments, the API retrieval component 1306 may determine the relevant API data 1308 further using contextual information, including the context data 1202, an accuracy/defect rate value associated with the APIs (and/or components), and/or a historical latency value associated with the APIs (and/or components) (e.g., which may be included in the description of the API). In some embodiments, the index storage 1312 may be included in the API retrieval component 1306. Similar processing may be performed to determine one or more components that are semantically similar to the user input or the current task, which may be included in the relevant API data 1308. The API retrieval may send the relevant API data 1308 to the shortlister prompt generation component 1302.

In some embodiments, the prompt data 1304 may be an instruction for the shortlister language model 1310 to determine one or more APIs (and/or components) that are to process with respect to the user input or the current task (e.g., determine one or more API calls to cause the APIs (and/or components) to process) given the information (e.g., the user input data 1104, the context data 1202, the current task, and the relevant API data 1308). As discussed herein above, in some embodiments the task prompt generation component 1204 may corresponding to the shortlister prompt generation component 1302. As such, in some embodiments, the shortlister prompt generation component 1302 may, in addition to the processing discussed herein below, process similar to the task prompt generation component 1204 (e.g., to generate prompt data for input to an LM configured to generate a request for context data).

For example, for the selected task of "turn on all of the lights except the garage light" and corresponding relevant API data, the shortlister prompt generation component 1302 may generate example prompt data 1304:
{
Find an execute an API to complete the task of turn on all of the lights except the garage light
Here is a list of relevant API available:
Let's chat API
Classic NLU API
Smart Home skill
If no appropriate API is found, summarize as nothing is found.
}

For further example, for the selected task of "Identify user pizza preference" (or some other related context retrieval task) and corresponding relevant API data, the shortlister prompt generation component 1302 may generate example prompt data 1304:
{
Find an execute an API to complete the task of identifying the user's pizza preference
Here is a list of relevant API available:
Context Handler API
If no appropriate API is found, summarize as nothing is found.
}

As another example, for the subsequently selected task of "find application to order pizza" and corresponding relevant API data, the shortlister prompt generation component 1302 may generate example prompt data 1304:
{
Find and execute an API to complete the task of find application to order pizza
Here is a list of relevant API available:
Let's chat API
[Food Ordering Application 1] API
[Food Ordering Application 2] API
If no appropriate API is found, summarize as nothing is found.
}

In some embodiments, the shortlister prompt generation component 1302 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 1310 processes the prompt data 1304 to generate one or more API calls corresponding to request(s) that the corresponding APIs (and/or components) return a potential response to the user input/current task and/or a potential action(s) that the APIs (and/or components) are configured to/will perform with respect to the user input and/or the current task (e.g., a natural language description of the potential action(s)). In some embodiments, the shortlister language model 1310 may generate API calls for a subset of the APIs represented in the prompt data 1304. For example, based on processing the first example prompt data provided above, the shortlister language model 1310 may output model output data: {"Use Let's chat API to turn on all of the lights except the garage light, Use Smart Home skill to turn on all of the lights except the garage light"}, {"Letschat ("turn on all of the lights except the garage light"), or the like. For further example, based on processing the second example prompt data provided above, the shortlister language model 1310 may output model output data: {"retrieve context to identify user's pizza preference,"} or the like. As another example, based on processing the third example prompt data provided above, the shortlister language model 1310 may output model output data: {"Use [Food Ordering Application 1] to order pizza, Use [Food Ordering Application 2] to order pizza,"} or the like.

As discussed herein above, in some embodiments, the LM may correspond to the shortlister language model 1310. In such embodiments, the shortlister language model 1310 may, in addition to the processing discussed herein with respect to FIG. 11, process similar to the LM. For example, the shortlister language model 1310 may be configured to generate a request for the context handler component 1126 to retrieve context data relevant to the user input data 1104 and/or one or more of the tasks. For further example, the shortlister language model 1310 may be configured to generate a request for the context handler component 1126 to store context data, such as in response to a corresponding task and/or in response to a request from the response arbitration component 1134.

The shortlister language model 1310 may generate the one or more APIs calls (including the required input parameters) by applying in-context learning for cold-starting API calls (e.g., one-shot/few-shot learning). For example, in embodiments where the relevant API data 1308 includes the component descriptions, the shortlister language model 1310 may use the one or more exemplars included in the component descriptions (included in the prompt data 1304) to determine the one or more input parameters for the API call. In some embodiments, the shortlister language model 1310 may be finetuned on such exemplars (e.g., during offline or runtime processing), such that the shortlister language model 1310 is capable of determining the one or more input parameters for the given API call.

During processing of the shortlister language model 1310 and after generating the one or more requests, the shortlister language model 1310 may cause the one or more requests to be executed. For example, as shown in FIG. 13, the shortlister language model 1310 may send action plan data 1114 representing the one or more requests to the action plan execution component 1116, which causes execution of the one or more requests included in the action plan data 1114. For example, the action plan execution component 1116 may process the action plan data 1114 to generate action data 1117. Action data 1117 may represent, for example, an instruction (e.g., an executable API call determined from/ generated based on the action plan data 1114) for a particular API to process with respect to the user input and/or the current task. In embodiments where the action plan data 1114 includes requests corresponding to incomplete API calls, API call formats, indications of actions to be performed by one or more components, the action plan execution component 1116 may be configured to generate executable API calls corresponding to the action plan data 1114. In some embodiments, the action plan execution component 1116 may generate the action data 1117 to represent an instruction to provide the responses including the potential response(s)/potential action(s) with respect to the user input and/or the current task.

In some embodiments, the shortlister language model 1310 may send model output data including the one or more requests to another component of the LM orchestrator component 1112, which may be configured to parse the model output data to identify the one or more requests. Thereafter, the component may generate the action plan data 1114 representing the one or more requests and send the action plan data 1114 to the action plan execution component 1116.

The action plan execution component 1116 may send the action data 1117 to the API provider component 1118, the LM agent component 1120, the skill component 1122, the TTS component 1124, the urgency component 124, the formality component 126, and/or the context handler component 1126. The API provider component may include one or more components (e.g., rule-based components, ML-based components, LM-based components, or the like) that may be caused to process using the action data 1117 (e.g., using the API calls generated by the LM shortlister component 1108).

The TTS component 1124 may be configured to process textual or tokenized input to generate audio data representing synthesized speech corresponding to the textual or tokenized input spoken by a synthetic voice.

The skill component 1122 may be software running on the system component(s) 104 that is akin to a software application. That is, a skill component 1122 may enable the system component(s) 104 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 104 may be configured with more than one skill component 1122. For example, a weather service skill component may enable the system component(s) 104 to provide weather information, a car service skill component may enable the system component(s) 104 to book a trip with respect to a taxi or ride sharing service, a restaurant skill component may enable the system component(s) 104 to order a pizza with respect to the restaurant's online ordering system, etc. A skill component 1122 may operate in conjunction between the system component(s) 104 and other devices, such as the user device 102, in order to complete certain functions. A skill component 1122 may include hardware, software, firmware, or the like that may be dedicated to a particular skill component 1122 or shared among different skill components 1122.

The LM agent component 1120 may correspond to one or more LM agents. An LM agent component 1120 may correspond to a custom instantiation of an LM (and other components) that is configured to handle user inputs relating to a particular domain/functionality. In some embodiments, the LM agent component 1120 may be configured to handle specific use cases via particular prompt generation, fine-tuning of the LM, etc. For example, the LM agent component 1120 may be configured to handle user inputs/tasks related to information query, the LM agent component 1120 may be configured handle user inputs/tasks related to shopping, the LM agent component 1120 may be configured to handle user inputs/tasks related to ordering food from various restaurants, the LM agent component 1120 may be configured to handle user inputs/tasks related to ordering food from a particular restaurant (e.g., a particular pizza restaurant), the LM agent component 1120 may be configured to handle user inputs/tasks related to booking a hotel, the LM agent component 1120 may be configured to handle user inputs/tasks related to booking a flight, etc.

The API provider component 1118 may include various components that may be caused to execute using the action data 1117. For example, the API provider component 1118 may include an entity recognition (ER) component, which may be configured to process textual or tokenized input to link one or more entity references included in the textual or tokenized input to a specific corresponding entity known to the system 1100. For example, based on the textual or tokenized input (e.g., a context of the textual or tokenized input), the ER component may determine that a reference to "Neil Armstrong" is directed to the American astronaut. In some embodiments, the action data 1117 may include an indication(s) (e.g., slots) of one or more entities included in the user input, as determined by one or more of the language models described with respect to FIG. 11, in which case the ER component may process to link the one or more entities to the specific, referenced, entity known to the system 1100.

In other embodiments, the ER component may be configured to process the action data 1117 to determine the one or more entities included in the user input and link the one or more determined entities to the specific, referenced, entity (entities) known to the system 1100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 1118 may include a search component, which may be configured to query a storage (e.g., a database, repository, knowledge base, etc.) for information usable for generating a response to a user input. For example, if the action data 1117 represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component 1118 may include the device controller component discussed herein above, which may be further configured to cause a device to perform an action corresponding to the action data 1117.

In some embodiments, the API provider component 1118 may include a domain service component, which may be configured for interacting with one or more services defined by particular users, such as developers, specialists, or the like (e.g., to receive information, such as responses or annotations, to cause an action.

One or more of abovementioned components may send action response data 1128 representing one or more potential responses generated by the one or more APIs corresponding to the action data 1117 (e.g., the potential response(s) and/or potential action(s)) to the action plan execution component 1116. For example, in response to an API call to the skill component 1122 associated with a user input for turning on a light, the action response data 1128 may correspond to a potential action of "turn on the light," or the like. For further example, in response to an API call to the context handler component 1126 associated with retrieving context for a user input for ordering pizza, the action response data 1128 may correspond to context data representing the user has previously indicated that they prefer Brooklyn style pizza. For further example, in response to an API call to the skill component 1122 associated with a user input for ordering a pizza from a particular restaurant, the action response data 1128 may correspond to a potential action of "order medium pizza from [restaurant name]", or the like. The action plan execution component 1116 may send the action response data 1128 to the shortlister language model 1310.

In some embodiments, the action plan execution component 1116 may send the action response data 1128 to the shortlister prompt generation component 1302, which may generate further prompt data including the action response data 1128 and be sent to the shortlister language model 1310. For example, the further prompt data may be generated based on combining the prompt data 1304 and the action response data 1128.

In some embodiments, the shortlister language model 1310 may process the action response data 1128 (or the further prompt data including action response data 1128) to generate a natural language summary of the action response data (e.g., the potential response data 1130). In some embodiments, the potential response data 1130 may include an association between action response data 1128 (or a summarized representation of the action response data 1128) and an indication of the API/component that generated the action response data 1128 (e.g., a component identifier, component description, etc.). In some embodiments, the shortlister language model 1310 may be configured to filter and/or rank the action response data 1128 based on how relevant the action response data 1128 is to the current task. In some embodiments, the shortlister language model 1310 may be configured to filter and/or rank the action response data 1128 based on a confidence level of the component that provided the action response data, where the confidence level may indicate a likelihood of the component being able to respond (e.g., within a period of time), the component being able to perform a potential action that corresponds to the current task, etc. In some embodiments, the action response data 1128 may indicate whether or not the corresponding component is able to respond (e.g., the action response data 1128 may include a Boolean value such as "yes" or "no" or other similar indications). In some embodiments, the shortlister language model 1310 may filter and/or rank the action response data 1128 based on information included in the prompt data 1304 (e.g., the user input data 1104, the relevant API data 1308, the context data 1202, the prompt data 1206, etc.). For example, the potential response data 1130 may include a subset of the action response data

1128 (or the summarized representations of the action response data 1128) and may further include a representation of a confidence associated with the action response data 1128 (or a summarized representation of the action response data 1128). As such, the potential response data 1130 may further include data representing a confidence of how relevant the action response data 1128 is to the current task. In some embodiments, the shortlister language model 1310 may consider a rating associated with the component that provided the action response data 1128, where the rating may be a user satisfaction rating provided by multiple different users of the system 1100, a user satisfaction rating provided by the user 1102 associated with the user input data 1104, a system generated rating based on the number of past tasks handled by the component, an accuracy rating based on the number of past tasks the component had handled correctly/provided a desired response for, etc.

The LM shortlister component 1108 may send the potential response data 1130 for further processing. In instances where the task generation component 1106 determined that more than one task is to be completed, the LM shortlister component 1108 may send the potential response data 1130 to the task generation component 1106, which may process as described herein above to maintain and prioritize the task list based on the potential response data 1130 and select a new task to be completed. For example, in the instance where the selected task was "identify user's pizza preference," or some other context retrieval task, the shortlister language model 1310 may send potential response data 1314 corresponding to the context data retrieved by the context handler component 1126 to the task generation component 1106, to process.

In instances where the task generation component 1106 determined that only one task is to be completed, or in instances where the LM shortlister component 1108 determines that there are no remaining tasks to be completed, the LM shortlister may send the potential response data 1130, and the potential responses associated with previously completed tasks (e.g., previous action response data) to the response arbitration component 1134 to process as discussed herein above. The LM shortlister component 1108 may further send the user input data 1104, the context data 1202, etc., to the task generation component 1106 and/or the response arbitration component 1134.

As discussed herein above, in some embodiments, the LM orchestrator component 1112 may further include a memory storage which may store various information associated with the processing performed. In addition, or alternative, the memory storage may store any of the additional information discussed herein above that was determined/generated during one or more previous iterations of processing by the LM orchestrator component 1112 for the user input data 1104 (e.g., the user input data 1104, the prompt data 1206, the context data 1202, the model output data 1210, prompt data 1214, the task data 1110, the relevant API data 1308, the prompt data 1304, the action plan data 1114, the action response data 1128, the potential response data 1130, etc.). As such, after the LM shortlister component 1108 generates the potential response data 1130, the LM orchestrator component 1112 may send the abovementioned data to the memory storage. In some embodiments, the above-mentioned data may be sent to the memory storage as it is generated by the system 1100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 1204 may receive one or more portions of the data included in the memory storage (which were generated during one or more previous iterations of processing performed with respect to the user input data 1104) and include the one or more portions of data in the prompt data 1206.

In some embodiments, the response arbitration component 1134 may be configured to further process data representing a potential response to the user input that is generated by one or more other components of the system 1100 not included in the LM orchestrator component 1112. For example, the response arbitration component 1134 may further receive data from an orchestrator component 1412 (discussed in detail herein below with respect to FIG. 14) representing a potential response to the user input (e.g., the output of the skill component 1122), where the orchestration of the processing performed to generate the potential response was performed by the orchestrator component 1412, rather than the LM orchestrator component 1112. In such embodiments, the response arbitration component 1134 may be further configured to arbitrate between first potential responses received as a result of the processing of the LM orchestrator component 1112 and second potential responses received as a result of the processing of the orchestrator component 1512. As discussed above, the response arbitration component 1134 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 1412 may be included in the potential response data 1130. For example, the orchestrator component 1412 may be determined to be configured to perform a function (e.g., cause another component(s) to perform a function) potentially relevant to the user input such that the LM shortlister component 1108 may cause the orchestrator component 1412 to generate potential responses potentially responsive to the user input, which may be included in the potential response data 1130 sent to the response arbitration component 1134.

In some embodiments, the language models of FIGS. 12, and/or 13 may be fine-tuned to perform a particular task(s). Fine-tuning of the language models may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, as discussed above, one or more components of the system 1100 discussed herein above may be configured to begin processing with respect to data as soon as the data or a portion of the data is available to the one or more components. Some components of the system 1100 are generative components/models that can begin processing with respect to portions of data as they are available, instead of waiting to initiate processing after the entirety of data is available. In other words, the system 1100 may be configured to stream portions of data associated with processing with respect to a user input to the one or more components such that the one or more components may begin performing their configured processing with respect to that data as soon as it is available to the one or more components. For example, if the output of the task determination language model 1208, the task selection language model 1216, and/or the shortlister language model 1310 indicates that additional information is needed to complete a first task associated with a user input, a request for the additional information may be sent to the context handler component 1126. Thereafter, the task determination language model 1208, the task selection language model 1216, and/or the shortlister language model 1310 may continue to process to complete their configured operations. For example, while the context handler component 1126 is processing to determine the context data, the system 1100 may begin processing with respect to a second task associated with the user input. Thereafter, the output of the context handler component 1126 may be sent to the response arbitration component 1134 such that once the response arbitration component 1134 receives the output of the LM shortlister component 1108, the response arbitration component 1134 may resolve the ambiguity that resulted in the request for the context data in order to generate the responsive output data 1132. For further example, if the user input data 1104 is generated to include the natural language representation of the user input, but the processing required to determine the corresponding contextual signals (e.g., weather data, time of data, dialog history, device information, etc.) is yet to be completed, the task generation component 1106 may begin processing with respect to the natural language representation of the user input. Once the corresponding contextual signals have been generated, the task generation component 1106 may begin processing with respect to the contextual signals and may update downstream components with the result of the processing with respect to the contextual signals.

As another example, if the task generation component 1106 determines that more than one task is to be completed to perform an action responsive to a user input, and the LM shortlister component 1108 processes as described herein above to cause one or more components to generate potential responses with respect to a first task of the more than one tasks, the LM shortlister component 1108 may send the potential responses (and a representation of the user input and the current task) to the response arbitration component 1134 to process as described herein above with respect to those potential responses while the system 1100 (e.g., the task generation component 1106 and/or the LM shortlister component 1108) completes processing with respect to the remaining tasks of the one or more tasks. Therefore, the response arbitration component 1134 may process as described herein to select between the potential responses associated with the first task while the potential responses associated with one or more of the remaining tasks is completed. As such, the response arbitration component 1134 may only need to arbitrate between the potential responses associated with the first task that were previously selected by the response arbitration component 1134 as being responsive to the first task when the response arbitration component 1134 later processes with respect to further potential responses associated with further tasks.

As a further example, if the API retrieval component 1306 determines (e.g., with a confidence value that meets or exceeds a particular threshold) that a particular API or component description should be included in the relevant API data, the API retrieval component 1306 may provide the corresponding relevant API data to the shortlister prompt generation component 1302 so that the shortlister prompt generation component 1302 may begin processing with respect to the relevant API data while the API retrieval component 1306 continues to determine one or more further relevant API data. In general, the system 1100 is capable of performing such streaming and processing of portions of data discussed herein (e.g., for processing with respect to a user input) and updating downstream components with the results of processing of newly available portions of data as the data becomes available for processing.

Figure 14:
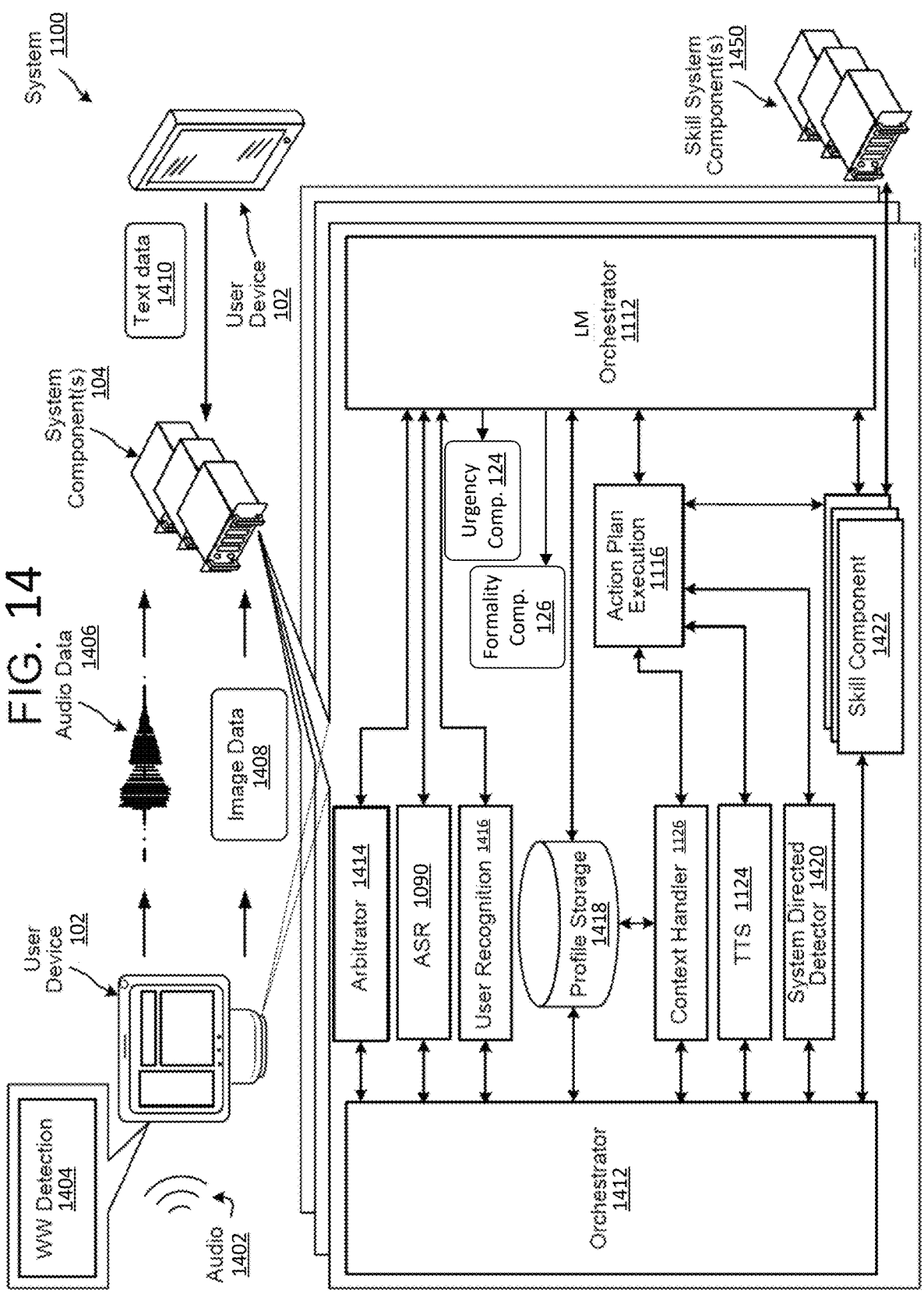
FIG. 14 is a conceptual diagram of components of the system, according to embodiments of the present disclosure.

The system 1100 may operate using various components as described in FIG. 14. The various components may be located on same or different physical devices. Communication between various components may occur directly or across a network(s) 106. The user device 102 may include audio capture component(s), such as a microphone or array of microphones of a user device 102, captures audio 1402 and creates corresponding audio data. Once speech is detected in audio data representing the audio 1402, the user device 102 may determine if the speech is directed at the user device 102/system component(s). In at least some embodiments, such determination may be made using a wakeword detection component 1404. The wakeword detection component 1404 may be configured to detect various wakewords. In at least some examples, each wakeword may correspond to a name of a different digital assistant. An example wakeword/digital assistant name is "Alexa." In another example, input to the system may be in form of text data 1410, for example as a result of a user typing an input into a user interface of user device 102. Other input forms may include indication that the user has pressed a physical or virtual button on user device 102, the user has made a gesture, etc. The user device 102 may also capture images using camera(s) of the user device 102 and may send image data 1408 representing those image(s) to the system component(s). The image data 1408 may include raw image data or image data processed by the user device 102 before sending to the system component(s). The image data 1408 may be used in various manners by different components of the system to perform operations such as determining whether a user is directing an utterance to the system, interpreting a user command, responding to a user command, etc.

The wakeword detection component 1404 of the user device 102 may process the audio data, representing the audio 1402, to determine whether speech is represented therein. The user device 102 may use various techniques to determine whether the audio data includes speech. In some examples, the user device 102 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 102 may implement a classifier configured to distinguish speech from background noise. The classifier may be implemented by techniques such as linear classifiers, support vector machines, and decision trees. In still other examples, the user device 102 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1402, is analyzed to determine if specific characteristics of the audio data match preconfigured acoustic waveforms, audio signatures, or other data corresponding to a wakeword.

Thus, the wakeword detection component 1404 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1404 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1404 and/or input is detected by an input detector, the user device 102 may "wake" and begin transmitting audio data 1406, representing the audio 1402, to the system component(s) 104. The audio data 1406 may include data corresponding to the wakeword; in other embodiments, the portion of the audio corresponding to the wakeword is removed by the user device 102 prior to sending the audio data 1406 to the system component(s) 104. In the case of touch input detection or gesture-based input detection, the audio data may not include a wakeword.

In some implementations, the system 1100 may include more than one system component(s). The system component(s) 104 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1404 may result in sending audio data to system component(s) for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 1422 of one or more system component(s) 104.

The user device 102/system component(s) may also include a system directed input detector 1420. The system directed input detector 1420 may be configured to determine whether an input to the system (for example speech, a gesture, etc.) is directed to the system or not directed to the system (for example directed to another user, etc.). The system directed input detector 1420 may work in conjunction with the wakeword detection component 1404. If the system directed input detector 1420 determines an input is directed to the system, the user device 102 may "wake" and begin sending captured data for further processing. If data is being processed the user device 102 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1420 determines an input is not directed to the system (such as a speech or gesture directed to another user) the user device 102 may discard the data and take no further action for processing purposes. In this way the system 1100 may prevent processing of data not directed to the system, thus protecting user privacy. As an indicator to the user, however, the system may output an audio, visual, or other indicator when the system directed input detector 1420 is determining whether an input is potentially device directed. For example, the system may output an orange indicator while considering an input, and may output a green indicator if a system directed input is detected. Other such configurations are possible.

Upon receipt by the system component(s) 104, the audio data 1406 may be sent to an orchestrator component 1412 and/or the LM orchestrator component 1112. The orchestrator component 1412 may include memory and logic that enables the orchestrator component 1412 to transmit various pieces and forms of data to various components of the system, as well as perform other operations as described herein. In some embodiments, the orchestrator component 1412 may optionally be included in the system component(s) 104. In embodiments where the orchestrator component 1412 is not included in the system component(s) 104, the audio data 1406 may be sent directly to the LM orchestrator component 1112. Further, in such embodiments, each of the components of the system component(s) 104 may be configured to interact with the LM orchestrator component 1112, the action plan execution component 1116, and/or the API provider component. In examples, the LM orchestrator component 1112 may communicate with the urgency component 124 and/or the formality component 126 to perform one or more of the operations described above with respect to generating urgency values and/or formality values.

In some embodiments, the system component(s) 104 may include an arbitrator component 1414, which may be configured to determine whether the orchestrator component 1412 and/or the LM orchestrator component 1112 are to process with respect to the audio data 1406. In some embodiments, the LM orchestrator component 1112 may be selected to process with respect to the audio data 1406 only if the user 1102 associated with the audio data 1406 (or the user device 102 that captured the audio 1402) has previously indicated that the LM orchestrator component 1112 may be selected to process with respect to user inputs received from the user 1102.

In some embodiments, the arbitrator component 1414 may determine the orchestrator component 1412 and/or the LM orchestrator component 1112 are to process with respect to the audio data 1406 based on metadata associated with the audio data 1406. For example, the arbitrator component 1414 may be a classifier configured to process a natural language representation of the audio data 1406 (e.g., output by the ASR component 1090) and classify the corresponding user input as to be processed by the orchestrator component 1412 and/or the LM orchestrator component 1112. For further example, the arbitrator component 1414 may determine whether the device from which the audio data 1406 is received is associated with an indicator representing the audio data 1406 is to be processed by the orchestrator component 1412 and/or the LM orchestrator component 1112. As an even further example, the arbitrator component 1414 may determine whether the user (e.g., determined using data output from the user recognition component 1416) from which the audio data 1406 is received is associated with a user profile including an indicator representing the audio data 1406 is to be processed by the orchestrator component 1412 and/or the LM orchestrator component 1112. As another example, the arbitrator component 1414 may determine whether the audio data 1406 (or the output of the ASR component 1090) corresponds to a request representing that the audio data 1406 is to be processed by the orchestrator component 1412 and/or the LM orchestrator component 1112 (e.g., a request including "let's chat" may represent that the audio data 1406 is to be processed by the LM orchestrator component 1112).

In some embodiments, if the arbitrator component 1414 is unsure (e.g., a confidence score corresponding to whether the orchestrator component 1412 and/or the LM orchestrator component 1112 is to process is below a threshold), then the arbitrator component 1414 may send the audio data 1406 to both of the orchestrator component 1412 and the LM orchestrator component 1112. In such embodiments, the orchestrator component 1412 and/or the LM orchestrator component 1112 may include further logic for determining further confidence scores during processing representing whether the orchestrator component 1412 and/or the LM orchestrator component 1112 should continue processing, as is discussed further herein below.

The arbitrator component 1414 may send the audio data 1406 to an ASR component 1090. In some embodiments, the component selected to process the audio data 1406 (e.g., the orchestrator component 1412 and/or the LM orchestrator component 1112) may send the audio data 1406 to the ASR component 1090. The ASR component 1090 may transcribe the audio data 1406 into text data. The text data output by the ASR component 1090 represents one or more than one (e.g., in the form of an N-best list) ASR hypotheses representing speech represented in the audio data 1406. The ASR component 1090 interprets the speech in the audio data 1406 based on a similarity between the audio data 1406 and pre-established language models. For example, the ASR component 1090 may compare the audio data 1406 with models for sounds (e.g., acoustic units such as phonemes, senons, phones, etc.) and sequences of sounds to identify words that match the sequence of sounds of the speech represented in the audio data 1406. The ASR component 1090 sends the text data generated thereby to the arbitrator component 1414, the orchestrator component 1412, and/or the LM orchestrator component 1112. In instances where the text data is sent to the arbitrator component 1414, the arbitrator component 1414 may send the text data to the component selected to process the audio data 1406 (e.g., the orchestrator component 1412 and/or the LM orchestrator component 1112). The text data sent from the ASR component 1090 to the arbitrator component 1414, the orchestrator component 1412, and/or the LM orchestrator component 1112 may include a single top-scoring ASR hypothesis or may include an N-best list including multiple top-scoring ASR hypotheses. An N-best list may additionally include a respective score associated with each ASR hypothesis represented therein.

A skill system component(s) 1450 may communicate with a skill component(s) 1422 within the system component(s) 104 directly with the orchestrator component 1412 and/or the action plan execution component 1116, or with other components. A skill system component(s) 1450 may be configured to perform one or more actions. An ability to perform such action(s) may sometimes be referred to as a "skill." That is, a skill may enable a skill system component(s) 1450 to execute specific functionality in order to provide data or perform some other action requested by a user. For example, a weather service skill may enable a skill system component(s) 1450 to provide weather information to the system component(s) 104, a car service skill may enable a skill system component(s) 1450 to book a trip with respect to a taxi or ride sharing service, an order pizza skill may enable a skill system component(s) 1450 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 104 may be configured with a skill component 1422 dedicated to interacting with the skill system component(s) 1450. Unless expressly stated otherwise, reference to a skill, skill device, or skill component may include a skill component 1422 operated by the system component(s) 104 and/or skill operated by the skill system component(s) 1450. Moreover, the functionality described herein as a skill or skill may be referred to using many different terms, such as an action, bot, app, or the like. The skill component 1422 and or skill system component(s) 1450 may return output data to the orchestrator component 1412.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 1124. The TTS component 1124 may generate audio data (e.g., synthesized speech) from text data using one or more different methods. Text data input to the TTS component 1124 may come from a skill component 1422, the orchestrator component 1412, or another component of the system. In one method of synthesis called unit selection, the TTS component 1124 matches text data against a database of recorded speech. The TTS component 1124 selects matching units of recorded speech and concatenates the units together to form audio data. In another method of synthesis called parametric synthesis, the TTS component 1124 varies parameters such as frequency, volume, and noise to create audio data including an artificial speech waveform. Parametric synthesis uses a computerized voice generator, sometimes called a vocoder.

The user device 102 may include still image and/or video capture components such as a camera or cameras to capture one or more images. The user device 102 may include circuitry for digitizing the images and/or video for transmission to the system component(s) 104 as image data. The user device 102 may further include circuitry for voice command-based control of the camera, allowing a user 1102 to request capture of image or video data. The user device 102 may process the commands locally or send audio data 1406 representing the commands to the system component(s) 104 for processing, after which the system component(s) 104 may return output data that can cause the user device 102 to engage its camera.

The system component(s) 104/the user device 102 may include a user recognition component 1416 that recognizes one or more users using a variety of data. However, the disclosure is not limited thereto, and the user device 102 may include the user recognition component 1416 instead of and/or in addition to the system component(s) 104 without departing from the disclosure.

The user recognition component 1416 may take as input the audio data 1406 and/or text data output by the ASR component 1090. The user recognition component 1416 may perform user recognition by comparing audio characteristics in the audio data 1406 to stored audio characteristics of users. The user recognition component 1416 may also perform user recognition by comparing biometric data (e.g., fingerprint data, iris data, etc.), received by the system in correlation with the present user input, to stored biometric data of users assuming user permission and previous authorization. The user recognition component 1416 may further perform user recognition by comparing image data (e.g., including a representation of at least a feature of a user), received by the system in correlation with the present user input, with stored image data including representations of features of different users. The user recognition component 1416 may perform additional user recognition processes, including those known in the art.

The user recognition component 1416 determines scores indicating whether user input originated from a particular user. For example, a first score may indicate a likelihood that the user input originated from a first user, a second score may indicate a likelihood that the user input originated from a second user, etc. The user recognition component 1416 also determines an overall confidence regarding the accuracy of user recognition operations.

Output of the user recognition component 1416 may include a single user identifier corresponding to the most likely user that originated the user input. Alternatively, output of the user recognition component 1416 may include an N-best list of user identifiers with respective scores indicating likelihoods of respective users originating the user input. The output of the user recognition component 1416 may be used to inform processing of the arbitrator component 1414, the orchestrator component 1412, and/or the LM orchestrator component 1112 as well as processing performed by other components of the system.

The system component(s) 104/user device 102 may include a presence detection component that determines the presence and/or location of one or more users using a variety of data.

The system 1100 (either on user device 102, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1418 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 102, the user profile (associated with the presented login information) may be updated to include information about the user device 102, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1418 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1418 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 14 may be illustrated as part of system component(s) 104, user device 102, or otherwise, the components may be arranged in other device(s) (such as in user device 102 if illustrated in system component(s) 104 or vice-versa, or in other device(s) altogether) without departing from the disclosure.

In at least some embodiments, the system component(s) may receive the audio data 1406 from the user device 102, to recognize speech corresponding to a spoken input in the received audio data 1406, and to perform functions in response to the recognized speech. In at least some embodiments, these functions involve sending directives (e.g., commands), from the system component(s) to the user device 102 (and/or other devices) to cause the user device 102 to perform an action, such as output an audible response to the spoken input via a loudspeaker(s), and/or control secondary devices in the environment by sending a control command to the secondary devices.

Thus, when the user device 102 is able to communicate with the system component(s) over the network(s) 106, some or all of the functions capable of being performed by the system component(s) may be performed by sending one or more directives over the network(s) 106 to the user device 102, which, in turn, may process the directive(s) and perform one or more corresponding actions. For example, the system component(s), using a remote directive that is included in response data (e.g., a remote response), may instruct the user device 102 to output an audible response (e.g., using TTS processing performed by an on-device TTS component) to a user's question via a loudspeaker(s) of (or otherwise associated with) the user device 102, to output content (e.g., music) via the loudspeaker(s) of (or otherwise associated with) the user device 102, to display content on a display of (or otherwise associated with) the user device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 1102 as part of a shopping function, establishing a communication session (e.g., a video call) between the user 1102 and another user, and so on.

In at least some embodiments, a hybrid selector, of the user device 102, may send the audio data 1406 to the wakeword detection component 1404. If the wakeword detection component 1404 detects a wakeword in the audio data 1406, the wakeword detection component 1404 may send an indication of such detection to the hybrid selector. In response to receiving the indication, the hybrid selector may send the audio data 1406 to the system component(s) and/or the ASR component of the user device 102. The wakeword detection component 1404 may also send an indication, to the hybrid selector, representing a wakeword was not detected. In response to receiving such an indication, the hybrid selector may refrain from sending the audio data 1406 to the system component(s), and may prevent the ASR component of the user device 102 from further processing the audio data 1406. In this situation, the audio data 1406 can be discarded.

The user device 102 may conduct its own speech processing using on-device language processing components, such as an ASR component, similar to the manner discussed herein with respect to the ASR component 1090 of the system component(s). The user device 102 may also internally include, or otherwise have access to, other components such as one or more skill components capable of executing commands based on the output of an orchestrator component, an LM orchestrator, or other results determined by the user device 102/system component(s) (which may operate similarly to skill components 1422), an arbitrator component (configured to process in a similar manner to that discussed herein above with respect to the arbitrator component 1414), an action plan execution component (configured to process in a similar manner to that discussed herein with respect to the action plan execution component 1116), a context handler component (configured to process in a similar manner to that discussed herein with respect to the context handler component 1126), a user recognition component (configured to process in a similar manner to that discussed herein with respect to the user recognition component 1416 of the system component(s)), profile storage (configured to store similar profile data to that discussed herein with respect to the profile storage 1418 of the system component(s)), or other components. In at least some embodiments, the profile storage may only store profile data for a user or group of users specifically associated with the user device 102. Similar to as described above with respect to skill component 1422, a skill component of the user device 102 may communicate with a skill system component(s) 1450. The user device 102 may also have its own TTS component, which may operate similarly to TTS component 1124.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 102 attempts to process a natural language user input for which the on-device language processing components are not necessarily best suited, the language processing results determined by the user device 102 may indicate a low confidence or other metric indicating that the processing by the user device 102 may not be as accurate as the processing done by the system component(s).

The hybrid selector, of the user device 102, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 1406 to pass to the system component(s) while also receiving (e.g., intercepting) this audio data 1406 and sending the audio data 1406 to the HEC.

In at least some embodiments, the hybrid selector may further include a local request orchestrator (LRO) configured to notify the ASR component of the user device 102 about the availability of new audio data 1406 that represents user speech, and to otherwise initiate the operations of local language processing when new audio data 1406 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 102 receives directive data from the system component(s) and chooses to use that remotely-determined directive data.

Thus, when the audio data 1406 is received, the HP may allow the audio data 1406 to pass through to the system component(s) and the HP may also input the audio data 1406 to the on-device ASR component by routing the audio data 1406 through the HEC of the hybrid selector, whereby the LRO notifies the on-device ASR component of the audio data 1406. At this point, the hybrid selector may wait for response data from either or both of the system component(s) or the local language processing components. However, the disclosure is not limited thereto, and in some examples the hybrid selector may send the audio data 1406 only to the local ASR component without departing from the disclosure. For example, the user device 102 may process the audio data 1406 locally without sending the audio data 1406 to the system component(s).

The local ASR component is configured to receive the audio data 1406 from the hybrid selector, and to recognize speech in the audio data 1406. The user device 102 and/or the system component(s) may associate a unique identifier with each natural language user input. The user device 102 may include the unique identifier when sending the audio data 1406 to the system component(s), and the response data from the system component(s) may include the unique identifier to identify which natural language user input the response data corresponds.

In at least some embodiments, the user device 102 may include, or be configured to use, one or more skill components that may work similarly to the skill component(s) 1422 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 102 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 102 may be in communication with one or more skill system component(s) 1450. For example, a skill system component(s) 1450 may be located in a remote environment (e.g., separate location) such that the user device 102 may only communicate with the skill system component(s) 1450 via the network(s) 106. However, the disclosure is not limited thereto. For example, in at least some embodiments, a skill system component(s) 1450 may be configured in a local environment (e.g., home server and/or the like) such that the user device 102 may communicate with the skill system component(s) 1450 via a private network, such as a local area network (LAN).

A skill system component(s) 1450 may communicate with a skill component(s) 922 within the system component(s) 104 directly with the orchestrator component 1412 and/or the action plan execution component 1116, or with other components. A skill system component(s) 1450 may be configured to perform one or more actions. An ability to perform such action(s) may sometimes be referred to as a "skill." That is, a skill may enable a skill system component(s) 1450 to execute specific functionality in order to provide data or perform some other action requested by a user. For example, a weather service skill may enable a skill system component(s) 1450 to provide weather information to the system component(s) 104, a car service skill may enable a skill system component(s) 1450 to book a trip with respect to a taxi or ride sharing service, an order pizza skill may enable a skill system component(s) 1450 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 104 may be configured with a skill component 1122 dedicated to interacting with the skill system component(s) 1450. Unless expressly stated otherwise, reference to a skill, skill device, or skill component may include a skill component 1122 operated by the system component(s) 104 and/or skill operated by the skill system component(s) 1450. Moreover, the functionality described herein as a skill or skill may be referred to using many different terms, such as an action, bot, app, or the like. The skill component 1122 and or skill system component(s) 1450 may return output data to the orchestrator component 1412.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 1124. The TTS component 1124 may generate audio data (e.g., synthesized speech) from text data using one or more different methods. Text data input to the TTS component 1124 may come from a skill component 1122, the orchestrator component 1412, or another component of the system. In one method of synthesis called unit selection, the TTS component 1124 matches text data against a database of recorded speech. The TTS component 1124 selects matching units of recorded speech and concatenates the units together to form audio data. In another method of synthesis called parametric synthesis, the TTS component 1124 varies parameters such as frequency, volume, and noise to create audio data including an artificial speech waveform. Parametric synthesis uses a computerized voice generator, sometimes called a vocoder.

The user device 102 may include still image and/or video capture components such as a camera or cameras to capture one or more images. The user device 102 may include circuitry for digitizing the images and/or video for transmission to the system component(s) 104 as image data. The user device 102 may further include circuitry for voice command-based control of the camera, allowing a user 1102 to request capture of image or video data. The user device 102 may process the commands locally or send audio data 1406 representing the commands to the system component(s) 104 for processing, after which the system component(s) 104 may return output data that can cause the user device 102 to engage its camera.

The system component(s) 104 may include a user recognition component 1416 that recognizes one or more users using a variety of data. The user recognition component 1416 may take as input the audio data 1406 and/or text data output by the ASR component 1090. The user recognition component 1416 may perform user recognition by comparing audio characteristics in the audio data 1406 to stored audio characteristics of users. The user recognition component 1416 may also perform user recognition by comparing biometric data (e.g., fingerprint data, iris data, etc.), received by the system in correlation with the present user input, to stored biometric data of users assuming user permission and previous authorization. The user recognition component 1416 may further perform user recognition by comparing image data (e.g., including a representation of at least a feature of a user), received by the system in correlation with the present user input, with stored image data including representations of features of different users. The user recognition component 1416 may perform additional user recognition processes, including those known in the art.

The user recognition component 1416 determines scores indicating whether user input originated from a particular user. For example, a first score may indicate a likelihood that the user input originated from a first user, a second score may indicate a likelihood that the user input originated from a second user, etc. The user recognition component 1416 also determines an overall confidence regarding the accuracy of user recognition operations.

Output of the user recognition component 1416 may include a single user identifier corresponding to the most likely user that originated the user input. Alternatively, output of the user recognition component 1416 may include an N-best list of user identifiers with respective scores indicating likelihoods of respective users originating the user input. The output of the user recognition component 1416 may be used to inform processing of the arbitrator component 1414, the orchestrator component 1412, and/or the LM orchestrator component 1112 as well as processing performed by other components of the system.

The system component(s) 104/user device 102 may include a presence detection component that determines the presence and/or location of one or more users using a variety of data.

The system 1100 (either on user device 102, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1418 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 102, the user profile (associated with the presented login information) may be updated to include information about the user device 102, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1418 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1418 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 14 may be illustrated as part of system component(s) 104, user device 102, or otherwise, the components may be arranged in other device(s) (such as in user device 102 if illustrated in system component(s) 104 or vice-versa, or in other device(s) altogether) without departing from the disclosure.

In at least some embodiments, the system component(s) may receive the audio data 1406 from the user device 102, to recognize speech corresponding to a spoken input in the received audio data 1406, and to perform functions in response to the recognized speech. In at least some embodiments, these functions involve sending directives (e.g., commands), from the system component(s) to the user device 102 (and/or other user devices) to cause the user device 102 to perform an action, such as output an audible response to the spoken input via a loudspeaker(s), and/or control secondary devices in the environment by sending a control command to the secondary devices.

Thus, when the user device 102 is able to communicate with the system component(s) over the network(s) 106, some or all of the functions capable of being performed by the system component(s) may be performed by sending one or more directives over the network(s) 106 to the user device 102, which, in turn, may process the directive(s) and perform one or more corresponding actions. For example, the system component(s), using a remote directive that is included in response data (e.g., a remote response), may instruct the user device 102 to output an audible response (e.g., using TTS processing performed by an on-device TTS component) to a user's question via a loudspeaker(s) of (or otherwise associated with) the user device 102, to output content (e.g., music) via the loudspeaker(s) of (or otherwise associated with) the user device 102, to display content on a display of (or otherwise associated with) the user device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 1102 as part of a shopping function, establishing a communication session (e.g., a video call) between the user 1102 and another user, and so on.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:

one or more processors; and non-transitory computer-readable media storing computer-executable instructions that, when executed by the one or more processors, cause the system to perform operations comprising:

receiving user input data including:

a command to send a message, the command omitting a communication channel identifier for sending the message; and the message;

determining, using a language model (LM), a recipient profile to send the message to;

querying, by the LM, a communication channel application for first data indicating communication channels available for sending the message to the recipient profile;

receiving, at the LM, the first data indicating the communication channels;

determining, from the first data, that the communication channels available for sending the message include at least two communication channels;

in response to determining that the communication channels include the at least two communication channels, inferring, by the LM from words of the message, an urgency value to associate with the message;

determining, utilizing the urgency value, a communication channel of the communication channels to select for sending the message to the recipient profile; and causing the message to be sent to the recipient profile utilizing the communication channel as selected.

2. The system of claim 1, the operations further comprising, in response to determining that the communication channels include the at least two communication channels, and utilizing the LM, inferring a formality value to associate with the message, the LM trained to infer the formality value from a subject matter of the message, and wherein determining the communication channel to select for sending the message is based on the formality value.

3. The system of claim 1, the operations further comprising:

determining a first time of day associated with receipt of the user input data; and determining, utilizing the LM, a second time of day indicated in the content of the message, and wherein determining the urgency value is based on the LM inferring the urgency value from (1) the first time of day associated with receipt of the user input data and (2) the second time of day indicated in the content of the message.

4. The system of claim 1, the operations further comprising:

determining, in response to determining the recipient profile, a first location of a recipient associated with the recipient profile at a time when the user input data is received;

determining, utilizing the LM, a second location indicated in the content of the message, and wherein determining the urgency value is based on the LM inferring the urgency value from (1) the first location of the recipient and (2) the second location indicated in the content of the message.

5. A method comprising:

receiving user input data requesting that a message be sent;

determining, using a language model (LM), a recipient profile to send the message to;

querying, by the LM, a communication channel application for first data indicating communication channels available for sending the message to the recipient profile;

inferring, by the LM from words of the message and based at least in part on the first data indicating the communication channels, a content score to associate with the message; and determining, based at least in part on the content score, a communication channel of the communication channels to select for sending the message to the recipient profile.

6. The method of claim 5, further comprising inferring, utilizing the LM, a formality value to associate with the message, wherein:

the LM is trained to infer the formality value from a subject matter of the message; and determining the communication channel to select for sending the message comprises determining the communication channel to select based at least in part on the formality value.

7. The method of claim 5, further comprising:

determining a first time of day associated with receipt of the user input data; and determining, utilizing the LM, a second time of day indicated in the content of the message, wherein inferring the content score comprises inferring the content score based at least in part on:

the first time of day; and the second time of day.

8. The method of claim 5, further comprising:

determining a first location of a recipient associated with the recipient profile at a time when the user input data is received; and determining, utilizing the LM, a second location indicated in the content of the message, wherein inferring the content score comprises inferring the content score based at least in part on:

the first location; and the second location.

9. The method of claim 5, further comprising:

determining an amount of the content of the message; and inferring, utilizing the LM, a formality value to associate with the message, wherein:

the LM is trained to infer the formality value from the amount of the content; and determining the communication channel comprises determining the communication channel based at least in part on the formality value.

10. The method of claim 5, further comprising:

receiving, as part of the user input data, a request to generate the content of the message;

determining, utilizing the LM, a subject matter of the request to generate the content; and inferring, utilizing the LM, a formality value to associate with the message, wherein:

the LM is trained to infer the formality value from the subject matter of the request; and determining the communication channel comprises determining the communication channel based at least in part on the formality value.

11. The method of claim 5, further comprising:

inferring, utilizing the LM, a recipient category associated with the recipient profile; and inferring, utilizing the LM, a formality value to associate with the message, wherein:

the LM is trained to infer the formality value from the recipient category; and determining the communication channel comprises determining the communication channel based at least in part on the formality value.

12. The method of claim 5, further comprising:

receiving second data indicating detection of a recipient associated with the recipient profile at a recipient device;

determining a location associated with the recipient device;

inferring, utilizing the LM, a formality value to associate with the message, wherein:

the LM is trained to infer the formality value from the location of the recipient device; and determining the communication channel comprises determining the communication channel based at least in part on the formality value.

13. A system comprising:

one or more processors; and non-transitory computer-readable media storing computer-executable instructions that, when executed by the one or more processors, cause the system to perform operations comprising:

receiving user input data requesting that a message be sent;

determining, using a language model (LM), a recipient profile to send the message to;

querying, by the LM, a communication channel application for first data indicating communication channels available for sending the message to the recipient profile;

inferring, by the LM from words of the message and based at least in part on the first data indicating the communication channels, an urgency value to associate with the message; and determining, based at least in part on the urgency value, a communication channel of the communication channels to select for sending the message to the recipient profile.

14. The system of claim 13, the operations further comprising, utilizing the LM, inferring a formality value to associate with the message, wherein:

the LM is trained to infer the formality value from a subject matter of the message; and determining the communication channel to select for sending the message comprises determining the communication channel to select based at least in part on the formality value.

15. The system of claim 13, the operations further comprising:

determining a first time of day associated with receipt of the user input data; and determining, utilizing the LM, a second time of day indicated in the content of the message, wherein inferring the urgency value comprises inferring the urgency value based at least in part on:

the first time of day; and the second time of day.

16. The system of claim 13, the operations further comprising:

determining a first location of a recipient associated with the recipient profile at a time when the user input data is received; and determining, utilizing the LM, a second location indicated in the content of the message, wherein inferring the urgency value comprises inferring the urgency value based at least in part on:

the first location; and the second location.

17. The system of claim 13, the operations further comprising:

determining an amount of the content of the message; and inferring, utilizing the LM, a formality value to associate with the message, wherein:

the LM is trained to infer the formality value from the amount of the content; and determining the communication channel comprises determining the communication channel based at least in part on the formality value.

18. The system of claim 13, the operations further comprising:

receiving, as part of the user input data, a request to generate the content of the message;

determining, utilizing the LM, a subject matter of the request to generate the content; and inferring, utilizing the LM, a formality value to associate with the message, wherein:

the LM is trained to infer the formality value from the subject matter of the request; and determining the communication channel comprises determining the communication channel based at least in part on the formality value.

19. The system of claim 13, the operations further comprising:

inferring, utilizing the LM, a recipient category associated with the recipient profile; and inferring, utilizing the LM, a formality value to associate with the message, wherein:

the LM is trained to infer the formality value from the recipient category; and determining the communication channel comprises determining the communication channel based at least in part on the formality value.

20. The system of claim 13, the operations further comprising:

receiving second data indicating detection of a recipient associated with the recipient profile at a recipient device;

determining a location associated with the recipient device;

inferring, utilizing the LM, a formality value to associate with the message, wherein:

the LM is trained to infer the formality value from the location of the recipient device; and determining the communication channel comprises determining the communication channel based at least in part on the formality value.

* * * * *